US012618754B2

(12) United States Patent
Takara et al.

(10) Patent No.: US 12,618,754 B2
(45) Date of Patent: May 5, 2026

(54) OIL REMOVAL METHOD, OIL REMOVER, TRANSPORTER, AND TESTING SYSTEM

(71) Applicant: SYSMEX CORPORATION, Kobe (JP)

(72) Inventors: Naoshi Takara, Kobe (JP); Mitsuo Yamasaki, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 271 days.

(21) Appl. No.: 18/500,215

(22) Filed: Nov. 2, 2023

(65) Prior Publication Data

US 2024/0151612 A1 May 9, 2024

(30) Foreign Application Priority Data

Nov. 7, 2022 (JP) ................................ 2022-178459

(51) Int. Cl.
*G01N 1/28* (2006.01)
*G01N 35/00* (2006.01)

(52) U.S. Cl.
CPC ..... *G01N 1/2813* (2013.01); *G01N 35/00029* (2013.01); *G01N 2035/00138* (2013.01); *G01N 2035/00168* (2013.01)

(58) Field of Classification Search
CPC .................................................. G01N 1/2813
See application file for complete search history.

(56) References Cited

U.S. PATENT DOCUMENTS

| | | | | |
|---|---|---|---|---|
| 9,074,971 | B2 * | 7/2015 | Ariyoshi | .......... G01N 35/00722 |
| 9,776,322 | B2 * | 10/2017 | Nilsson | .................... B25J 9/123 |
| 10,598,677 | B2 * | 3/2020 | Nakajima | ........ G01N 35/00871 |
| 2015/0022882 | A1 | 1/2015 | Ue et al. | |
| 2017/0067924 | A1 | 3/2017 | Nilsson et al. | |

(Continued)

FOREIGN PATENT DOCUMENTS

| | | | | |
|---|---|---|---|---|
| JP | 2008048034 | A | * | 2/2008 |
| JP | 2008-231194 | A | | 10/2008 |
| JP | 2012-507054 | A | | 3/2012 |

(Continued)

OTHER PUBLICATIONS

The extended European search report (EESR) issued on Apr. 8, 2024 in a counterpart European patent application No. 23207420.

(Continued)

*Primary Examiner* — Erika J. Villaluna
(74) *Attorney, Agent, or Firm* — METROLEX IP LAW GROUP, PLLC; Robert L. Scott, Esq.

(57) ABSTRACT

An oil removal method is disclosed that removes an oil for an oil immersion object lens adhering to a smear surface of a smear of a sample. The method may include removing the oil by moving at least one of a first holder holding the smear to be subjected to oil removal or a second holder holding an oil absorption member that absorbs the oil from a separated state where a contact surface of the oil absorption member and the smear surface are positioned away from each other to a contacting state where the smear surface and the contact surface are in contact with each other, and moving at least one of the first holder or the second holder from the contacting state to the separated state after removing the oil.

16 Claims, 23 Drawing Sheets

(56) References Cited

U.S. PATENT DOCUMENTS

2020/0183141 A1    6/2020  Ohrt et al.

FOREIGN PATENT DOCUMENTS

| | | | |
|---|---|---|---|
| JP | 5215474 | B2 | 6/2013 |
| JP | 2018-017691 | A | 2/2018 |
| NL | 1008782 | C1 | 10/1999 |
| WO | 2021/102984 | A1 | 6/2021 |

OTHER PUBLICATIONS

The Communication pursuant to Article 94(3) EPC issued on May 21, 2025 in a counterpart European patent application No. 23207420.

* cited by examiner

SECOND ANGULAR POSITION
R2 (PERPENDICULAR)

FIRST ANGULAR POSITION
R1 (HORIZONTAL)

(A) SEPARATED STATE     (B) CONTACTING STATE     (C) SEPARATED STATE

PRIMARY REMOVAL OPERATION (D) CONTACTING STATE     (E) SEPARATED STATE

SECONDARY REMOVAL OPERATION (×3)

PROCESS OF
CONTROLLING TESTING SYSTEM

FIG.28

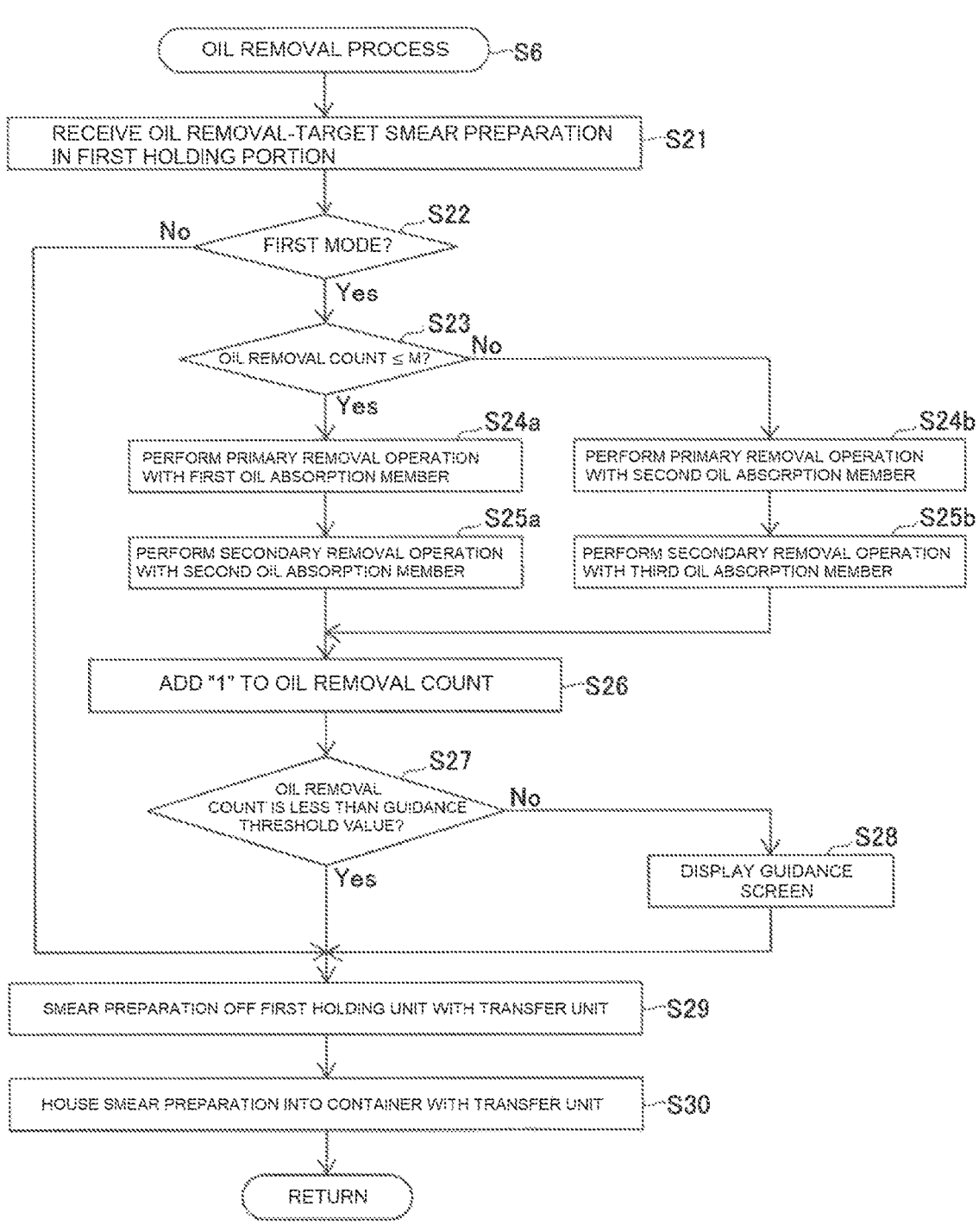

OIL REMOVAL PROCESS

OIL REMOVAL PROCESS — S6

RECEIVE OIL REMOVAL-TARGET SMEAR PREPARATION IN FIRST HOLDING PORTION — S21

FIRST MODE? — S22
No

Yes

OIL REMOVAL COUNT ≤ M? — S23
No

Yes

PERFORM PRIMARY REMOVAL OPERATION WITH FIRST OIL ABSORPTION MEMBER — S24a

PERFORM PRIMARY REMOVAL OPERATION WITH SECOND OIL ABSORPTION MEMBER — S24b

PERFORM SECONDARY REMOVAL OPERATION WITH SECOND OIL ABSORPTION MEMBER — S25a

PERFORM SECONDARY REMOVAL OPERATION WITH THIRD OIL ABSORPTION MEMBER — S25b

ADD "1" TO OIL REMOVAL COUNT — S26

OIL REMOVAL COUNT IS LESS THAN GUIDANCE THRESHOLD VALUE? — S27
No

Yes

DISPLAY GUIDANCE SCREEN — S28

SMEAR PREPARATION OFF FIRST HOLDING UNIT WITH TRANSFER UNIT — S29

HOUSE SMEAR PREPARATION INTO CONTAINER WITH TRANSFER UNIT — S30

RETURN

FIG. 36

TABLE 1 RESULTS OF OIL REMOVAL TEST

| TEST NO. | LIQUID AMOUNT [μL] | ABSORBED AMOUNT [μL] | RESIDUAL AMOUNT [μL] | DIFFER-ENCE [μL] | REMOVAL OPERATION |
|---|---|---|---|---|---|
| 1A | 51.3 | 46.5 | 4.80 | 2.3 | PRIMARY: 1 TIME (3 SEC), SECONDARY: 1 TIME (3 SEC) |
| 1B | 52.5 | 49.9 | 2.51 | | PRIMARY: 1 TIME (3 SEC), SECONDARY: 3 TIMES (1 SEC × 3) |
| 2A | 53.6 | 47.7 | 5.94 | 1.7 | PRIMARY: 1 TIME (3 SEC), SECONDARY: 1 TIME (3 SEC) |
| 2B | 51.8 | 47.5 | 4.23 | | PRIMARY: 1 TIME (3 SEC), SECONDARY: 3 TIMES (1 SEC × 3) |
| 3A | 52.7 | 48.1 | 4.57 | 1.5 | PRIMARY: 1 TIME (3 SEC), SECONDARY: 1 TIME (3 SEC) |
| 3B | 52.5 | 49.4 | 3.09 | | PRIMARY: 1 TIME (3 SEC), SECONDARY: 3 TIMES (1 SEC × 3) |

OIL REMOVAL METHOD, OIL REMOVER, TRANSPORTER, AND TESTING SYSTEM

CROSS REFERENCE TO RELATED APPLICATIONS

This application claims priority from prior Japanese Patent Application No. 2022-178459, filed on Nov. 7, 2022, the entire contents of which are incorporated herein by reference.

BACKGROUND

The disclosure relates to an oil removal method and an oil remover for removing an oil for an oil immersion object lens adhering to a smear of a sample, and to a transporter and a testing system.

Tests have been performed in which a smear is prepared by smearing a sample such as blood or a body fluid on a glass slide, and the prepared smear is imaged with a microscope to observe the cells in the sample. When the microscopic image is captured, an oil immersion object lens is used which is an object lens with an immersion oil (oil) filled in the gap between the lens and the smear surface of the smear to make the numerical aperture higher than that without the oil and thereby make the observed image clearer. Thus, after the image capturing using the oil immersion object lens, the smear has the oil adhering to the smear surface. The smear after the capturing of the microscopic image is, for example, subjected to examination with a microscope (microscopic examination) by a laboratory technician, a doctor, or the like to directly observe the preparation or stored for later microscopic examination. Microscopic examination and storage of a smear require an operation of removing the oil adhering to the smear. Touching the smear for the oil removal operation may result in the oil adhering to and soiling the operator's hand. Heretofore, xylene has been used to clean smears in order to remove the residual oil as much as possible while also preventing damaging of the smears and attachment of dust. However, since xylene is a deleterious substance, an oil removal method that uses no deleterious substance has been desired from the viewpoint of reducing the environmental burden.

Published Japanese Translation of PCT International Application No. 2012-507054 (Patent Document 1) discloses an analyzer that includes a robot having a handling apparatus which grasps a slide with a biological sample and being movable along x, y, and z axes, and an optical system having a camera, an intermediate optical system, and a front optical system, and that obtains a microscopic image of the biological sample. In the analyzer, an oil pack containing an optical oil is provided, and a drop of the oil is applied to each slide. Patent Document 1 discloses that a squeegee or sponge may be provided in order to remove the oil from the slide after the analysis.

Patent Document 1 suggests a configuration to remove the oil with a squeegee or sponge but does not disclose a specific configuration to achieve oil removal suitable for microscopic examination and storage. An object of the present disclosure is to provide an oil removal method, oil remover, transporter, and testing system that are suitable for microscopic examination and storage.

SUMMARY

Such as is illustrated in FIG. 1A and FIG. 1B, an oil removal method according to one or more embodiments is a method of removing an oil 3 for an oil immersion object lens adhering to a smear surface 1a of a smear 1 of a sample, including: removing the oil by moving at least one of a first holder 10 holding the smear 1 to be subjected to oil removal or a second holder 20 holding an oil absorption member 4 that absorbs the oil 3 from a separated state where a contact surface CS of the oil absorption member 4 and the smear surface 1a are positioned away from each other to a contacting state where the smear surface 1a and the contact surface CS are in contact with each other, to thereby remove the oil 3; and moving at least one of the first holder 10 or the second holder 20 from the contacting state to the separated state after removing the oil 3.

In this manner, it may be possible to bring the oil 3 adhering to the smear surface 1a into contact with the oil absorption member 4 by shifting from the separated state where the contact surface CS of the oil absorption member 4 and the smear surface 1a are positioned away from each other to the contacting state where the smear surface 1a and the contact surface CS are in contact with each other. The absorption of the oil 3 by the oil absorption member 4 enables the oil 3 to move into the oil absorption member 4. Thus, the oil 3 may be effectively removed from the smear surface 1a. Hence, the oil removal method of the present disclosure may perform oil removal suitable for microscopic examination and storage of the smear 1.

Such as is illustrated in FIG. 1A and FIG. 1B, an oil remover 100 according to one or more embodiments is an apparatus for removing the oil 3 for an oil immersion object lens adhering to a smear surface 1a of the smear 1 of a sample that may include: the first holder 10 that holds the smear 1 to be subjected to oil removal; the second holder 20 that holds the oil absorption member 4 that absorbs the oil 3; and a movement mechanism 30 that moves at least one of the first holder 10 or the second holder 20 so as to shift from a separated state where the contact surface CS of the oil absorption member 4 and the smear surface 1a are positioned away from each other to a contacting state where the smear surface 1a and the contact surface CS are in contact with each other.

In this manner, it may be possible to bring the oil 3 adhering to the smear surface 1a into contact with the oil absorption member 4 by shifting from the separated state where the contact surface CS of the oil absorption member 4 and the smear surface 1a are positioned away from each other to the contacting state where the smear surface 1a and the contact surface CS are in contact with each other. The absorption of the oil 3 by the oil absorption member 4 may move the oil 3 into the oil absorption member 4. Thus, the oil 3 is effectively removed from the smear surface 1a. Hence, the oil remover 100 of the present disclosure may perform oil removal suitable for microscopic examination and storage of the smear 1.

Such as is illustrated in FIG. 4, a container transporter 130 according to one or more embodiments may include: the oil remover 100 according to one or more embodiments described above; a smear transfer unit 141 that transfers the smear 1; and a container transport path 131 that transports a container 5 configured to be capable of storing the smears 1. The smear transfer unit 141 is configured to, for each of the smears 1, picks up the smear 1 from the first holder 10 after the oil 3 is removed by the oil remover 100, and store the smear 1 picked up from the first holder 10 into the container 5.

In this manner, the oil remover 100 according to one or more embodiments may perform oil removal suitable for microscopic examination and storage of the smear 1. Moreover, since the container 5 stores the oil-removed smear 1, the oil 3 is prevented from adhering to an inner surface of the container 5. Therefore, the smear 1 may be stored in an appropriate oil removed state and also the burden of the operation of cleaning the container 5 may be reduced.

As illustrated in FIG. 4, a testing system 200 according to one or more embodiments is a testing system that may include: the oil remover 100 according to one or more embodiments; a smear preparing unit 110 that prepares the smear 1 including a glass slide and a sample smeared on the glass slide, and stores the prepared smear 1 into the container 5 configured to be capable of storing the smears 1; a container transporter 130 that receives the container 5 from the smear preparing unit 110 and transports the smear 1 stored in the container 5; and a smear imaging unit 150 that supplies the oil 3 onto the smear surface 1*a* of the smear 1 transported from the container transporter 130 and images the smear 1 with an oil immersion object lens. The container transporter 130 is configured to receive the imaged smear 1 from the smear imaging unit 150, remove the oil 3 with the oil remover 100, and then store the smear 1 into container 5.

Therefore, the oil remover 100 according to one or more embodiments may perform oil removal suitable for microscopic examination and storage of the smear 1. Moreover, since the container 5 stores the oil-removed smear 1, the oil 3 is prevented from adhering to the inner surface of the container 5. Thus, the smear 1 may be stored in an appropriate oil removed state and also the burden of the operation of cleaning the container 5 may be reduced.

One or more embodiments may provide an oil removal method, oil remover, transporter, and testing system that may be suitable for microscopic examination and storage.

BRIEF DESCRIPTION OF DRAWINGS

FIG. 28 is a diagram illustrating a flowchart of an oil removal process;

FIG. 36 is a diagram illustrating a test results.

DETAILED DESCRIPTION

A description is given below with reference to the drawings.

Overview of Oil Remover

Figure 1A:
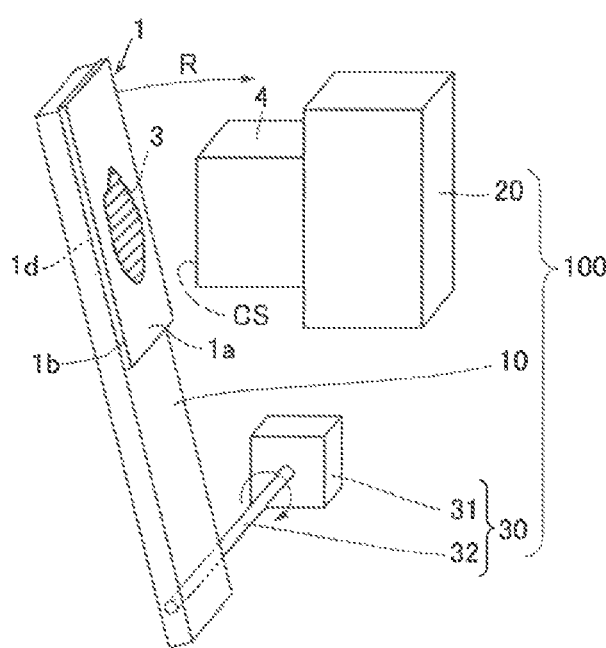
FIG. 1A and FIG. 1B are diagrams illustrating an overview of an oil remover.
Figure 1B:
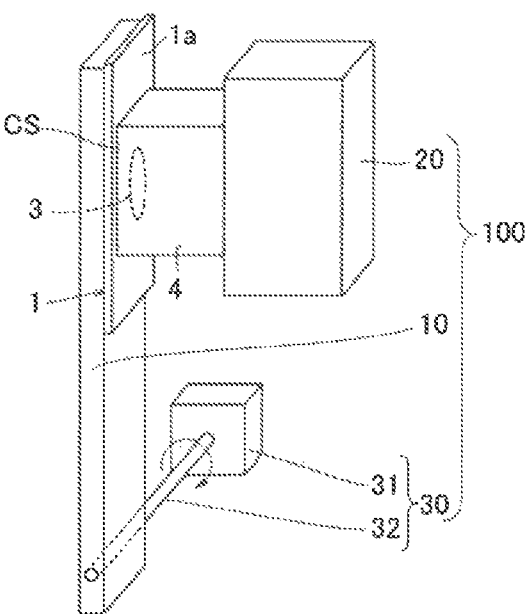

An overview of an oil remover 100 is described with reference to FIG. 1A and FIG. 1B. FIG. 1A and FIG. 1B are diagrams illustrating an overview of an oil remover according to a first example. FIG. 1A is a diagram illustrating the oil remover 100 according to a first example in a separated state. FIG. 1B is a diagram illustrating the oil remover 100 according to a first example in a contacting state. The oil remover 100 according to a first example is an apparatus for removing an oil 3 for an oil immersion object lens adhering to a smear surface 1a of a smear 1 of a sample.

Smear and Oil

Figures 2, 3:
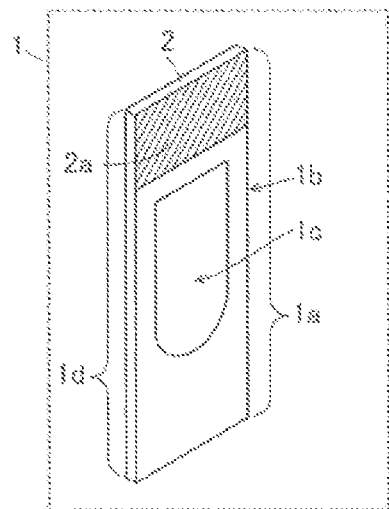
FIG. 2 is a diagram illustrating an overview of an oil remover.
FIG. 3 is a diagram illustrating a perspective view of a smear.

As illustrated in FIG. 3, the smear 1 is a glass slide 2 being a rectangular plate member made of glass with a sample smeared thereon and processed as a smear. A smear refers to a sample processed into a microscopically observable state. The smear 1 has the smear surface 1a to smear a sample. The smear surface 1a is one surface of the glass slide 2. A sample is smeared on a center portion 1c of the smear surface 1a situated inward of its outer peripheral edge 1b. The sample is a subject's blood but is not limited to blood. The opposite surface of the glass slide 2 is a back surface 1d where the sample is not smeared. A frosted portion 2a as a region to print later-described identification information is provided at an upper portion of the smear surface 1a of the glass slide 2 which is one end portion in the longitudinal direction (the hatched portion). The frosted portion 2a is a region processed to be printable with ink by coating the glass surface with a synthetic resin. The smear 1 is supplied to a smear imaging apparatus, which captures a microscopic image of the smear (hereinafter referred to as "smear image").

An oil immersion object lens is used when the smear image is captured. The oil immersion object lens is an object lens with an immersion oil (hereinafter referred to as "oil") filled in a gap between the lens and the smear surface 1a to make the numerical aperture higher than that without the oil and thereby make the observed image clearer. Thus, after the imaging with the oil immersion object lens, the smear 1 has the oil 3 adhering to the smear surface 1a, as illustrated in FIG. 1A.

The smear after the imaging is, for example, subjected to examination with a microscope (microscopic examination) in which a laboratory technician, a doctor, etc. directly observes the smear, or stored for later microscopic examination. When microscopic examination is to be performed without an oil immersion object lens, the oil 3 adhering to the smear 1 needs to be removed prior to the microscopic examination. It is also not appropriate to store the smear 1 with the oil 3 adhering thereto.

This oil 3 usually needs to be wiped off using xylene when manually removed. The fact that xylene is a deleterious substance requiring careful attention for its use and management makes the operation of removing the oil 3 complicated.

The oil remover 100 is configured to automatically perform a process of removing the oil 3 adhering to the smear surface 1a of the smear 1. The oil remover 100 removes the oil 3 adhering to the smear surface 1a without using xylene, which is a deleterious substance, by a method involving absorbing the oil 3 into an oil absorption member 4.

As illustrated in FIG. 1A and FIG. 1B, the oil remover 100 includes a first holder 10, a second holder 20, and a movement mechanism 30.

The first holder 10 is configured to hold a smear 1 to be subjected to oil removal. The first holder 10 holds the smear 1 with the oil 3 adhering to the smear surface 1a.

The second holder 20 is configured to hold the oil absorption member 4, which absorbs the oil 3. The second holder 20 holds the oil absorption member 4 with a contact surface CS of the oil absorption member 4 exposed such that the oil absorption member 4 may contact the smear surface 1a of the smear 1. Of the surfaces of the oil absorption member 4, the surface to be brought into contact with the smear surface 1a is the contact surface CS.

The oil absorption member 4 is a member configured to absorb the oil 3 by contacting the oil 3. The oil absorption member 4 is, for example, a porous member. The porous member is a member having a structure in which many micropores are formed, and takes a liquid (the oil 3 in this example) into the micropores and holds the liquid taken in.

The movement mechanism 30 is configured to move the first holder 10 and the second holder 20 relative to each other. The movement mechanism 30 includes a driving source for the relative movement of the first holder 10 and the second holder 20. The driving source is, for example, a motor 31. In the example of FIG. 1A and FIG. 1B, a single driving source configured to move the first holder 10 is provided, but two or more driving sources may be provided.

The movement mechanism 30 is configured to move the first holder 10 so as to shift from a separated state where the contact surface CS of the oil absorption member 4 and the smear surface 1a are positioned away from each other (see FIG. 1A) to a contacting state where the smear surface 1a and the contact surface CS are in contact with each other (see FIG. 1B).

In FIG. 1A and FIG. 1B, the movement mechanism 30 is coupled to the first holder 10 via a rotation shaft 32, and pivots the first holder 10 about the rotation shaft 32 with the motor 31. The first holder 10 holds the smear 1 at a position spaced from the rotation shaft 32 by a predetermined distance. With the pivotal movement of the first holder 10, the smear 1 moves so as to turn in an R direction about the rotation shaft 32. The second holder 20 holds the oil absorption member 4 on a path of movement of the smear 1.

FIG. 1A illustrates the separated state where the contact surface CS and the smear surface 1a are separated from each other. In the separate state, the contact surface CS and the smear surface 1a are out of contact with each other. In response to the movement mechanism 30 pivoting the first holder 10 about the rotation shaft 32 with the motor 31 from the separated state, the smear 1 moves in the R direction about the rotation shaft 32, so that the smear 1 gets closer to the oil absorption member 4. As a result of the pivotal movement, the smear surface 1a of the smear 1 comes into contact with the contact surface CS (see FIG. 1B).

FIG. 1B illustrates the contacting state where the smear surface 1a and the contact surface CS are in contact with each other. The smear surface 1a is brought into contact with the contact surface CS by a driving force from the motor 31 of the movement mechanism 30. The oil 3 adhering to the smear surface 1a gets absorbed into the oil absorption member 4 from the contact surface CS.

The movement mechanism 30 pivots the first holder 10 in an opposite direction about the rotation shaft 32 with the motor 31. As a result, as illustrated in FIG. 1A, the smear surface 1a and the contact surface CS get separated from each other, shifting to the separated state from the contacting state.

The movement mechanism 30 may be configured to move at least one of the first holder 10 or the second holder 20 to shift from the separated state where the contact surface CS of the oil absorption member 4 and the smear surface 1*a* are separated from each other to the contacting state where the smear surface 1*a* and the contact surface CS are in contact with each other. The distance of separation between the contact surface CS and the smear surface 1*a* in the separated state is not particularly limited and may be set to be longer or shorter than the distance of separation illustrated in FIG. 1A.

Overview of Oil Removal Method

An overview of an oil removal method using the oil remover 100 according to a first example is described. The oil removal method is a method of removing the oil 3 for an oil immersion object lens adhering to the smear surface 1*a* of the smear 1 of a sample, and includes the following a step (1A) and a step (2A).

Step (1A) Moving the first holder 10 holding the smear 1 to be subjected to oil removal to the second holder 20 holding the oil absorption member 4, which absorbs the oil 3, from the separated state where the contact surface CS of the oil absorption member 4 and the smear surface 1*a* are positioned away from each other (see FIG. 1A) to the contacting state where the smear surface 1*a* and the contact surface CS are in contact with each other (see FIG. 1B), to thereby remove the oil 3.

Step (2A) Moving at least one of the first holder 10 or the second holder 20 from the contacting state (see FIG. 1B) to the separated state (see FIG. 1A) after removing the oil 3.

In the step (1A), in the example of FIG. 1A and FIG. 1B, the movement mechanism 30 moves the first holder 10 holding the smear 1 in the R direction toward the oil absorption member 4 fixed to the second holder 20 to thereby bring the smear surface 1*a* and the contact surface CS into contact with each other.

In the step (2A), in the example of FIG. 1A and FIG. 1B, the movement mechanism 30 moves the first holder 10 holding the smear 1 in a direction away from the oil absorption member 4 fixed to the second holder 20 (opposite to the R direction) to thereby separate the smear surface 1*a* and the contact surface CS from each other.

As described above, the oil remover 100 and the oil removal method may bring the oil 3 adhering to the smear surface 1*a* into contact with the oil absorption member 4 by shifting from the separated state where the contact surface CS of the oil absorption member 4 and the smear surface 1*a* are positioned away from each other to the contacting state where the smear surface 1*a* and the contact surface CS are in contact with each other. The absorption of the oil 3 by the oil absorption member 4 moves the oil 3 into the oil absorption member 4. Thus, the oil 3 is effectively removed from the smear surface 1*a*. Accordingly, oil removal suitable for microscopic examination and storage of the smear 1 may be performed.

At least one of the first holder 10 or the second holder 20 may be moved from the separated state to the contacting state to remove the oil 3. Also, at least one of the first holder 10 or the second holder 20 may be moved from the contacting state to the separated state after removing the oil 3.

Overview of Another Oil Remover

FIG. 2 is a diagram illustrating an overview of the oil remover 100 according to a second example. The oil remover 100 includes the first holder 10, a second holder 20*a*, a second holder 20*b*, and the movement mechanism 30.

In the oil remover 100, the second holder 20*a* and the second holder 20*b* are configured to hold two of an oil absorption member 4*a* and an oil absorption member 4*b* as the oil absorption member 4 that absorbs the oil 3, respectively. In the example of FIG. 2, the second holder 20*a* holds the oil absorption member 4*a* and the second holder 20*b* holds the oil absorption member 4*b*, and the two of the oil absorption member 4*a* and the oil absorption member 4*b* are held with a gap therebetween in a direction X.

The movement mechanism 30 is configured to move the first holder 10 so as to bring the smear surface 1*a* of a single smear 1 into and out of contact with each of the two of the oil absorption member 4*a* and the oil absorption member 4*b*. In FIG. 2, the movement mechanism 30 moves the first holder 10. The movement mechanism 30 includes a motor 31 that pivots the first holder 10 about a rotation shaft 32 and additionally a motor 41 that moves the first holder 10 in an X direction.

By moving the first holder 10, the movement mechanism 30 moves the smear surface 1*a* of the smear 1 into the contacting state with the first oil absorption member 4*a*, thereby removing the oil 3, and moves the smear surface 1*a* into the separated state after removing the oil 3. Specifically, with the motor 41, the movement mechanism 30 moves the first holder 10 in the X direction so as to align the position of the smear 1 in the X direction with the arranged position of the first oil absorption member 4*a*. Then, with the motor 31, the movement mechanism 30 brings the smear surface 1*a* of the smear 1 into and out of contact with the first oil absorption member 4*a*. The operation of moving the smear surface 1*a* into a contacting state with and a separated state from the first oil absorption member 4*a* is similar to FIG. 1A and FIG. 1B. By moving the smear surface 1*a* into the contacting state with and the separated state from the first oil absorption member 4*a*, a primary removal operation is performed on the oil 3 adhering to the smear surface 1*a*. This primary removal operation absorbs most of the oil 3 into the first oil absorption member 4*a*.

After separating the smear surface 1*a* of the smear 1 from the first oil absorption member 4*a*, the movement mechanism 30 moves the first holder 10 so as to move the smear surface 1*a* into a contacting state with the second oil absorption member 4*b*, thereby removing the oil 3, and move the smear surface 1*a* into a separated state after removing the oil 3. Specifically, with the motor 41, the movement mechanism 30 moves the first holder 10 in the X direction so as to align the position of the smear 1 in the X direction with the arranged position of the second oil absorption member 4*b*. Then, with the motor 31, the movement mechanism 30 moves the smear surface 1*a* of the smear 1 into a contacting state with and a separated state from the second oil absorption member 4*b*. By moving the smear surface 1*a* into the contacting state with and the separated state from the second oil absorption member 4*b*, a secondary removal operation is performed on the oil 3 adhering to the smear surface 1*a*. This secondary removal operation absorbs the oil 3 left unremoved in the primary removal operation and remaining on the smear surface 1*a* into the second oil absorption member 4*b*.

The movement mechanism 30 may be configured to bring the smear surface 1*a* of a single smear 1 into a contacting state with and a separated state from each of two or more oil absorption members 4 by moving at least one of the first holder 10 or the second holder 20*a* and the second holder 20*b*.

Overview of Another Oil Removal Method

An oil removal method using the oil remover 100 according to a second example is described. The oil removal method is a method of removing the oil 3 for an oil immersion object lens adhering to the smear surface 1a of a smear 1 of a sample, and includes the following a step (1B) and a step (2B).

Step (1B): Moving the first holder 10 holding the smear 1 to be subjected to oil removal to the second holder 20 holding the oil absorption member 4, which absorbs the oil 3, into the contacting state where the smear surface 1a and the first oil absorption member 4a are in contact with each other, to thereby remove the oil 3, and moving the first holder 10 from the contacting state into the separated state where the smear surface 1a and the first oil absorption member 4a are positioned away from each other after removing the oil 3.

Step (2B): After moving the first holder 10 into the separated state, moving the first holder 10 into the contacting state where the smear surface 1a and the second oil absorption member 4b are in contact with each other to thereby remove the oil 3, and moving the first holder 10 from the contacting state into the separated state where the smear surface 1a and the second oil absorption member 4b are positioned away from each other after removing the oil 3.

In the step (1B), in the example of FIG. 2, a primary removal operation is performed including a process in which the movement mechanism 30 drives the motor 41 so as to align the position, in the X direction, of the smear 1 held by the first holder 10 with the position of the first oil absorption member 4a, and a process in which the movement mechanism 30 drives the motor 31 so as to move the smear surface 1a of the smear 1 held by the first holder 10 into the contacting state with and the separated state from the first oil absorption member 4a.

In the step (2B), in the example of FIG. 2, a secondary removal operation is performed including a process in which the movement mechanism 30 drives the motor 41 so as to align the position, in the X direction, of the smear 1 held by the first holder 10 with the position of the second oil absorption member 4b, and a process in which the movement mechanism 30 drives the motor 31 so as to move the smear surface 1a of the smear 1 held by the first holder 10 into the contacting state with and the separated state from the second oil absorption member 4b.

As described above, the oil remover 100 and the oil removal method move the smear surface 1a of a single smear 1 into a contacting state with and a separated state from two or more oil absorption members 4 in turn. In this manner, when bringing the smear surface 1a into contact with the oil absorption member 4 once is not sufficient to completely absorb the oil 3 and the oil 3 remains on the smear surface 1a, the residual oil 3 may be additionally absorbed into another oil absorption member 4 by bringing the smear surface 1a and a first oil absorption member 4 into a separated state and then bringing the smear surface 1a into a contacting state with the other oil absorption member 4. While most of the oil 3 adhering to the smear surface 1a is absorbed by a first one of the oil absorption members 4 (first oil absorption member 4a), the absorption of the oil 3 lowers its ability to absorb the oil 3 at least temporarily. Thus, a second one of the oil absorption members 4 (second oil absorption member 4b), which is different from the oil absorption member 4 that absorbed the oil 3 in the first contact, is brought into contact with the smear surface 1a. In this way, the oil 3 remaining on the smear surface 1a is effectively removed by the second one of the oil absorption members 4 (second oil absorption member 4b), whose ability to absorb the oil 3 has not dropped as compared to the first one of the oil absorption members 4. Therefore, oil removal becomes suitable for microscopic examination and storage of the smear 1 without using xylene.

The smear surface 1a of a single smear 1 and the first oil absorption member 4a may be brought into a contacting state and a separated state by moving at least one of the first holder 10 or the second holder 20. The smear surface 1a of the smear 1 and the second oil absorption member 4b may be brought into a contacting state and a separated state by separating the smear surface 1a from the first oil absorption member 4a and then moving at least one of the first holder 10 or the second holder 20.

In FIG. 1A, FIG. 1B, and FIG. 2, the movement mechanism 30 moves the first holder 10 so as to shift from a separated state into a contacting state and from the contacting state into the separated state. The second holder 20 is fixed. In this way, the apparatus configuration is simpler than a configuration that moves both of the first holder 10 and the second holder 20.

The movement mechanism 30 may move the second holder 20 so as to shift from a separated state into a contacting state and from the contacting state into the separated state. In this case, the first holder 10 may be fixed.

VARIATIONS

Overview of Testing System

A testing system 200 representing an application example of an oil remover 100 according to one or more embodiments is described with reference to FIGS. 4 to 26.

Testing System

Figure 4:
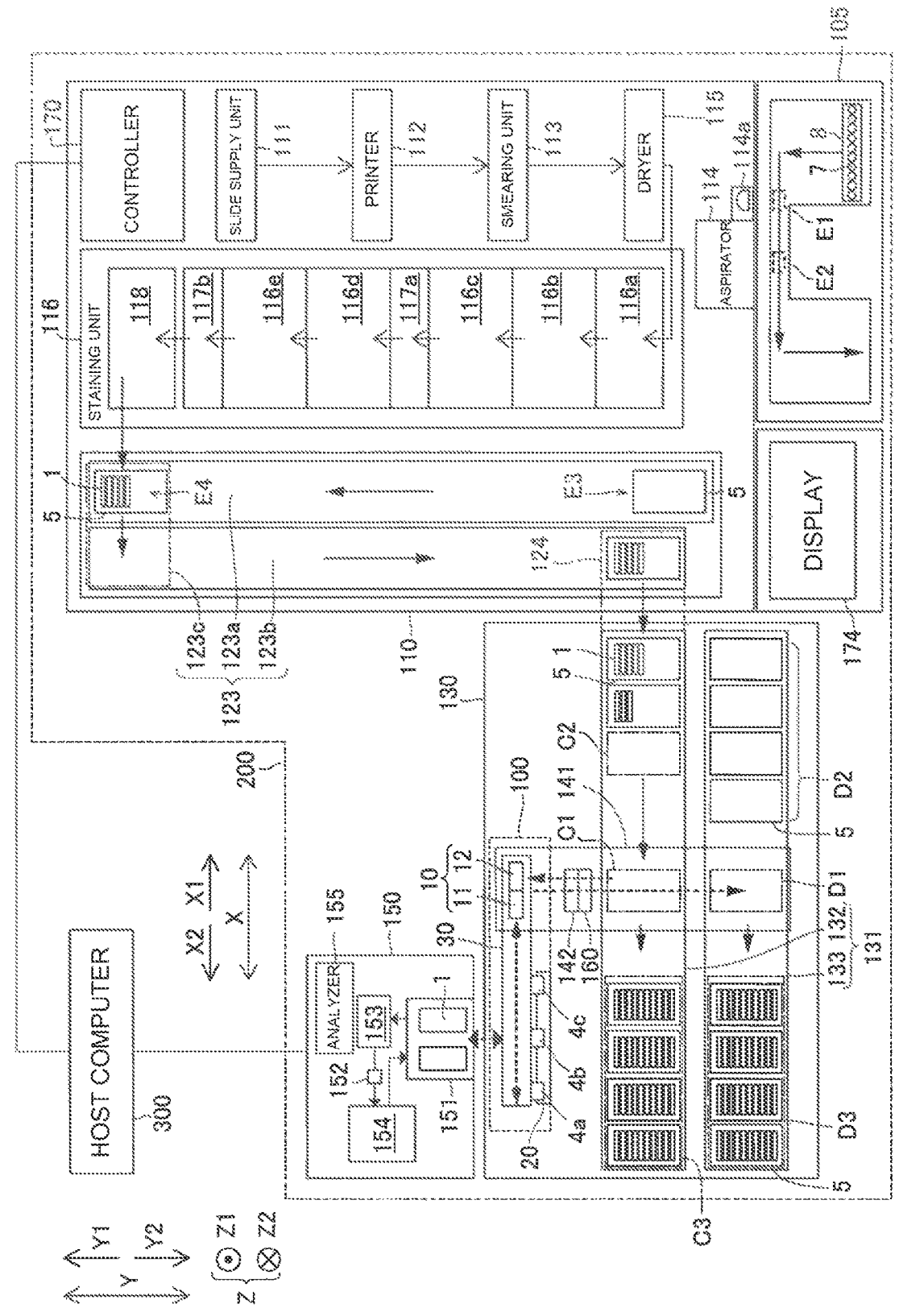
FIG. 4 is an explanatory diagram illustrating a plan view of a testing system representing an application example of an oil remover.

As illustrated in FIG. 4, the testing system 200 includes a smear preparing unit 110, a container transporter 130, and a smear imaging unit 150. At the smear preparing unit 110, the smear 1 is prepared and the prepared smear 1 is stored in the container 5. The container 5 storing the smear 1 is transported from the smear preparing unit 110 to the container transporter 130. The container transporter 130 supplies each smear 1 in the container 5 transported from the smear preparing unit 110 to the smear imaging unit 150. At the smear imaging unit 150, the oil 3 is supplied to the smear surface 1a of the smear 1 supplied from the container transporter 130 and a microscopic image of the smear 1 is captured with an oil immersion object lens. After the imaging, the smear 1 is returned to the container transporter 130 from the smear imaging unit 150. At the container transporter 130, the smear 1 is subjected to oil removal and then stored in the container 5 for storing the imaged smear 1. With the smear preparing unit 110, the container transporter 130, and the smear imaging unit 150, the testing system 200 may automatically perform a series of operations from the preparation of a smear 1 on which a sample is smeared to the imaging of the sample.

The oil remover 100 is provided to the container transporter 130. The oil remover 100 receives a smear 1 with the oil 3 adhering thereto from the smear imaging unit 150 and removes the oil 3 adhering to the smear 1 before the smear 1 is stored in the container 5. In addition to the function of removing the oil 3 adhering to the smear 1, the oil remover 100 has a function of passing the smear 1 between the smear imaging unit 150 and the container transporter 130.

A description is given herein with an X direction, a Y direction, and a Z direction illustrated in FIG. 4 as a left-right direction, a front-rear direction, and an up-down direction, respectively. Also, a Y2 side and a Y1 side in FIG. 4 are a front side and a rear side, respectively. Specifically, in the testing system 200, the smear preparing unit 110 is positioned to the right of the container transporter 130, and the smear imaging unit 150 is positioned behind the container transporter 130. The container transporter 130 is positioned with a part thereof facing the front side of the smear imaging unit 150. The terms "transverse" and "longitudinal" may be used herein to denote the left-right direction and the front-rear direction, respectively.

Figure 5:
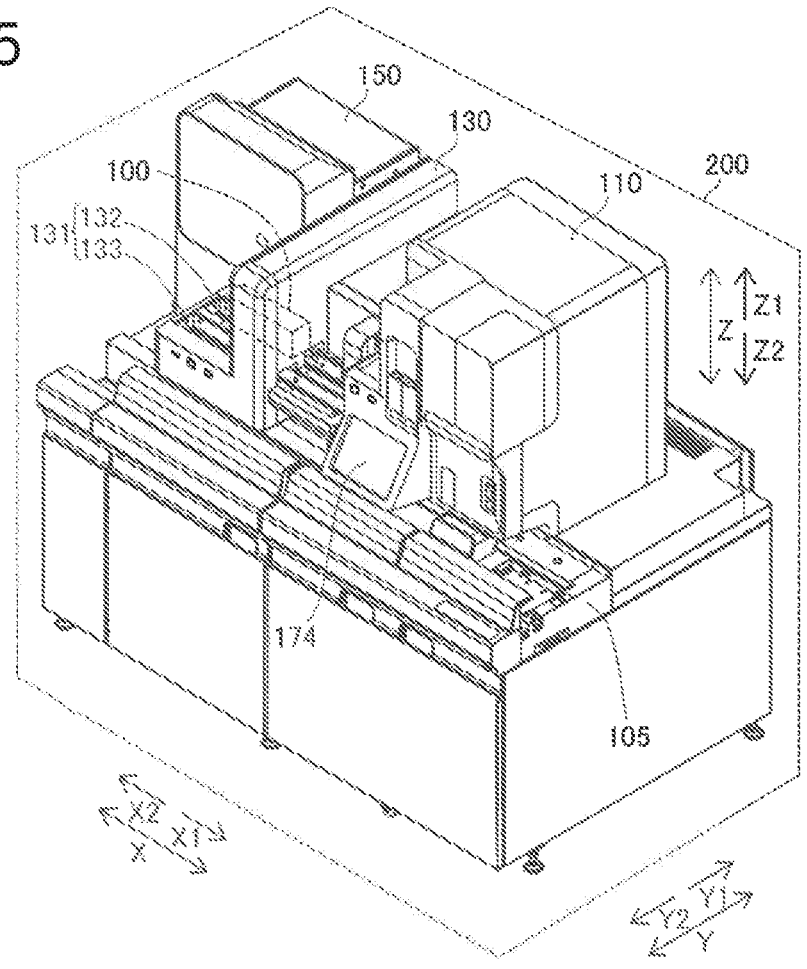
FIG. 5 is an explanatory diagram illustrating a perspective view of a testing system.

As illustrated in FIG. 5, the smear preparing unit 110, the container transporter 130, and the smear imaging unit 150 are each stored in a different housing. The oil remover 100 is stored in the housing of the container transporter 130. Instead of the configuration of FIG. 5, the testing system 200 may be configured as a single testing apparatus with the smear preparing unit 110, the container transporter 130, and the smear imaging unit 150 stored in a single housing.

Smear Preparing Unit

As illustrated in FIG. 4, the smear preparing unit 110 prepares the smear 1 by smearing a subject's sample, which is blood, on a glass slide 2 (see FIG. 3) and performing a process such as drying and staining on the sample. The smear preparing unit 110 stores the prepared smear 1 in the container 5 configured to store smears 1. Not only the glass slide 2 having completed a smear preparing process in the smear preparing unit 110 but also the glass slide 2 before completing the smear preparing process are referred to herein as "the smear 1".

The smear preparing unit 110 includes a slide supply unit 111, a printer 112, a smearing unit 113, an aspirator 114, a dryer 115, a staining unit 116, a drying tank 118, a transfer unit 119 (see FIG. 7), and a transporter 123. The smear preparing unit 110 further includes a fluid circuit 121 that supplies a stain and a clean to the staining unit 116 and discharge the stain and clean (see FIG. 7), and a controller 170 that controls the operation of the transfer unit 119.

The slide supply unit 111 accommodates unused glass slides 2 before being smeared with samples. The slide supply unit 111 supplies the glass slide 2 yet to be smeared to the printer 112 one by one. The printer 112 prints various pieces of information on the frosted portion 2a (see FIG. 3) of each glass slide 2. An example of the information to be printed on the frosted portion 2a includes a sample identifying information and imaging necessity identifying information. The sample identifying information is information for identifying a sample, such as the sample's number, date, receipt number, and the subject's name. The imaging necessity identifying information is information for identifying whether the sample is an imaging target for the smear imaging unit 150. Whether the sample is an imaging target or not may be input to a host computer 300 in advance at the time of accepting a test. The printer 112 supplies the printed glass slide 2 to the smearing unit 113.

The aspirator 114 aspirates a sample in a sample container 7 transported by a sample transporter 105. The sample transporter 105 transports a sample rack 8 holding sample containers 7 so as to sequentially transport the sample containers 7 held on the sample rack 8 to a reading position E1 and then sequentially transport the sample containers 7 to an aspiration position E2. The sample rack 8 holds the sample containers 7 aligned in a predetermined direction. Each sample container 7 is given a barcode in which an identification (ID) for identifying a sample is recorded, and the ID is read at the reading position E1 by an ID reader 114a. The ID reader 114a includes an optical barcode reader. The aspirator 114 aspirates the sample out of the sample container 7 transported to the aspiration position E2 and supplies the aspirated sample to the smearing unit 113.

The smearing unit 113 smears the sample aspirated by the aspirator 114 onto the center portion 1c (see FIG. 3) of the glass slide 2 sent from the printer 112. The smearing unit 113 supplies the smear 1 after the smearing process to the dryer 115.

The dryer 115 has a function of receiving the smear 1 with a sample smeared thereon from the smearing unit 113 and drying the sample smeared on the center portion 1c (see FIG. 3).

The staining unit 116 performs a staining process and a cleaning process on the smear 1 with the sample smeared thereon after the drying by the dryer 115. A drying process is then performed in the drying tank 118. After the staining of the smear 1, the stained smear 1 is sent to the transporter 123. The transfer unit 119 (see FIG. 7) performs the transfer of the smear 1 among the dryer 115, the staining unit 116, the drying tank 118, and the transporter 123.

The staining unit 116 performs a staining process of staining the sample smeared on the smear 1 with a staining solution, and a cleaning process of cleaning the sample with cleaning liquid. The staining unit 116 includes a staining tank 116a, a staining tank 116b, a staining tank 116c, and a staining tank 116e and a cleaning tank 117a and a cleaning tank 117b.

Figure 7:
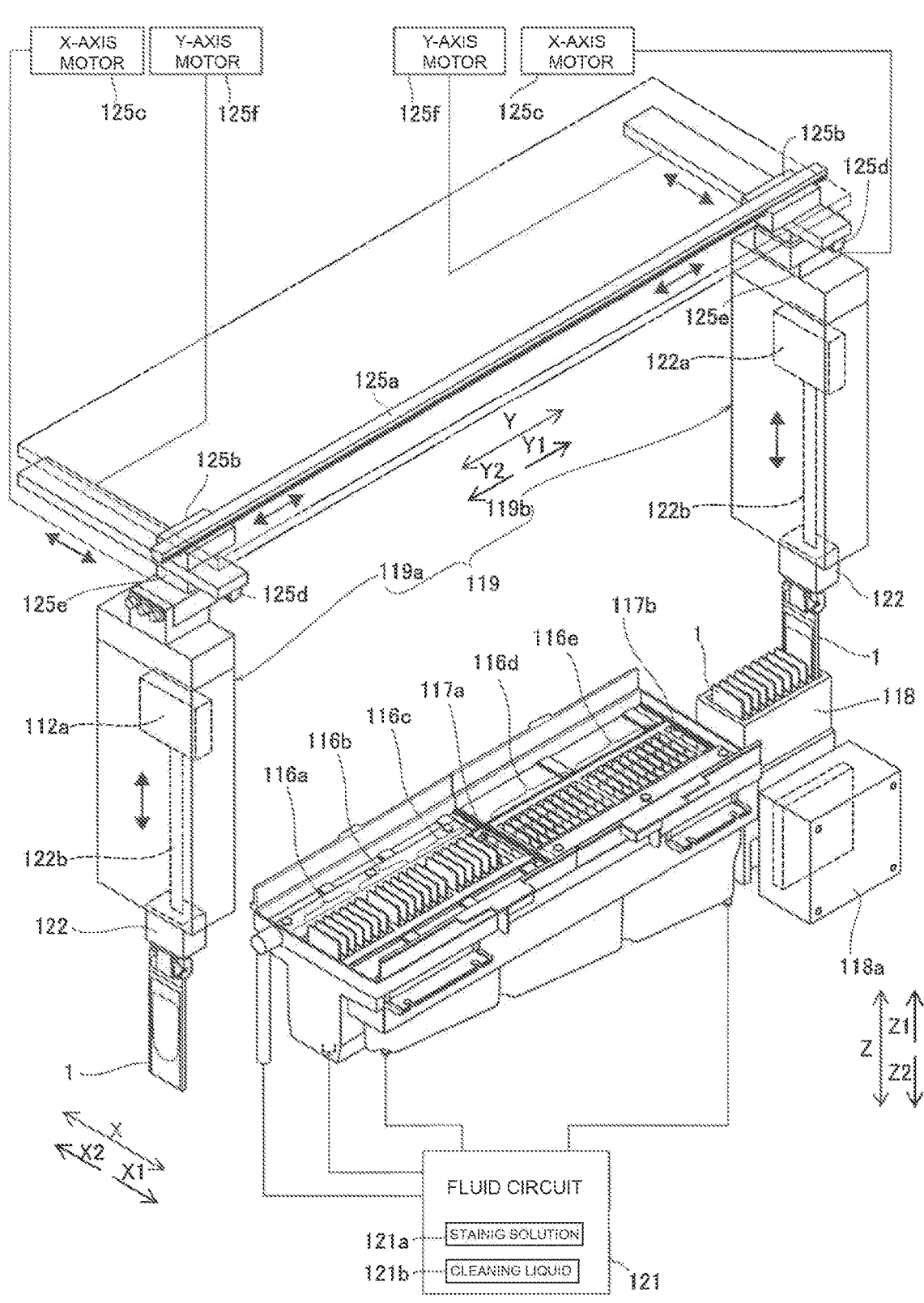
FIG. 7 is an explanatory diagram illustrating a perspective view of a staining tank in a smear preparing unit and a transfer unit.

As illustrated in FIG. 7, each of the staining tank 116a, staining tank 116b, staining tank 116c, and staining tank 116e is formed in a container shape having a recessed internal space with an open top, and holds a staining solution 121a inside so that the smear 1 with a sample smeared thereon may be immersed in the staining solution 121a. Each of the cleaning tank 117a and the cleaning tank 117b is also formed in a container shape and holds a cleaning liquid 121b inside so that the stained smear 1 may be immersed in the cleaning liquid 121b. In the smear preparing unit 110, three of the staining tank 116a, the staining tank 116b, and the staining tank 116c, the cleaning tank 117a, two of the staining tank 116d and the staining tank 116e, and the cleaning tank 117b are positioned in this order along the Y direction, and these tanks are formed integrally with one another from a synthetic resin as a constituent part of the staining unit 116.

The staining tank 116a, the staining tank 116b, the staining tank 116c, the staining tank 116d, and the staining tank 116e and the cleaning tank 117a and the cleaning tank 117b are provided with partitions inside. The smear 1 is inserted between adjacent partitions in such an orientation as to stand along the Z direction inside each tank.

The transfer unit 119 is configured to grasp and transfer the smear 1. The transfer unit 119 is configured to be capable of putting the smear 1 into and out of the staining tank 116a, the staining tank 116b, the staining tank 116c, the staining tank 116d, and the staining tank 116e and the cleaning tank 117a and the cleaning tank 117b one by one.

The transfer unit 119 includes a first transfer unit 119a and a second transfer unit 119b. The first transfer unit 119a and the second transfer unit 119b are both positioned to be higher (Z1 side) than the staining tank 116a, the staining tank 116b, the staining tank 116c, the staining tank 116d, and the staining tank 116e and the cleaning tank 117a and the cleaning tank 117b. The first transfer unit 119a and the second transfer unit 119b are each movable in the X direction by an X-axis slider 125b engaged with a common X-axis rail 125a and a corresponding X-axis motor 125c. The first transfer unit 119a and the second transfer unit 119b are each movable in the Y direction by a Y-axis rail 125d, a Y-axis slider 125e engaged with the Y-axis rail 125d, and a Y-axis motor 125f. The first transfer unit 119a and the second transfer unit 119b are independently movable in horizontal directions (X and Y directions). A hand unit 122 is movable in the Z direction by a Z-axis motor 122*a* and a transmission mechanism 122*b*. The hand unit 122 is capable of pinching and grasping a single smear 1 in its thickness direction and releasing the grasped smear 1. As the configuration of the transfer unit 119 to individually put the smear 1 in and out, various configurations may be employed other than the above-described configuration.

The drying tank 118 is configured to dry the smear 1 subjected to the staining process and the cleaning process. The drying tank 118 is capable of holding the smear 1 between adjacent partitions in such an orientation as to stand along the Z direction. The drying tank 118 is provided with an air blowing unit 118*a* that sends warm air to the smear 1 held in the drying tank 118.

The smear 1 after the staining process, the cleaning process, and the drying process is transferred to the container 5 placed in the transporter 123 illustrated in FIG. 4 by the transfer unit 119. The transporter 123 is configured to transports the container 5.

Figure 6:
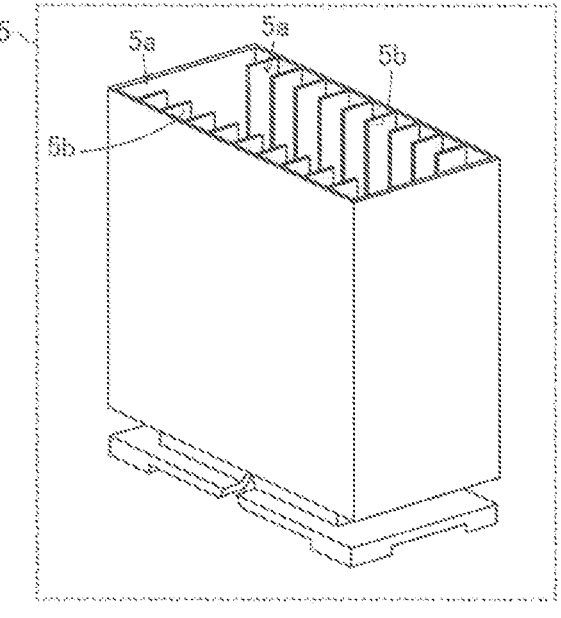
FIG. 6 is an explanatory diagram illustrating a perspective view of a container.

As illustrated in FIG. 6, the container 5 includes storages 5*a* and is configured to be capable of storing the stained smears 1. The container 5 has a box shape with an open top, and partitions 5*b* are provided inside. Each of the storages 5*a* is formed of a space between partitions 5*b* adjacent to each other in the longitudinal direction of the container 5. According to one or more embodiments, the container 5 may store 10 of the smears 1 at maximum.

Referring back to FIG. 4, the transporter 123 includes a loading path 123*a* that may retain and transports the empty containers 5, an unloading path 123*b* that may retain and transports the container 5 accommodating the smears 1, and a transverse feed mechanism 123*c* that sends the container 5 from the loading path 123*a* to the unloading path 123*b*. The loading path 123*a* and the unloading path 123*b* each includes a belt convey or and may transport the container 5 in the Y direction. The transporter 123 is such that, when a user sets the empty container 5 at an introduction position E3 in the loading path 123*a*, the container 5 is automatically transported in the Y1 direction toward a smear storage position E4.

The transfer unit 119 sequentially picks up the smear 1 after the drying process by the drying tank 118 and sequentially stores the smear 1 into the empty storage 5*a* of the container 5 positioned at the smear storage position E4. According to one or more embodiments, the smear 1 is stored into the container 5 one by one. In case that a preset transporting condition is met in the process of sequentially storing the smear 1 into the container 5, the container 5 at the smear storage position E4 is transferred from the loading path 123*a* to the unloading path 123*b* by the transverse feed mechanism 123*c*. The container 5 transferred to the unloading path 123*b* is automatically transported in a Y2 direction. The container 5 transported to the farthest side of the unloading path 123*b* in the Y2 direction is then transferred to the container transporter 130 by a transverse feed unit 124.

Container Transporter

The container transporter 130 is configured to receive the container 5 from the smear preparing unit 110 and transport the smear 1 stored in the container 5. The container transporter 130 includes a container transport path 131 that transports the container 5 storing the smears 1, and a smear transfer unit 141 that picks up the smear 1 stored in the container 5 transported by the container transport path 131 and supplies the picked smear 1 to the smear imaging unit 150. According to one or more embodiments, the container transporter 130 further includes the oil remover 100. That is, the container transporter 130 is a transporting apparatus including the oil remover 100, the smear transfer unit 141, which transfers smear 1, and the container transport path 131, which transports the container 5 configured to be capable of storing the smears 1. The container transporter 130 is configured to receive the imaged smear 1 from the smear imaging unit 150, remove the oil 3 with the oil remover 100, and then store the smear 1 into the container 5. This prevents the oil 3 adhering to the smear 1 from adhering to the inner surface of the container 5. It is therefore possible to store the smear 1 in an oil removed state, which is suitable for microscopic examination, and also reduce the burden of the operation of cleaning the container 5.

Container Transport Path

The container transport path 131 has a first transport path 132 on a Y1 side and a second transport path 133 on a Y2 side. The first transport path 132 and the second transport path 133 each include a belt conveyor including a belt 132*b* (see FIG. 9) and a driving unit 132*a* (see FIG. 9) that drives the belt 132*b*, and are each capable of transporting the container 5 in the X direction.

Figure 8:
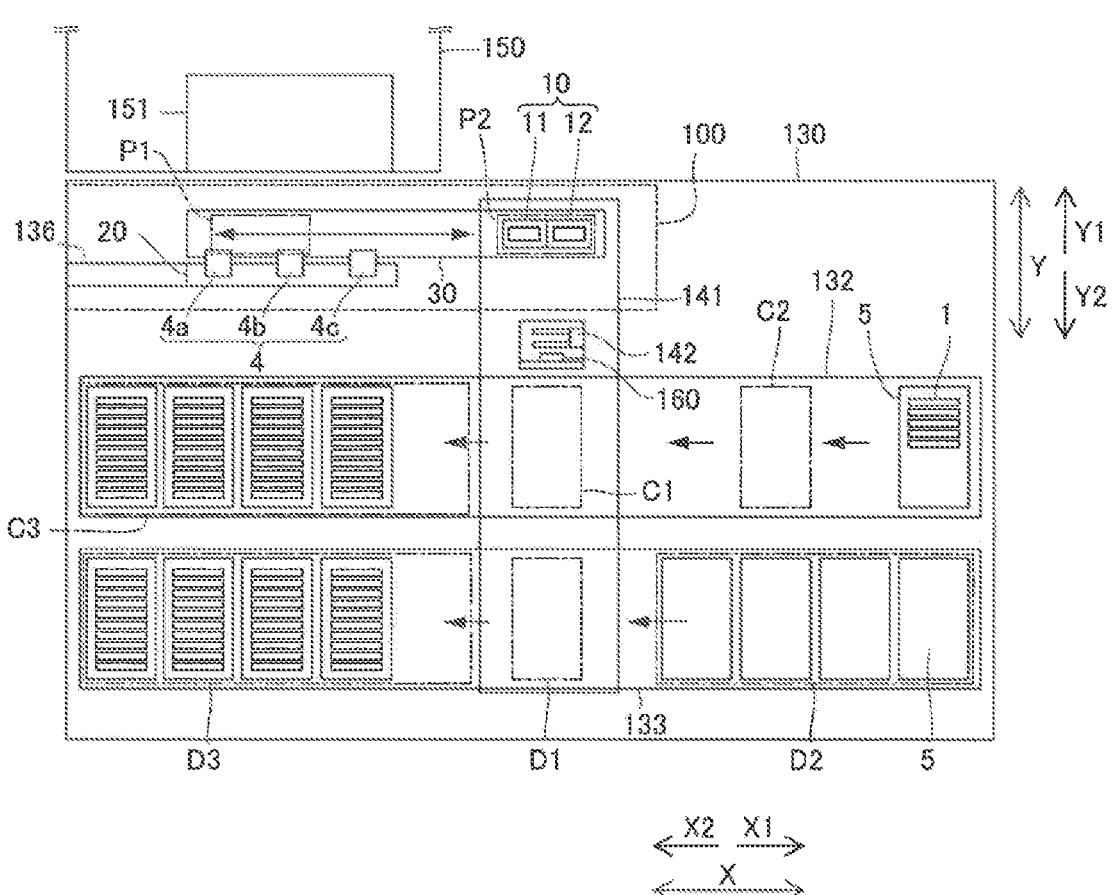
FIG. 8 is an explanatory diagram illustrating a plan view of a container transporter.

As illustrated in FIG. 8, the first transport path 132 includes a wait position C2, a pickup position C1, and a first retention region C3 in this order from an upstream side (X1 side) toward a downstream side (X2 side).

The first transport path 132 is connected to the unloading path 123*b* of the smear preparing unit 110 at the upstream (X1 side) end. Each container 5 transported from the smear preparing unit 110 is transferred to the upstream end of the first transport path 132 by the transverse feed unit 124. The container 5 transferred to the first transport path 132 is transferred to the pickup position C1. In case that a container 5 is already present at the pickup position C1, the container 5 transferred to the first transport path 132 waits at the wait position C2.

An imaging-target smear 1 is picked up from the container 5 transported to the pickup position C1. In case that there is no more imaging-target smear 1 in the container 5, the first transport path 132 transports that container 5 to the first retention region C3 from the pickup position C1. After the container 5 at the pickup position C1 is transported to the first retention region C3, the first transport path 132 transports the next container 5 to the vacant pickup position C1 from the wait position C2.

The second transport path 133 includes a setting region D2, an imaged smear storage position D1, and a second retention region D3 in this order from the upstream side (X1 side) toward the downstream side (X2 side).

The second transport path 133 transports the empty container 5 from the setting region D2 to the imaged smear storage position D1. The smear 1 after the imaging by the smear imaging unit 150 is sequentially stored into the container 5 at the imaged smear storage position D1. In sum, the imaging-target smear 1 is picked up from the container 5 in the first transport path 132, imaged, and then stored into another container 5 in the second transport path 133. In case that the container 5 at the imaged smear storage position D1 becomes full, the second transport path 133 transports the container 5 at the imaged smear storage position D1 to the second retention region D3 from the imaged smear storage position D1.

Preparation Transfer Unit

The smear transfer unit 141 is provided above (Z1 side) the first transport path 132 and the second transport path 133. Like the transfer unit 119 (see FIG. 7) in the smear preparing unit 110, the smear transfer unit 141 grasps and transfers the smear 1. The smear transfer unit 141 is configured to be capable of putting the smear 1 into and out of the container 5 one by one. According to one or more embodiments, the smear transfer unit 141 employs an orthogonal two-axis robot being movable in a horizontal direction (Y direction) and the up-down direction (Z direction) and including a handling unit 142 (see FIG. 9) that grasps the smear 1.

Figure 9:
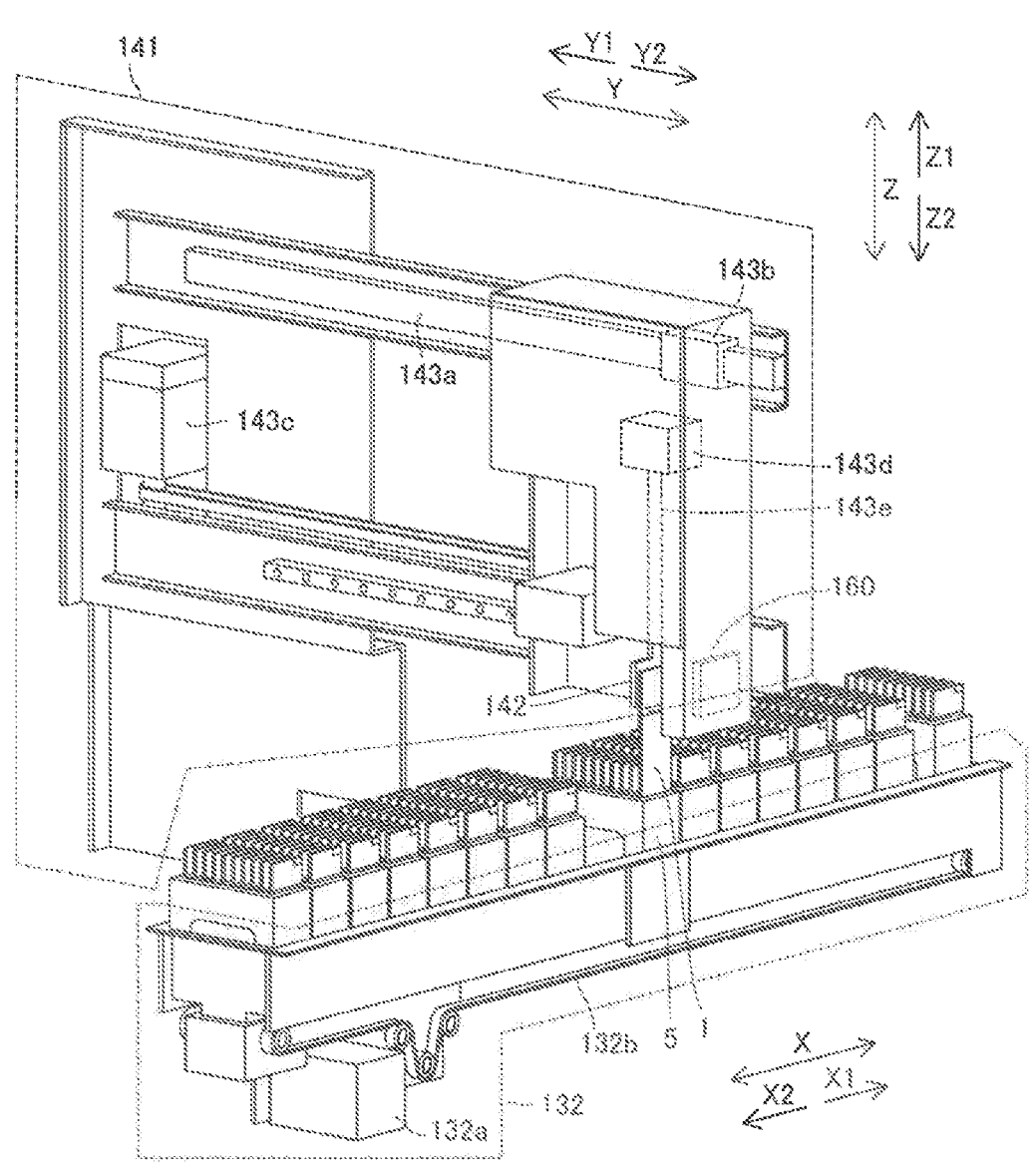
FIG. 9 is an explanatory diagram illustrating a perspective view of a smear transfer unit.

As illustrated in FIG. 9, the smear transfer unit 141 is movable in the horizontal direction (Y direction) by a Y-axis rail 143*a*, a Y-axis slider 143*b* engaged with the Y-axis rail 143*a*, and a Y-axis motor 143*c*. The Y-axis motor 143*c* is a stepping motor, for example. The Y-axis motor 143*c* causes the Y-axis slider 143*b* to move in the Y direction via a transmission mechanism including a belt-pulley mechanism.

The smear transfer unit 141 includes a Z-axis motor 143*d* and a transmission mechanism 143*e* for raising and lowering the handling unit 142. The Z-axis motor 143*d* is capable of raising and lowering the handling unit 142 via the transmission mechanism 143*e*.

The handling unit 142 is capable of pinching and grasping a single smear 1 in its thickness direction and releasing the grasped smear 1 by using a pair of grasping plates. The handling unit 142 grasps a smear 1 by contacting the front and back surfaces of the smear 1.

The smear transfer unit 141 includes a detector 160 that detects the smear 1 stored in the container 5 transported toward the smear imaging unit 150. The detector 160 includes a camera provided on the smear transfer unit 141. The detector 160 images the frosted portion 2*a* (see FIG. 3) of the smear 1 grasped by the handling unit 142. From the captured image data, the controller 170 (see FIG. 4) reads the information printed on the frosted portion 2*a* to determine whether the smear 1 is an imaging target for the smear imaging unit 150.

As illustrated in FIG. 8, the smear 1 determined as an imaging target for the smear imaging unit 150 is transferred to a second position P2 by the smear transfer unit 141. The oil remover 100 is provided so as to lie between the second position P2 and a first position P1.

Oil Remover

The oil remover 100 receives a smear 1 before imaging from the smear transfer unit 141 into the first holder 10 at the second position P2. The oil remover 100 moves the first holder 10 in the X2 direction toward the first position P1 and passes the smear 1 before imaging to a smear passing unit 151 of the smear imaging unit 150 at the position P1.

The oil remover 100 also receives the imaged smear 1 from the smear passing unit 151 into the first holder 10 at the first position P1. The smear 1 received from the smear passing unit 151 is an oil-removal target smear 1 with the oil 3 (see FIG. 1A) adhering to its smear surface 1*a*. The oil remover 100 performs an oil removal process of bringing the smear surface 1*a* of the smear 1 held by the first holder 10 into contact with the oil absorption member 4 held by the second holder 20. After the oil removal process, the oil remover 100 moves the first holder 10 in an X1 direction toward the second position P2 and, at the second position P2, passes the smear 1, from which the oil is removed, to the smear transfer unit 141 from the first holder 10. As described above, the oil remover 100 performs a process of removing the oil 3 adhering to the imaged smear 1 in the process of moving the smear 1 from the first position P1 to the second position P2.

The oil remover 100 is configured to move the first holder 10 in the X direction between the first position P1 and the second position P2 with the movement mechanism 30. As described above, the first position P1 is a position at which to hold the oil removal-target smear 1 in the first holder 10. The first position P1 is also a position at which to pass the imaging-target smear 1 from the first holder 10 to the smear imaging unit 150. The second position P2 is a position at which to pick up the oil-removed smear 1 from the first holder 10. The second position P2 is also a position at which to hold the imaging-target smear 1 in the first holder 10 from the smear transfer unit 141.

A detailed configuration of the oil remover 100 is described later.

Smear Imaging Unit

Referring back to FIG. 4, the smear imaging unit 150 supplies the oil 3 onto the smear surface 1*a* of the smear 1 transported from the container transporter 130 and images the smear 1 with an oil immersion object lens. The smear imaging unit 150 is configured to image the smear 1 transported from the oil remover 100 of the container transporter 130. The smear imaging unit 150 includes the smear passing unit 151, a transporter 152, an oil application unit 153, an imaging unit 154, and an analyzer 155.

The smear passing unit 151 is configured to receive the imaging-target smear 1 from the oil remover 100 and pass the imaged smear 1 to the oil remover 100. The transporter 152 transports the received imaging-target smear 1 to the oil application unit 153. The oil application unit 153 applies the oil 3 to the sample smeared on the smear surface 1*a* of the smear 1. The transporter 152 transports the smear 1 to the imaging unit 154. The imaging unit 154 includes a microscope and a camera. This imaging unit 154 captures a smear image of the smear 1 with an oil immersion object lens. The captured smear image is output to the analyzer 155. The imaged smear 1 is returned to the smear passing unit 151 by the transporter 152 with the oil 3 adhering to the smear 1, and passed to the oil remover 100 from the smear passing unit 151.

The oil remover 100 removes the oil from the oil removal-target smear 1 passed from the smear passing unit 151. The smear transfer unit 141 picks up the oil-removed smear 1 from the first holder 10 at the second position P2. The smear transfer unit 141 stores the picked up oil-removed smear 1 into the container 5 positioned at the imaged smear storage position D1.

Each time the smear 1 is passed to the first holder 10 from the smear passing unit 151, the oil remover 100 executes an oil removal operation on that smear 1. The smear transfer unit 141 is configured, for each of the smears 1, to pick up the smear 1 from the first holder 10 after the oil 3 is removed by the oil remover 100 and store the smear 1 picked up from the first holder 10 into the container 5. Therefore, the imaged smear 1 is stored together in the container 5 for storage or microscopic examination. Moreover, since the oil remover 100 removes the oil 3, the oil 3 is prevented from adhering to the container 5. That is, the oil 3 is prevented from remaining on the smear 1 for storage or microscopic examination while also the oil 3 is prevented from adhering to the container 5. Thus, the burden of an operation such as a cleaning operation for removing the oil 3 adhering to the container 5 may be reduced, for example.

A configuration related to the control of the testing system 200 is described with reference to FIG. 10.

The smear preparing unit 110 includes the controller 170, a storage 171, a communication unit 172, an input/output (I/O) circuit board 173, a display 174, and an input unit 175. The container transporter 130 includes the detector 160, a communication unit 181, and an I/O circuit board 182. The smear imaging unit 150 includes a controller 191, a communication unit 192, and an I/O circuit board 193.

A driving mechanism 176 is connected to the I/O circuit board 173 of the smear preparing unit 110. The driving mechanism 176 is a collective term for a motor, a sensor, a valve, and so on provided in parts of the smear preparing unit 110.

The controller 170 includes a processor (central processing unit (CPU) and a memory and controls components of the smear preparing unit 110 by the processor executing a program 171*a* stored in the storage 171. The controller 170 may include an application-specific integrated circuit (ASIC) or a field-programmable gate array (FPGA). The controller 170 controls the smear preparing unit 110 by executing the program 171*a*. Specifically, the controller 170 controls the driving mechanism 176 via the I/O circuit board 173 to control the operation of preparing the smear 1 and the operation of transporting the container 5 by the smear preparing unit 110. The controller 170 also controls the container transporter 130 by executing the program 171*a*. The controller 170 controls the container transporter 130 via the communication unit 172. Thus, the controller 170 controls the operation of the oil remover 100.

The storage 171 is a storage device including a solid state drive (SSD), and stores the program 171*a* mentioned above as well as setting information 171*b* on a first mode and a second mode to be described later. The storage 171 also stores removal information 171*c* representing the number of smears 1 subjected to an oil removal process (hereinafter referred to as "oil removal count"). The oil removal count is the number of smears 1 from which the oil 3 has been removed using the oil absorption member 4.

The display 174 is capable of displaying various screens based on image signals output by the controller 170. The input unit 175 receives input operations addressed to the controller 170. The display 174 includes a liquid crystal display device, and the input unit 175 includes a touch panel provided in the display 174. As described later, the display 174 is capable of displaying a guidance screen 210 (see FIG. 25) for giving guidance to replace the oil absorption member 4 and a setting screen 220 (see FIG. 26) for setting the operation mode of the oil remover 100. The communication unit 172 is a communication interface for communicating with the communication unit 181 of the container transporter 130 and the host computer 300. The communication unit 172 and the communication unit 181 are connected to each other by, for example, a cable complying with a universal serial bus (USB) standard (USB cable). The communication unit 172 is connected to the host computer 300 by, for example, a cable complying with an Ethernet (registered trademark) standard (a so-called local area network (LAN) cable). The communication unit 172 may be communicatively connected to the communication unit 181 and the host computer 300 wirelessly.

A transporting mechanism 183 and the oil remover 100 are connected to the I/O circuit board 182 of the container transporter 130. The transporting mechanism 183 is a collective term for a motor, a sensor, and so on provided to the container transporter 130. The detector 160 and the I/O circuit board 182 are connected to the communication unit 181. The communication unit 181 is a communication interface for communicating with the communication unit 172 of the smear preparing unit 110.

The controller 191 of the smear imaging unit 150 includes a CPU and a memory, for example. The communication unit 192 is a communication interface for communicating with the analyzer 155 and the host computer 300. The imaging unit 154 and the transporter 152 are connected to the I/O circuit board 193 of the smear imaging unit 150. Various mechanisms such as motors, sensors, valves, and so on constituting the oil application unit 153 and the like are connected to the I/O circuit board 193. The controller 191 obtains a smear image of the smear 1 with the imaging unit 154 via the I/O circuit board 193. The controller 191 sends the obtained smear image to the analyzer 155 via the communication unit 192.

The analyzer 155 is a personal computer (PC) and mainly includes a main body including a CPU, a read-only memory (ROM), a random access memory (RAM), and the like, a display unit including a liquid crystal display, and an input device including a keyboard and a mouse.

The analyzer 155 executes image processing and/or a sorting process on a smear image captured by the imaging unit 154. Specifically, the analyzer 155 performs a cell feature extraction process and a cell identification and sorting process, as well as predetermined processes such as cutting out blood cell images, automatically sorting blood cells, and counting the number of blood cells by type. The captured image data and the analysis results may be, for example, displayed on the display unit or output using a printer.

Configuration of Oil Remover

Figure 11:
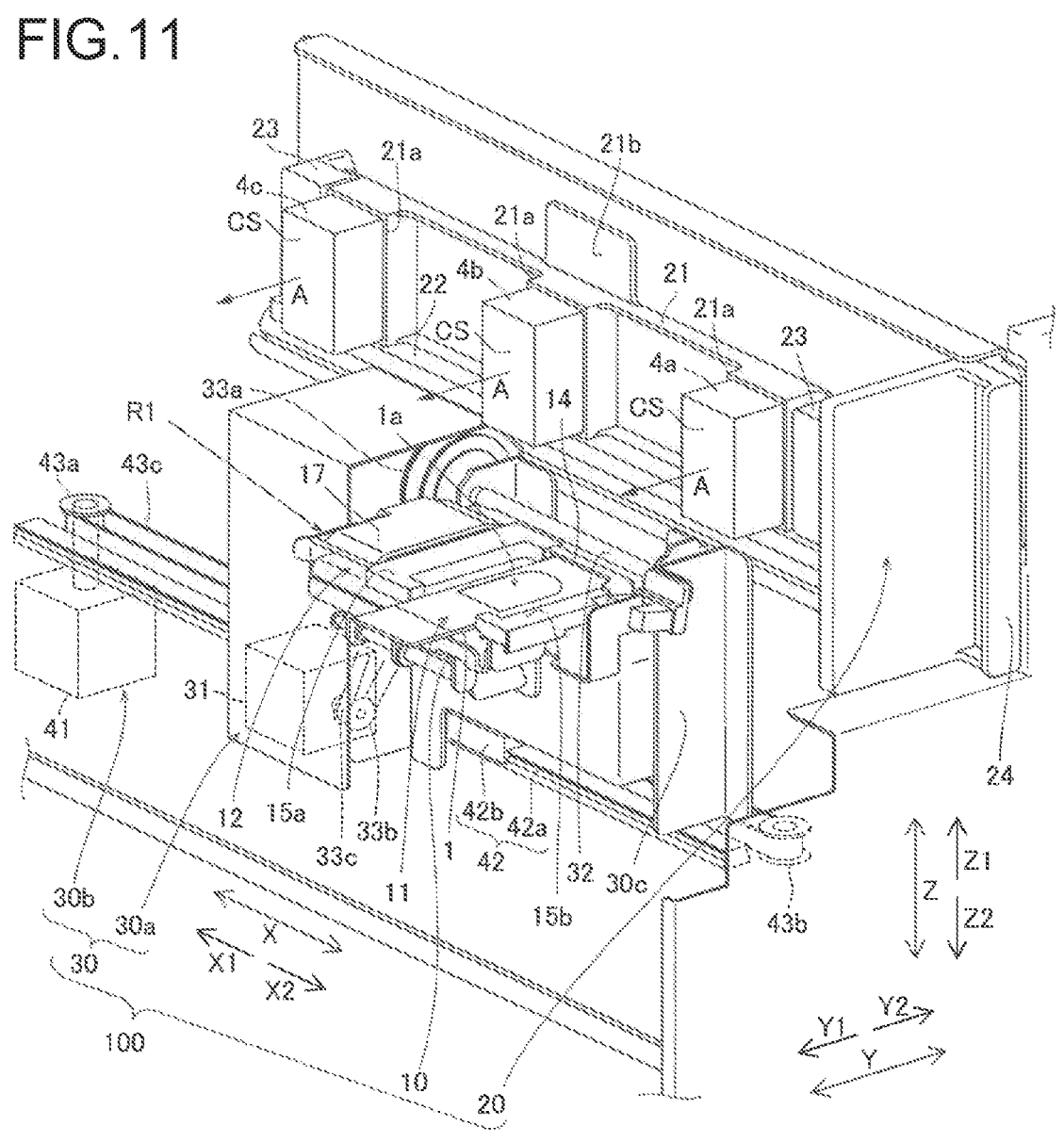
FIG. 11 is an explanatory diagram illustrating a perspective view of the oil remover.

FIG. 11 is a diagram illustrating a configuration of the entire oil remover 100. As mentioned above, the oil remover 100 includes the first holder 10, the second holder 20, and the movement mechanism 30. In FIG. 11, the movement mechanism 30 is configured to move the first holder 10, and the second holder 20 does not move. The second holder 20 holds an oil absorption members 4*a*, an oil absorption member 4*b*, and an oil absorption member 4*c*.

As illustrated in FIG. 11, the first holder 10 is provided with storages each of which receives the smear 1 in such a manner that the smear 1 may be put into and out of the storage. The first holder 10 is such that the smear 1 may be put in and out through one end, and an opposite end portion is fixed to the rotation shaft 32. The first holder 10 is provided so as to be pivotable in the R direction (see FIG. 12) with rotation of the rotation shaft 32. The first holder 10 includes a first storage 11 that stores the smear 1 to be subjected to oil removal and a second storage 12 that stores the smear 1 before imaging.

The first storage 11 stores the smear 1 such that substantially the entire smear surface 1*a* of the smear 1 is exposed. The first storage 11 is formed by a space surrounded by: a back-surface support portion 13 (see FIG. 12) that supports the back surface 1*d* of the smear 1; an opposite-end support portion 14 that supports an opposite end portion of the smear 1 in its longitudinal direction; and a side support portion 15*a* and a side support portion 15*b* that support the left and right end surfaces of the smear 1, respectively.

Figure 12:
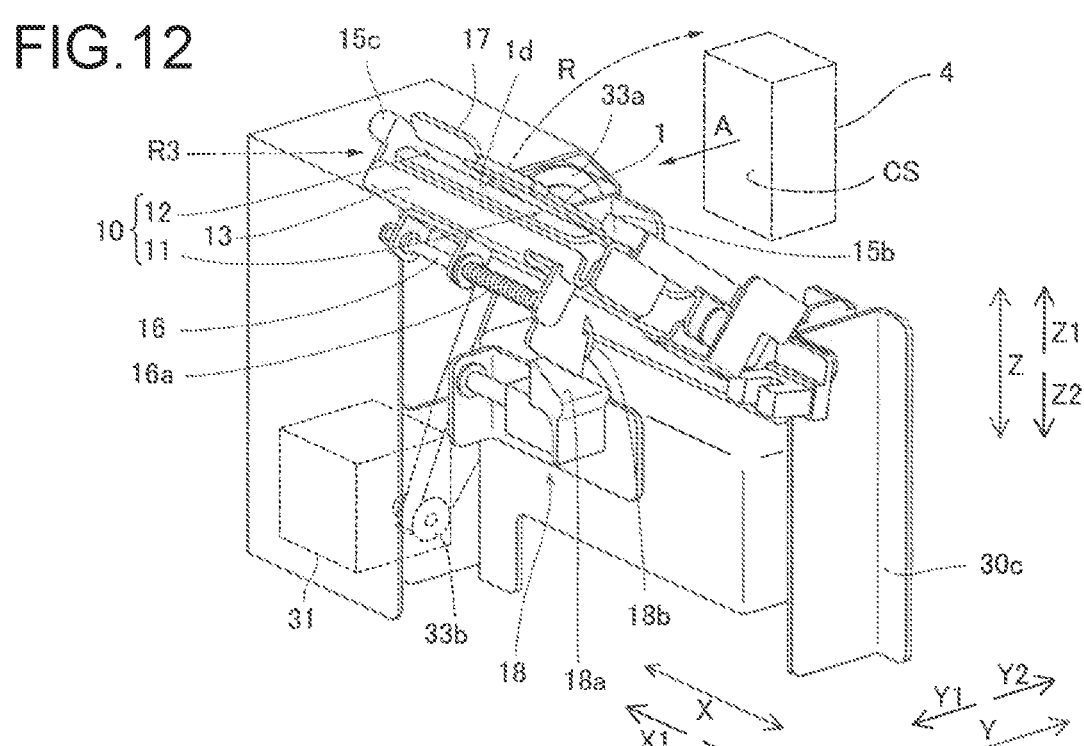
FIG. 12 is an explanatory diagram illustrating a perspective view of a state where a first holder is provided in a third angular position.

The opposite-end support portion 14 and the side support portion 15*a* are fixed to the back-surface support portion 13. The side support portion 15*b* is provided so as to be movable with respect to the back-surface support portion 13. The side support portions 15*a* and 15*b* have recessed step portions (see FIG. 14A and FIG. 14B) on their opposed side surfaces, and the side end surfaces of the smear 1 may enter the gap between the recessed step portions. As illustrated in FIG. 12, the side support portion 15*b* is slidably adhering to a guide bar 16 and is movable toward and away from the side support portion 15*a* along the guide bar 16. The guide bar 16 is provided with a biasing member 16*a* that biases the side support portion 15*b* in a direction toward the side support portion 15*a*. The biasing member 16*a* is a compression coil spring. In this manner, the side support portion 15a and the side support portion 15b (see FIG. 14A and FIG. 14B) are configured to locally cover part of an outer peripheral edge 1b of the smear surface 1a of a smear 1 and support the outer peripheral edge 1b from the smear surface 1a side by storing the side end surfaces of the smear 1 inside the recessed step portions.

The second storage 12 is formed by a space surrounded by: the back-surface support portion 13 (see FIG. 12); the side support portion 15a (see FIG. 11) and a side support portion 15c (see FIG. 12) that support the left and right end surfaces of a smear 1, respectively; and a cover portion 17 (see FIG. 11) provided so as to support the opposite end portion of the smear 1 and cover the smear surface 1a. Since the oil 3 is yet to be applied to the smear 1 before imaging, the second storage 12 is provided so as to cover not only a back surface 1d (see FIG. 3) and the left and right surfaces of the smear 1 but also the smear surface 1a of the smear 1 with the cover portion 17.

As illustrated in FIG. 11, the movement mechanism 30 includes a pivotal driving unit 30a that supports an end portion of the first holder 10 and pivots the first holder 10 about the rotation shaft 32 lying in a horizontal plane, and a horizontal driving unit 30b that moves the first holder 10 to move in a horizontal direction.

The pivotal driving unit 30a has the rotation shaft 32, the motor 31, which rotationally drives the rotation shaft 32, and a transmission mechanism. The motor 31 is an electric motor controlled by the controller 170, and is a stepping motor, for example. The rotation shaft 32 is provided so as to extend along the X direction and is rotatably supported by a chassis 30c. The transmission mechanism transmits the rotation of the output shaft of the motor 31 to the rotation shaft 32. The transmission mechanism is a belt-pulley mechanism having a pulley 33a attached to the rotation shaft 32, a pulley 33b attached to the output shaft of the motor 31, and a belt 33c looped between the pulleys 33a and 33b. The rotation of the motor 31 rotates the rotation shaft 32, which in turn causes the first holder 10 fixed to the rotation shaft 32 to pivot in the R direction (see FIG. 12) centered at the rotation shaft 32. The pivotal driving unit 30a is capable of causing the first holder 10 to pivot within a predetermined angular range in the R direction. The predetermined angular range includes a first angular position R1 (see FIG. 11) in which each storage is oriented in a horizontal direction and a second angular position R2 (see FIG. 13) in which each housing portion is oriented in the vertical direction.

Figure 13:
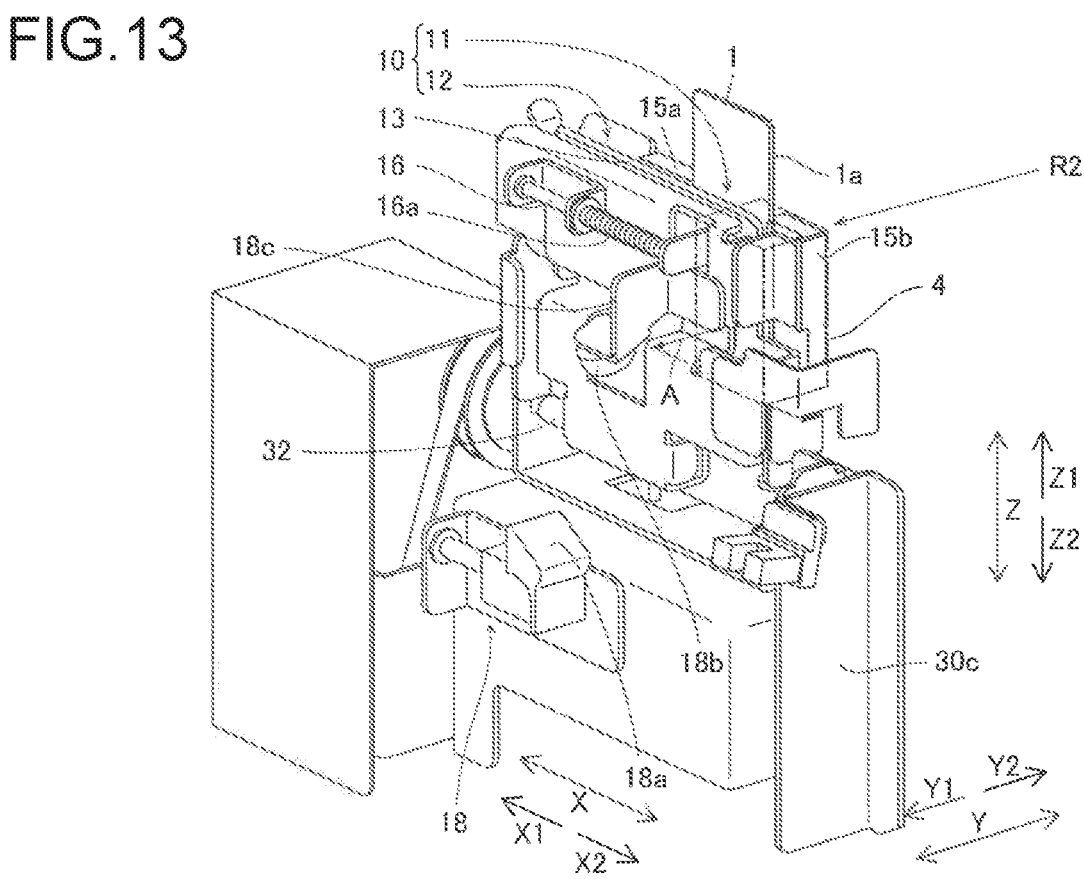
FIG. 13 is an explanatory diagram illustrating a perspective view of a state where the first holder is provided in a second angular position.

As illustrated in FIG. 13, the first holder 10 has an opening/closing mechanism 18 that moves the side support portion 15b according to the angle of rotation of the first holder 10 by the pivotal driving unit 30a. The opening/closing mechanism 18 moves the side support portion 15b according to the angular position of the first holder 10 so as to move the side support portion 15b to a closed position in which the first holder 10 holds the smear 1 when the first holder 10 is in the second angular position R2 (see FIG. 13), and move the side support portion 15b to an open position in which the first holder 10 releases the held smear 1 when the first holder 10 is in the first angular position R1 (see FIG. 11).

The opening/closing mechanism 18 includes a guide surface 18a inclined along the direction of movement of the side support portion 15b (X direction), and an actuation member 18b fixed to the side support portion 15b. The guide surface 18a is fixed to the chassis 30c separately from the first holder 10. The actuation member 18b is a roller provided around the lower surface of the side support portion 15b via a bracket 18c. The guide surface 18a is positioned at a predetermined position on the trajectory of pivotal movement of the actuation member 18b that occurs when the first holder 10 is pivoted.

Figure 14A:
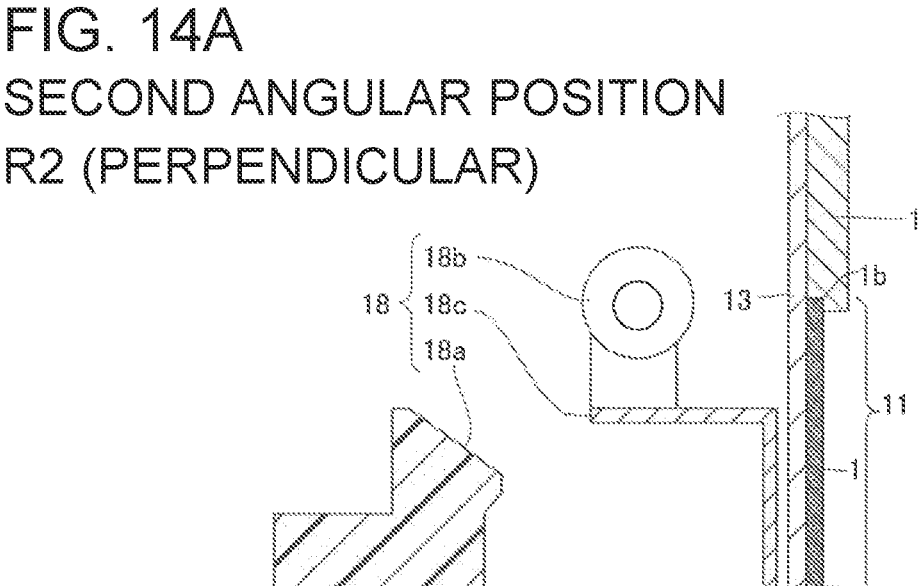
FIG. 14A is a diagram illustrating a schematic view of a position of side support portions in the second angular position.
Figure 14B:
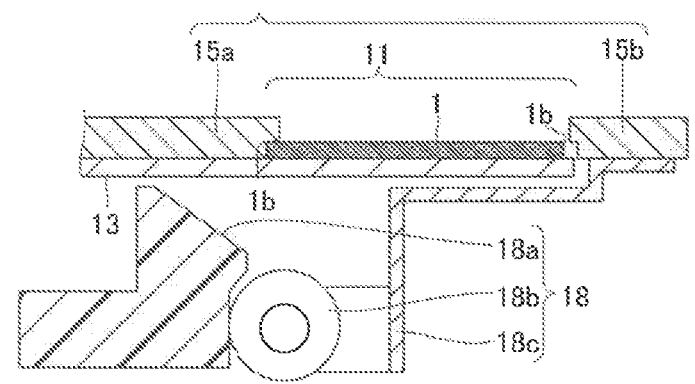
FIG. 14B is a diagram illustrating a schematic view of a position of the side support portions in a first angular position.

FIG. 14A and FIG. 14B are diagrams schematically illustrating the operation of the opening/closing mechanism 18 according to the angular position of the first holder 10. As illustrated in FIG. 14A, when the first holder 10 is in the second angular position R2 (see FIG. 13) being oriented in the vertical direction, the actuation member 18b is separated from and out of contact with the guide surface 18a. Thus, the side support portion 15b and the actuation member 18b are moved toward the side support portion 15a by the biasing force of the biasing member 16a (see FIG. 13), so that the side support portion 15b comes into contact with a side end surface of the smear 1. As a result, the smear 1 is held by the first holder 10.

As illustrated in FIG. 14B, as the first holder 10 is pivoted toward the first angular position R1 from the second angular position R2, the actuation member 18b comes into contact with the guide surface 18a and moves along the guide surface 18a, which is inclined. As the actuation member 18b moves along the guide surface 18a against the biasing force of the biasing member 16a (see FIG. 13), the biasing member 16a becomes compressed. As a result, in the first angular position R1 (see FIG. 11), the side support portion 15b moves in a direction away from the side support portion 15a against the biasing force of the biasing member 16a and thereby gets separated from the side end surface of the smear 1. Thus, the gap in the width direction of the smear 1 widens, and the smear 1 may be inserted easily into the first storage 11.

The opening/closing mechanism 18 is capable of inclining the first holder 10 in an oblique direction while maintaining the side support portion 15b in a closed position at a third angular position R3 (see FIG. 12) between the first angular position R1 and the second angular position R2. The third angular position R3 is a position immediately before the actuation member 18b contacts the guide surface 18a.

Referring back to FIG. 11, the horizontal driving unit 30b has a guide unit 42, the motor 41, which drives the chassis 30c along the guide unit 42, and a transmission mechanism. The motor 41 is an electric motor controlled by the controller 170 and is a stepping motor, for example. The guide unit 42 includes a guide rail 42a extending along the X direction and a slider 42b movable in engagement with the guide rail 42a. The slider 42b is provided on the chassis 30c. The transmission mechanism transmits the rotation of the output shaft of the motor 41 to the chassis 30c. The transmission mechanism is a belt-pulley mechanism including a pulley 43a attached to the output shaft of the motor 41, a pulley 43b positioned at a position away from the pulley 43a in the X direction, and a belt 43c looped between the pulley 43a and the pulley 43b. The chassis 30c is coupled to a portion of the belt 43c. In this manner, the rotation of the motor 41 causes the chassis 30c (including the first holder 10 and the pivotal driving unit 30a) fixed to the belt 43c to move in the X direction along the guide rail 42a.

Figure 15:
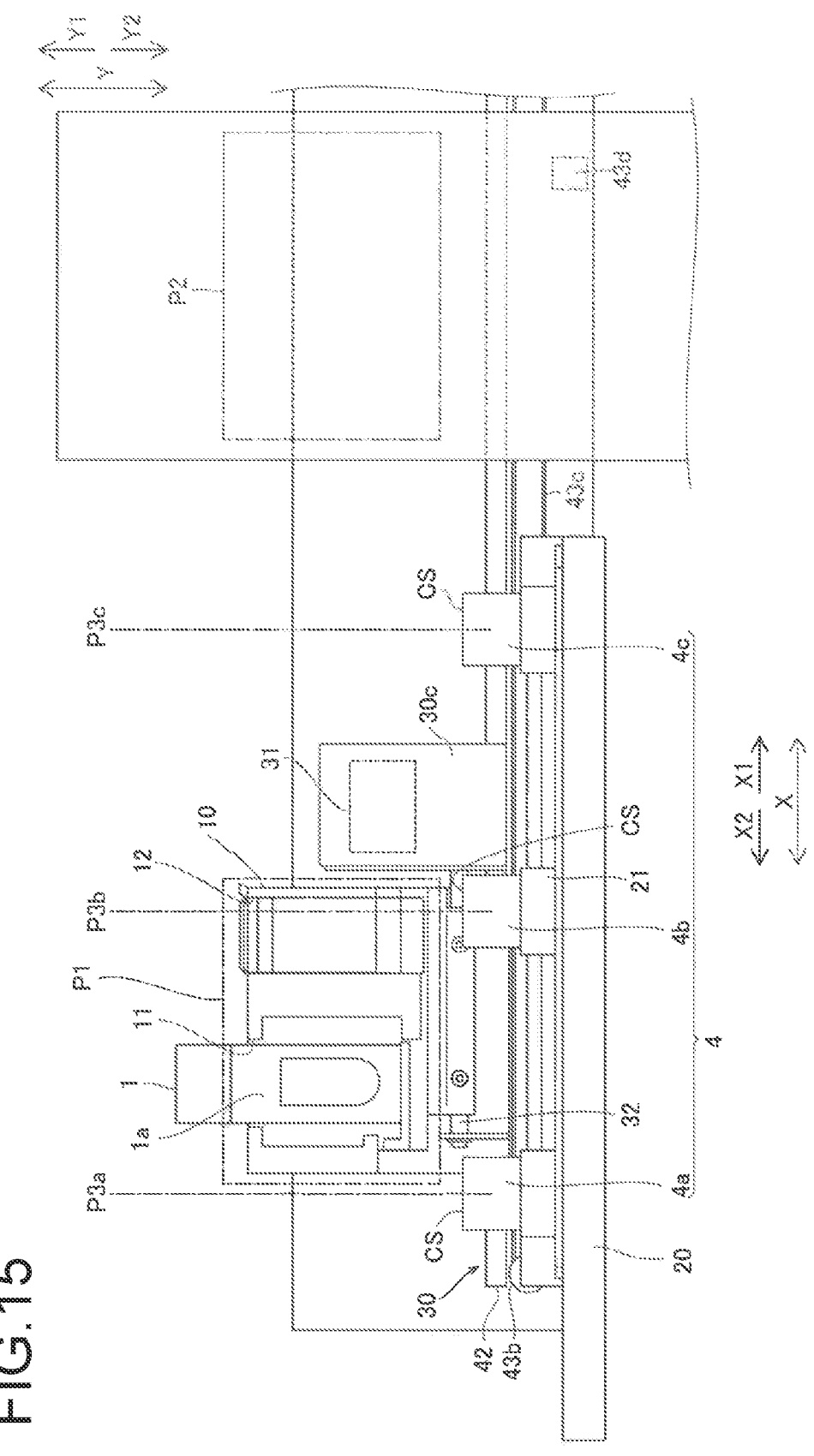
FIG. 15 is an explanatory diagram illustrating a plan view for explaining a position to which to move the first holder.

As illustrated in FIG. 15, the horizontal driving unit 30b moves the first holder 10 in a horizontal direction (X direction) so as to move the first holder 10 between the first position P1 and the second position P2. Specifically, the horizontal driving unit 30b is capable of moving the first holder 10 in the X direction so as to position the first holder 10 at the first position P1, the second position P2, and arranged a position P3a, a position P3b, and a position P3c of the oil absorption member 4a, the oil absorption member 4b, and the oil absorption member 4c. The oil remover 100 includes a position sensor 43d that detects a home position of the first holder 10 in the X direction for the horizontal driving unit 30b. In the example of FIG. 15, the second position P2 is the home position. The controller 170 (see FIG. 10) performs positional control that moves the first holder 10 to any of the position P1, the position P2, the position P3a, the position P3b, and the position P3c by driving the motor 41 with a preset number of pulses from the home position.

According to one or more embodiments, with such a configuration, the movement mechanism 30 is configured to be capable of moving the first holder 10 in a first direction being the direction of movement for bringing the smear surface 1a and the oil absorption member 4 into and out of contact with each other (R direction; see FIG. 12), and a second direction different from the first direction (X direction). The first direction is the direction of the pivotal movement by the pivotal driving unit 30a (R direction). The second direction is the direction of the movement by the horizontal driving unit 30b (X direction).

As illustrated in FIG. 12 and FIG. 13, the pivotal driving unit 30a brings the smear surface 1a and the contact surface CS into and out of contact with each other by supporting an end portion of the first holder 10 and pivoting the first holder 10 about the rotation shaft 32 lying in a horizontal plane. The contact surface CS of each oil absorption member 4 is a flat surface along the XZ plane. As illustrated in FIG. 13, in case that the first holder 10 is moved to the second angular position R2, the smear 1 is upright along the XZ plane. For this reason, the movement mechanism 30 is configured to bring the smear surface 1a and the oil absorption member 4 into surface contact with each other from a state where the smear 1 is positioned along the vertical direction and horizontally faces the oil absorption member 4. The surface contact enables the smear surface 1a and the oil absorption member 4 to be in tight contact with each other, allowing effective absorption of the oil 3 adhering to the smear surface 1a into the oil absorption member 4.

As described above, the movement mechanism 30 is configured to bring the smear surface 1a and the contact surface CS into contact with each other from a state where the smear surface 1a and the contact surface CS face each other in the normal direction to the contact surface CS (A direction). The normal direction to the contact surface CS is a direction of extension of a line perpendicular to the contact surface CS. In this manner, the smear surface 1a is prevented from sliding on the oil absorption member 4 when the smear surface 1a and the oil absorption member 4 are brought into contact with each other. Preventing the smear surface 1a from sliding prevents the preparation from being damaged by the sliding movement and also prevents part of the oil absorption member 4 from falling and getting attached to the smear surface 1a. The effect of preventing attachment of foreign matter (fallen matter from the oil absorption member 4) to the smear surface 1a is particularly important from the viewpoint of preventing false recognition of objects appearing in the microscopic image when the smear 1 is subjected to microscopic examination.

The movement mechanism 30 may be configured to be movable at least one of the first holder 10 or the second holder 20 in the first direction being the direction of movement for bringing the smear surface 1a and the oil absorption member 4 into and out of contact with each other, and the second direction different from the first direction.
Second Holder As illustrated in FIG. 11, the second holder 20 is provided at a position higher than the first holder 10. The second holder 20 holds the oil absorption member 4 at a predetermined position in the Z direction so that the smear 1 held by the first holder 10 may contact the oil absorption member 4 in case that the first holder 10 is positioned in the second angular position R2 (see FIG. 13), in which the first holder 10 is oriented in the vertical direction.

The second holder 20 holds three of the oil absorption members 4, namely, the first oil absorption member 4a, the second oil absorption member 4b, and the third oil absorption member 4c. One or more embodiments disclose an example with three of the oil absorption members 4, but the number of oil absorption members may be plural, e.g., two or four or more. In the following, a matter common to the three of the oil absorption member 4a, the oil absorption member 4b, and the oil absorption member 4c is expressed simply as "the oil absorption member 4" or "the oil absorption members 4". The oil absorption member 4a, the oil absorption member 4b, and the oil absorption member 4c have the same shape and structure.

The second holder 20 holds the three of the oil absorption members 4 at the same height position such that the three of the oil absorption members 4 are spaced from one another in the X direction. The second holder 20 holds the three of the oil absorption members 4 such that the contact surface CS of each oil absorption member 4 is oriented along an XZ plane.

The second holder 20 holds the oil absorption members 4 (the second oil absorption member 4b and the third oil absorption member 4c) at a position between the first position P1 and the second position P2 in the second direction (X direction) (see FIG. 15) on the trajectory along which the first holder 10 is moved in the first direction (R direction; see FIG. 12). In this manner, an operation of bringing the smear surface 1a of the smear 1 held by the first holder 10 into contact with either oil absorption member 4 in the process of moving the first holder 10 from the first position P1 to the second position P2 may be performed. The first oil absorption member 4a (see FIG. 15) is positioned outside the region between the first position P1 and the second position P2.

The second holder 20 includes a holding tool 21 provided to the second holder 20 in a detachably attachable manner. The oil absorption member 4 is attached to the holding tool 21. Specifically, the three of the oil absorption members 4 are attached to a single holding tool 21. In this manner, when replacing the oil absorption member 4 that uses a maximum number of times, the user may remove all of the oil absorption members 4 by simply detaching the holding tool 21 from the second holder 20, and may set all of new oil absorption members 4 by simply attaching the holding tool 21 holding the new oil absorption members 4 to the second holder 20. Accordingly, the operation of replacing the oil absorption member 4 is simple. Also, the user does not have to directly touch the oil absorption member 4 containing the oil 3, which improves convenience for the user.

The second holder 20 has a seating surface 22 that supports the lower surface of the holding tool 21, and a pair of supporters 23 that supports the opposite ends of the holding tool 21 in its longitudinal direction (X direction). The holding tool 21 is mounted to the second holder 20 by inserting the opposite ends of the holding tool 21 between the pair of supporters 23 from above. The holding tool 21 may be detached from the second holder 20 by moving the holding tool 21 upward.

Figure 16:
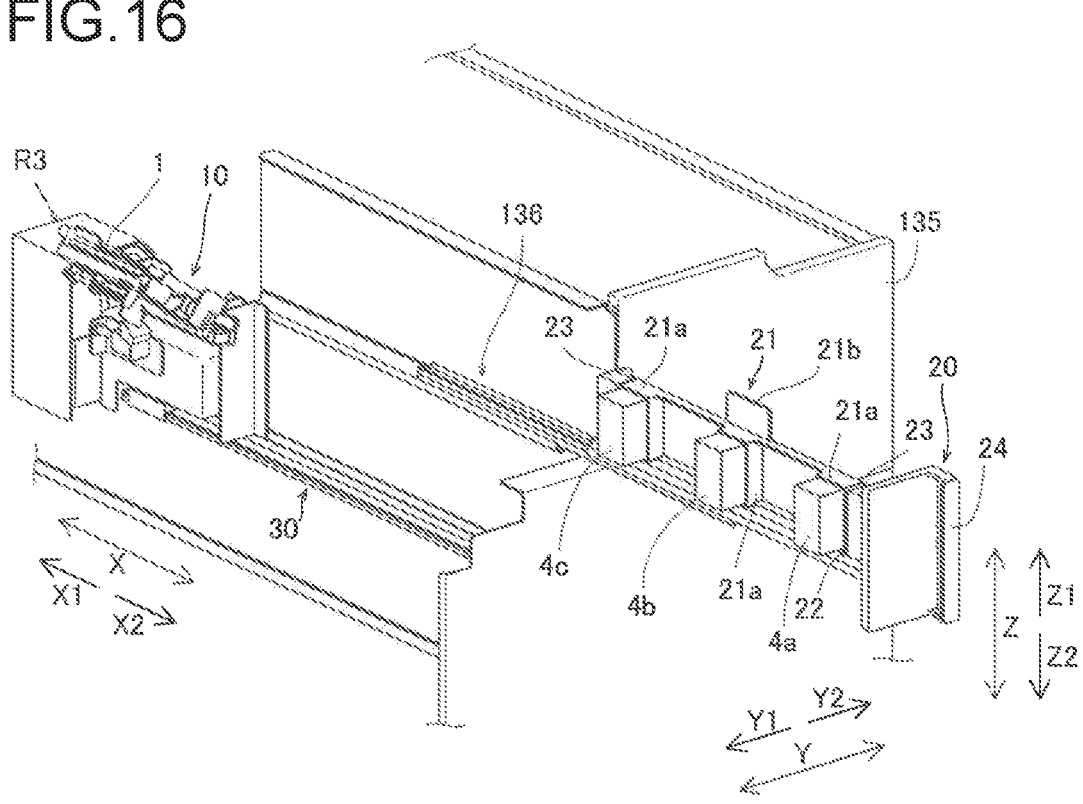
FIG. 16 is an explanatory diagram illustrating a perspective view of a state where a second holder is pulled out.

As illustrated in FIG. 16, the second holder 20 is provided so as to be slidable with respect to a housing unit 135 of the container transporter 130. Specifically, the housing unit 135 is provided with a slide rail 136, and the second holder 20 is provided so as to be movable along the slide rail 136. The second holder 20 is slidable to such a position that the holding tool 21 is positioned outside the housing unit 135. Therefore, easy attachment and detachment of the holding tool 21 to and from the second holder 20 are performed. The second holder 20 also has a grip 24 for the user to grasp with the user's hand. Therefore, the user may easily slide the second holder 20.

The holding tool 21 includes mounts 21a to mount the three oil absorption members 4 and a handle 21b integrally with each other. Each of the mounts 21a is a recess formed in conformity with the outer shape of the oil absorption member 4, and one of the side surfaces of the oil absorption member 4 is fitted into the recess to hold the oil absorption member 4. The surface of the oil absorption member 4 opposite to its surface fitted in the mount 21a is the contact surface CS. The handle 21b is a plate-shaped portion extending upward from the upper surface of the holding tool 21. By grasping the handle 21b, the user may easily attach and detach the holding tool 21 to and from the second holder 20.
Oil Absorption Member The oil absorption member 4 is described with reference to FIG. 17A, FIG. 17B, and FIG. 18. Since the three of the oil absorption member 4a, oil absorption member 4b, oil absorption member 4c have the same structure, the description is given denoting the three as "the oil absorption member 4".

Figure 17A:
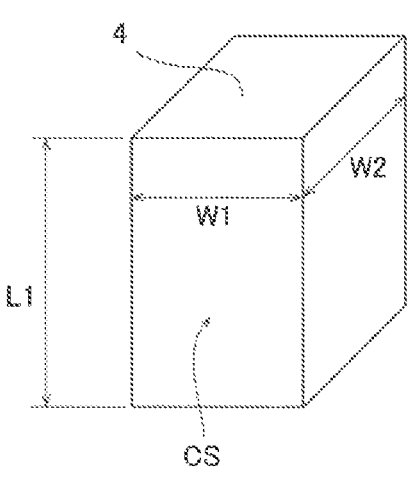
FIG. 17A is an explanatory diagram illustrating a perspective view of an oil absorption member.
Figure 17B:
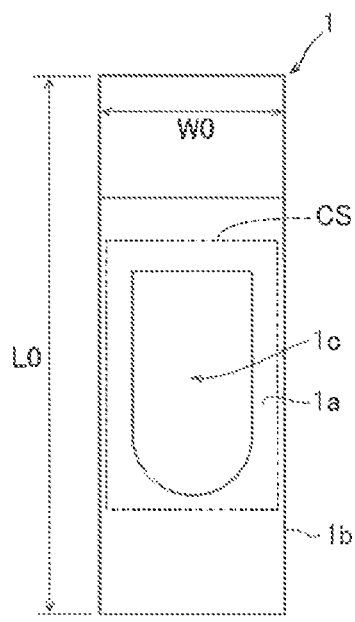
FIG. 17B is a diagram illustrating a schematic view of a region on a smear surface to be in contact with the oil absorption member.

As illustrated in FIG. 17A, the oil absorption member 4 has a cuboidal shape. According to one or more embodiments, the contact surface CS of the oil absorption member 4 to be in contact with the smear 1 is formed to be smaller than the smear surface 1a of the smear 1. The contact surface CS of the oil absorption member 4 has a rectangular shape with a length L1 and a width W1. The oil absorption member 4 has a width W2 in a depth direction. On the other hand, as illustrated in FIG. 17B, the smear surface 1a of the smear 1 (i.e., the glass slide 2; see FIG. 3) has a rectangular shape with a length L0 and a width W0. The length L1 and the width W1 of the contact surface CS are smaller than the length L0 and the width W0 of the smear surface 1a, respectively.

The length L0 and the width W0 of the glass slide 2 to be used for the smear 1 are specified in an international standard (ISO), and a standard type has L0=76 mm and W0=26 mm (without dimensional tolerances). In one example, the contact surface CS has a length L1=38 mm and a width W1=24 mm. The width W2 of the oil absorption member 4 in the depth direction is set according to the amount of the oil 3 to be absorbed and, in one example, W2=30 mm.

The oil absorption member 4 is made of an elastically deformable porous member. Abilities required for the oil absorption member 4 for removing the oil 3 on the smear 1 include the following three: (a) a high ability to absorb the oil 3; (b) the damage on the preparation due to contact is small; and (c) the attachment of fallen matter to the smear surface 1a due to contact is small.

(a) A high absorption ability is an ability required for members that absorb liquid in general. (b) From the viewpoint of the damage on the preparation due to contact, the oil absorption member 4 is desirably of an elastically deformable soft material so that the sample (such as cells) smeared on the smear surface 1a does not get peeled off or scraped off when the sample and the oil absorption member 4 contact each other. (c) Regarding the attachment of fallen matter to the smear surface 1a due to contact, in case that a matter falls from the oil absorption member 4 when the smear surface 1a and the oil absorption member 4 are brought into and out of contact with each other and the fallen matter gets attached to the smear surface 1a, it is difficult to distinguish between the matter originally contained in the sample and the fallen matter when observing the oil-removed smear 1 with a microscope. Thus, the oil absorption member 4 is preferably a porous member molded into a single piece from a resin material or the like rather than a material made of many fibers, such as a woven fabric or a non-woven fabric, because fine fibers easily get attached to the smear surface 1a.

The oil absorption member 4 according to one or more embodiments is made of a porous member having a continuous pore structure. The continuous pore structure is a structure including bubbles (pores) extending continuously in three-dimensional directions. In the continuous pore structure, most of the many pores formed in the porous member communicate with one another. Thus, the oil 3 absorbed into pores in the oil absorption member 4 quickly penetrates through the oil absorption member 4 by utilizing capillary action. Therefore, the oil absorption member 4 may obtain a high ability to absorb the oil 3.

Figure 18:
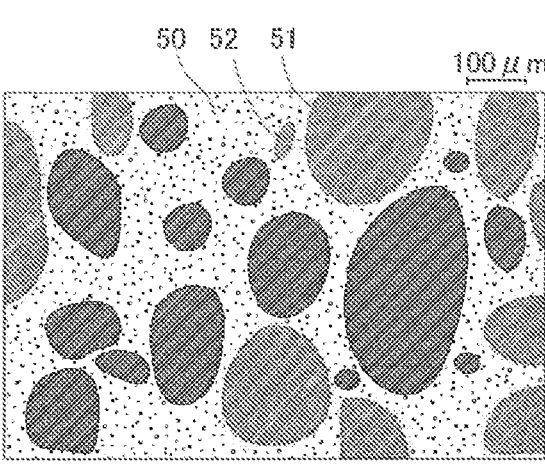
FIG. 18 is a diagram illustrating a schematic view for explaining a pore structure of a porous member forming the oil absorption member.

The present inventors have tested various materials and found that the oil absorption member 4 is preferable of being urethane sponge having the continuous pore structure. In particular, the oil absorption member 4 is preferable of a material having a structure in which, as illustrated in FIG. 18, large-diameter pores and small-diameter pores are present in a mixed manner in a resin base material 50. In FIG. 18, the pores are hatched. In one example, the oil absorption member 4 has a structure in which a large pore portion 51 with an average pore diameter of approximately 300 μm and a small pore portion 52 with an average pore diameter of approximately 15 μm are present in such a mixed manner as to achieve a bimodal distribution. The porosity of the oil absorption member 4 is 80% or more and 90% or less, for example. The oil absorption member 4 made of an elastically deformable porous material having such a continuous pore structure is particularly preferable because of the above-described three abilities (a) to (c) at high levels.
Oil Removal Process The operation in an oil removal process by the oil remover 100 is described in detail. According to one or more embodiments, the movement mechanism 30 moves the first holder 10 with respect to the second holder 20 to execute an oil removal process. The controller 170 (see FIG. 10) controls the movement mechanism 30 during the oil removal process.

The movement mechanism 30 (see FIG. 11) moves the first holder 10 so as to shift from a separated state where an oil absorption member 4 is positioned away from the smear surface 1a in the normal direction to the contact surface CS to a contacting state where the smear surface 1a and the oil absorption member 4 are in contact with each other to thereby remove the oil 3. After removing the oil 3, the movement mechanism 30 separates the smear surface 1a and the oil absorption member 4 in the contacting state from each other. According to one or more embodiments, the movement mechanism 30 is configured to bring the smear surface 1a of a single smear 1 into contact with two oil absorption members 4. Specifically, the movement mechanism 30 brings the smear surface 1a of a single smear 1 into contact with two of the three oil absorption members 4 under control of the controller 170. A primary removal operation of bringing the smear surface 1a into and out of contact with a first one of the three oil absorption members 4 is performed, and a secondary removal operation of bringing the smear surface 1a into and out of contact with a second one of the oil absorption members 4 is performed after the primary removal operation. The movement mechanism 30 may bring the smear surface 1a of a single smear 1 into contact with three or more oil absorption members 4.

The first one of the oil absorption members 4 to be initially in contact in the primary removal operation absorbs most of the oil 3 adhering to the smear surface 1a. Accordingly, the ability to absorb the oil 3 may temporarily drop immediately after the smear 1 is separated. Thus, in the secondary removal operation, the smear surface 1a is brought into contact with another oil absorption member 4 whose ability to absorb the oil 3 is not dropped to thereby effectively remove the oil 3 remaining on the smear surface 1a. In this way, the oil 3 adhering to the smear 1 may be removed more effectively in a shorter time. In the following, an oil removal process using the oil absorption member 4a in the primary removal operation and using the oil absorption member 4b in the secondary removal operation is exemplarily described.

Primary Removal Operation

As illustrated in FIG. 11, the first holder 10 receives the smear 1 from the smear imaging unit 150 at the first position P1 in a state of being positioned in the first angular position R1, in which the first holder 10 lies substantially horizontally. The smear surface 1a of the smear 1 held by the first holder 10 and the contact surface CS are separated in the normal direction to the contact surface CS (A direction). The normal direction to the contact surface CS (A direction) substantially coincides with the Y direction. In case that the first holder 10 is in the first angular position R1, the smear surface 1a of the smear 1 held by the first holder 10 and the contact surface CS are in a separated state.

The controller 170 controls the horizontal driving unit 30b so as to align the position, in the X direction, of the smear 1 held by the first holder 10 and the position, in the X direction, of any of the oil absorption members 4 held by the second holder 20 with each other. For example, the controller 170 controls the horizontal driving unit 30b such that, in FIG. 15, the arranged position P3a, which is the center position of the oil absorption member 4a in the X direction, and the center position of the smear 1 in the first storage 11 in the X direction become substantially aligned with each other. As a result, the oil absorption member 4a is positioned on the path of movement of the smear 1 (the trajectory of rotation about the rotation shaft 32).

Figure 19:
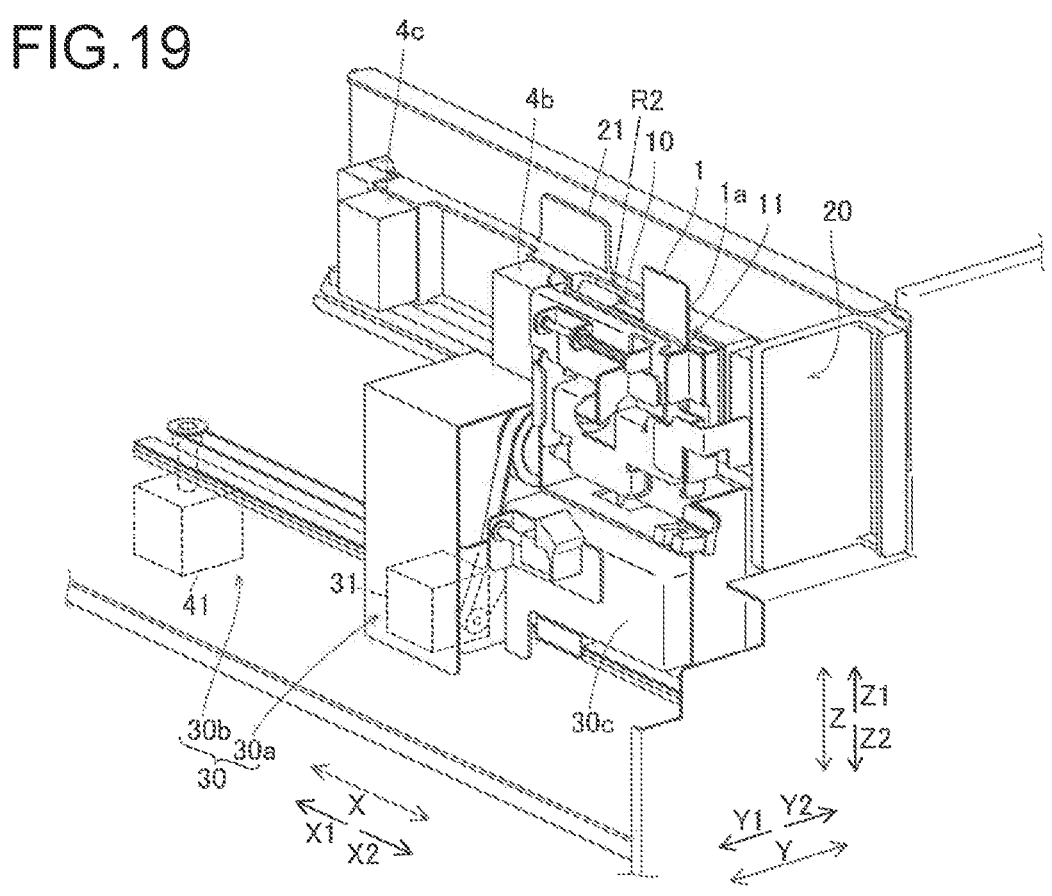
FIG. 19 is an explanatory diagram illustrating a perspective view of a state where the smear surface is brought into contact with a first oil absorption member.

The controller 170 then controls the pivotal driving unit 30a so as to pivot the first holder 10 to the second angular position R2 from the first angular position R1. As a result, as illustrated in FIG. 19, the smear 1 held by the first holder 10 moves toward the oil absorption member 4a and the smear surface 1a of the smear 1 comes into contact with the contact surface CS of the oil absorption member 4a.

Figure 23:
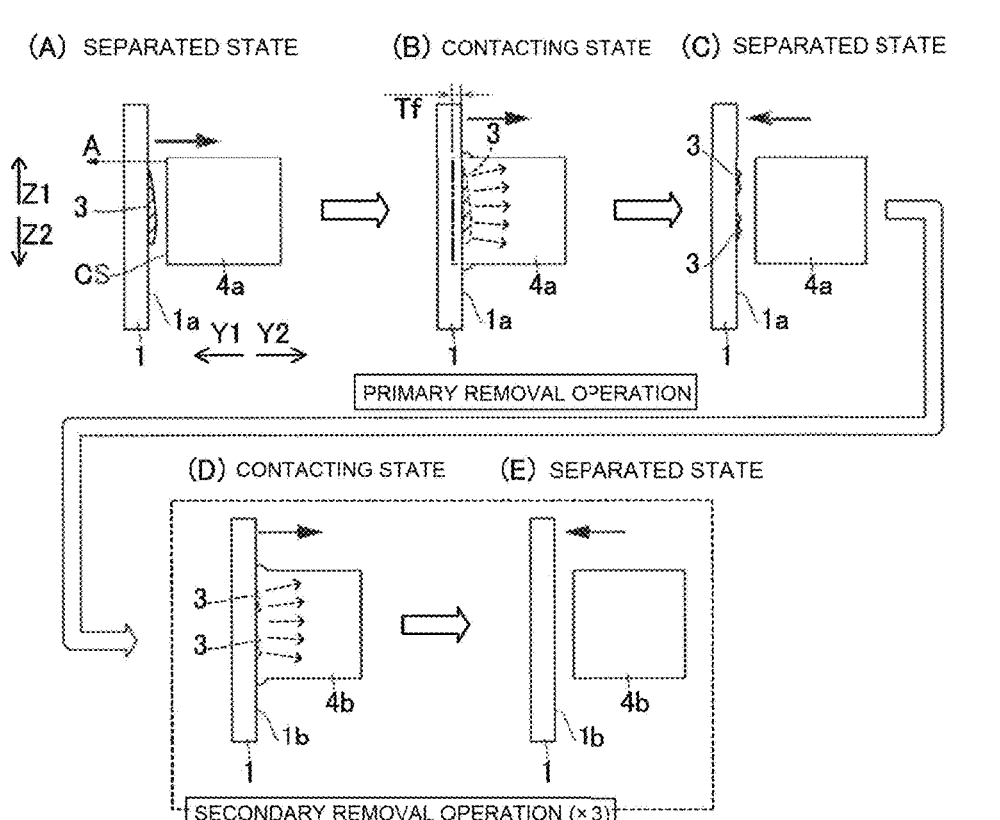
FIG. 23 is a diagram illustrating states of a smear, the first oil absorption member, and the second oil absorption member.

FIG. 23 is a diagram illustrating states of the smear 1, the first oil absorption member 4a, and the second oil absorption member 4b, FIG. 23 illustrates (A) Separated state, (B) Contacting state, (C) Separated state, (D) Contacting state, (E) Separated state. As illustrated in (A) Separated state of FIG. 23A, the smear surface 1a of the smear 1 and the contact surface CS of the oil absorption member 4a are substantially parallel to each other and face each other in the normal direction to the contact surface CS when the smear surface 1a and the contact surface CS are contact each other.

The movement mechanism 30 is configured to bring the smear surface 1a and the contact surface CS into contact with each other such that the contact surface CS is situated inward of the outer peripheral edge 1b of the smear surface 1a as illustrated in FIG. 17B. Specifically, the smear 1 is pivoted about the rotation shaft 32 with the center position of the oil absorption member 4a in the X direction and the center position of the smear 1 in the X direction substantially aligned with each other to bring the contact surface CS of the oil absorption member 4a into contact with the smear surface 1a such that the contact surface CS is situated within a range of the width W0 on the smear surface 1a and also within a range of the length L0 on the smear surface 1a. The contact surface CS contacts the smear surface 1a within a range covering the center portion 1c of the smear surface 1a, on which a sample is smeared. The position of contact of the smear surface 1a in its length direction is adjusted by setting the height positions of the oil absorption member 4a, the oil absorption member 4b, and the oil absorption member 4c according to the path of movement of the smear surface 1a (trajectory of rotation).

In this manner, even if part of the oil 3 adhering to the smear surface 1a is sandwiched between the smear surface 1a and the contact surface CS of the oil absorption member 4a and pushed out of the contact surface CS when the contact surface CS and the smear surface 1a contact each other, the oil 3 pushed out of the contact surface CS is prevented from reaching the outer peripheral edge 1b of the smear surface 1a. In case that the oil 3 reaches the outer peripheral edge 1b of the smear surface 1a, the oil 3 may move to the side end surface and the back surface 1d of the smear 1. The above configuration prevents the oil 3 from moving to surfaces other than the smear surface 1a.

As illustrated in (B) Contacting state of FIG. 23, the movement mechanism 30 is configured to compress the oil absorption member 4a with the smear surface 1a in the contacting state. Specifically, the contact surface CS of the oil absorption member 4a is positioned at a position slightly shifted toward the near side (Y1 side) from the position of the smear surface 1a in the state where the first holder 10 is positioned in the second angular position R2. Since the oil absorption member 4a is elastically deformable, the oil absorption member 4 is compressively deformed by the smear surface 1a by a shift amount Tf in the Y2 direction as the first holder 10 reaches the second angular position R2. The shift amount Tf is 5 mm or less, for example.

Therefore, tight contact between the smear surface 1a and the oil absorption member 4 is ensured. As a result, the oil 3 adhering to the smear surface 1a is effectively absorbed into the oil absorption member 4.

After the contact, the controller 170 maintains the angular position of the first holder 10 in the contacting state to keep the smear surface 1a and the oil absorption member 4 in the contacting state for a predetermined time. Thereafter, as illustrated in (C) Separated state of FIG. 23, the controller 170 controls the pivotal driving unit 30a so as to pivot the first holder 10 to the third angular position R3 (see FIG. 12) from the second angular position R2. As a result, the smear 1 held by the first holder 10 moves in a direction away from the oil absorption member 4, so that the smear surface 1a of the smear 1 gets separated from the contact surface CS of the oil absorption member 4. As illustrated in FIG. 12, when the first holder 10 is in the third angular position R3, the smear surface 1a of the smear 1 held by the first holder 10 and the contact surface CS are in a separated state.

According to one or more embodiments, the controller 170 controls the movement mechanism 30 so as to maintain the relative positions of the first holder 10 and the second holder 20 to such an extent that the smear surface 1a and the contact surface CS slide with respect to each other in the contacting state. Specifically, the controller 170 does not cause the horizontal driving unit 30b to move the first holder 10 in the X direction while the pivotal driving unit 30a pivots the first holder 10 so as to bring the smear surface 1a and the contact surface CS into and out of contact with each other. The first holder 10 is pivoted by the pivotal driving unit 30a while its movement in the X direction by the horizontal driving unit 30b is stopped. Thus, the smear surface 1a does not get displaced with respect to the contact surface CS in the X direction while the smear surface 1a and the contact surface CS are in the contacting state. In this manner, in case that the smear surface 1a and the contact surface CS are brought into and out of contact with each other, the sample on the smear surface 1a and the contact surface CS are prevented from sliding on each other due to relative movement in the second direction (X direction). The smear surface 1a and the oil absorption member 4 do not slide on each other when in the contacting state effectively prevents damaging of the sample smeared on the smear surface 1a and attachment of a fallen constituent material of the oil absorption member 4 to the smear surface 1a. The primary removal operation is executed in the above-described manner.

Secondary Removal Operation

Figure 20:
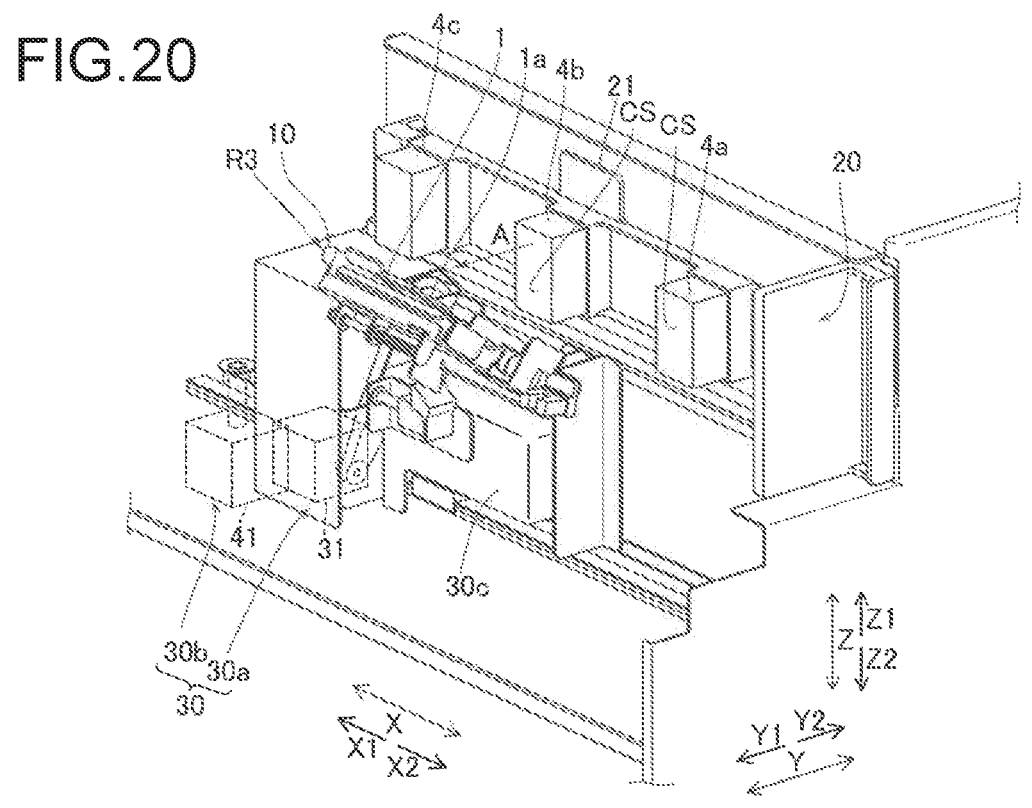
FIG. 20 is an explanatory diagram illustrating a perspective view of a state where the first holder has been moved to an arranged position of a second oil absorption member.

The controller 170 controls the horizontal driving unit 30b such that, in FIG. 15, the arranged position P3b, which is the center position of the oil absorption member 4b in the X direction, and the center position of the smear 1 in the first storage 11 in the X direction become substantially aligned with each other. As a result, as illustrated in FIG. 20, the oil absorption member 4b is positioned on the path of movement of the smear 1 (the trajectory of rotation about the rotation shaft 32).

Figure 21:
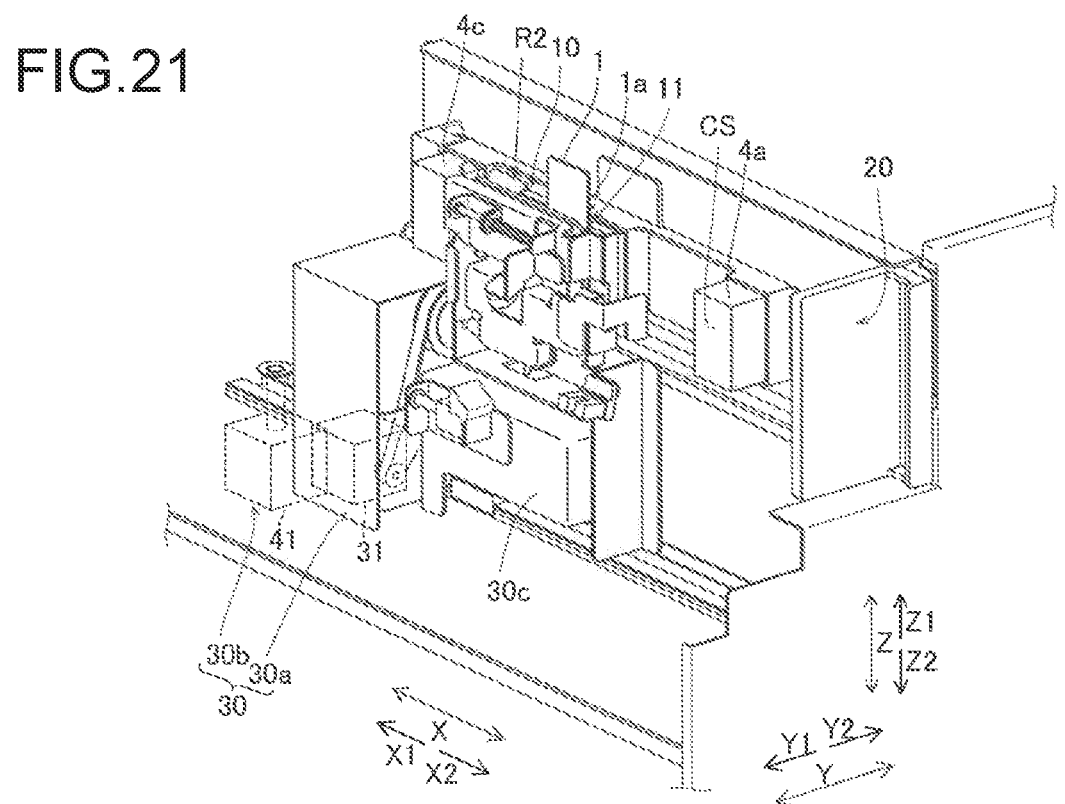
FIG. 21 is an explanatory diagram illustrating a perspective view of a state where the smear surface is brought into contact with the second oil absorption member.

The controller 170 then controls the pivotal driving unit 30a so as to pivot the first holder 10 to the second angular position R2 from the first angular position R1. As a result, as illustrated in FIG. 21, the smear 1 held by the first holder 10 moves toward the oil absorption member 4b (see FIG. 20) and the smear surface 1a of the smear 1 comes into contact with the contact surface CS of the oil absorption member 4b.

As illustrated in (D) Contacting state of FIG. 23, the controller 170 maintains the angular position of the first holder 10 in the contacting state to keep the smear surface 1a and the oil absorption member 4b in the contacting state for a predetermined time. Thereafter, as illustrated in (E) Separated state of FIG. 23, the controller 170 controls the pivotal driving unit 30a so as to pivot the first holder 10 to the third angular position R3 from the second angular position R2. As a result, the smear 1 held by the first holder 10 moves in a direction away from the oil absorption member 4b, so that the smear surface 1a of the smear 1 gets separated from the contact surface CS of the oil absorption member 4b.

According to one or more embodiments, the controller 170 controls the movement mechanism 30 so as to bring the smear surface 1a of a single smear 1 into contact with the oil absorption member 4 multiple times. Thus, in case that single contact is not sufficient to completely absorb the oil 3 and the oil 3 remains on the smear surface 1a, the residual oil 3 may be absorbed into the oil absorption member 4b in second and further contact. Thus, the residual amount of the oil 3 on the smear surface 1a may be effectively reduced.

Specifically, under control of the controller 170, the movement mechanism 30 operates in the secondary removal operation so as to bring the smear surface 1a of a single smear 1 into contact with the same oil absorption member 4b multiple times. That is, the controller 170 controls the movement mechanism 30 so as to bring the smear surface 1a of the smear 1 into contact with one oil absorption member 4a a first number of times and then brings the smear surface 1a into contact with another oil absorption member 4b a second number of times greater than the first number of times. Specifically, the controller 170 brings the smear surface 1a of a single smear 1 into contact with one oil absorption member 4a once in the primary removal operation, and brings the smear surface 1a of the single smear 1 into contact with another oil absorption member 4b three times in the secondary removal operation. In other words, the first number of times is "1", and the second number of times is "3".

The oil absorption member 4a, which contacts the smear surface 1a first, absorbs most of the oil 3 adhering to the smear surface 1a. As the first oil absorption member 4a absorbs a relatively large amount of the oil 3, the amount of the liquid retained in the pores near the contact surface CS temporarily increases until the absorbed oil 3 penetrates sufficiently deep into the oil absorption member 4a. Accordingly, the ability of the first oil absorption member 4a to absorb the oil 3 may temporarily drop immediately after the smear 1 is separated. On the other hand, another oil absorption member 4b, which contacts the smear surface 1a next, absorbs only a small amount of the oil 3, so that its ability to absorb the oil 3 does not drop. Accordingly, the greater the number of times of contact, the more effectively the residual amount of the oil 3 may be reduced. For this reason, it is effective to set the number of times of contact with another oil absorption member 4b, which is contacted later (second number of times), greater than the number of times of contact with one oil absorption member 4a, which is contacted earlier (first number of times), in reducing the residual amount of the oil 3 on the smear surface 1a.

Hence, the primary removal operation in (A) Separated state, (B) Contacting state, and (C) Separated state of FIG. 23 is executed once, and the secondary removal operation in (D) Contacting state and (E) Separated state of FIG. 23 is repeated three times. The secondary removal operation is executed in the above-described manner.

Figure 22:
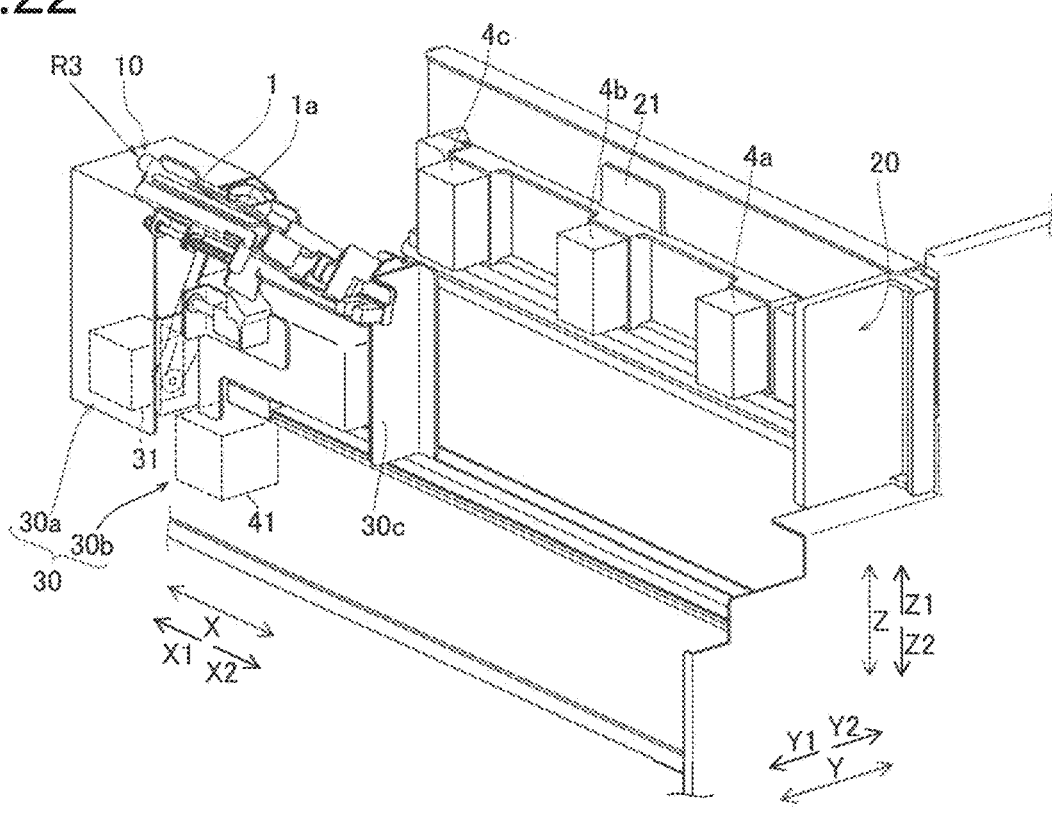
FIG. 22 is an explanatory diagram illustrating a perspective view of a state where the first holder has been moved to a second position.

After the secondary removal operation, the controller 170 controls the horizontal driving unit 30b so as to move the first holder 10 to the second position P2, as illustrated in FIG. 22. Thereafter, the controller 170 controls the pivotal driving unit 30a so as to pivot the first holder 10 to the second angular position R2 (see FIG. 13) from the third angular position R3. With the first holder 10 oriented in the vertical direction, the controller 170 causes the smear transfer unit 141 (see FIG. 9) to pick up the oil-removed smear 1 from the first holder 10.

Division of Multiple Oil Absorption Members to be Used

Figure 24:
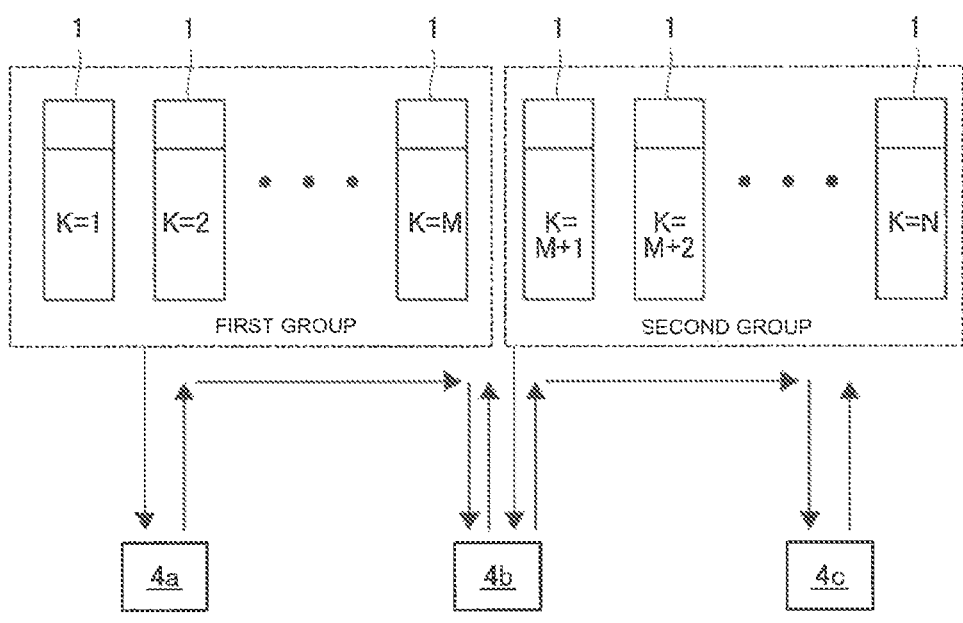
FIG. 24 is a diagram illustrating a schematic view for explaining division of three oil absorption members to be used for a first group of smears and a second group of smears.
Figure 25:
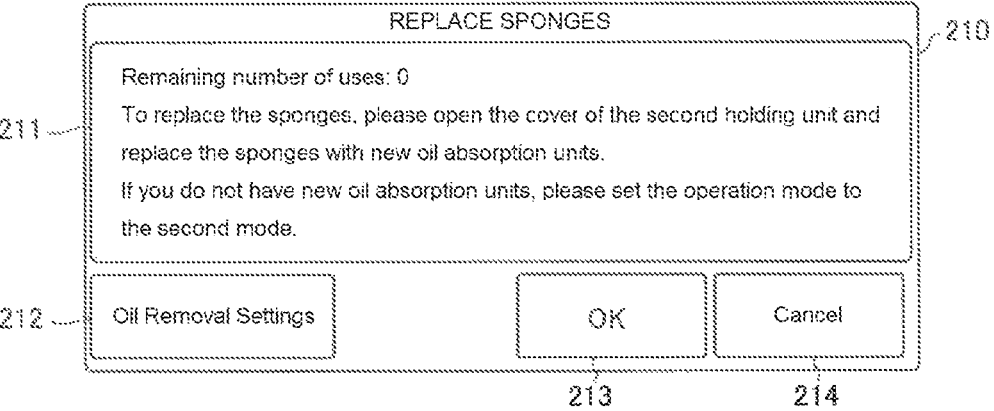
FIG. 25 is a diagram illustrating a schematic view of a guidance screen giving guidance to replace an oil absorption members.
Figure 26:
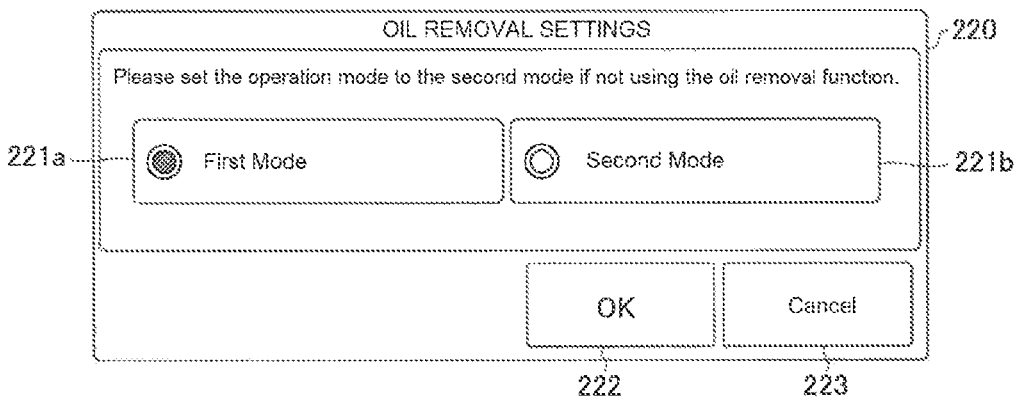
FIG. 26 is a diagram illustrating a schematic view of a setting screen for setting an operation mode of the oil remover.

As illustrated in FIG. 24, according to one or more embodiments, the controller 170 is configured to bring the smear surface 1a of each smear 1 in a first group into contact with the first oil absorption member 4a and then bring the smear surface 1a into contact with the second oil absorption member 4b. The controller 170 is configured to then bring the smear surface 1a of each smear 1 in a second group different from the first group into contact with the second oil absorption member 4b and then bring the smear surface 1a into contact with the third oil absorption member 4c.

By dividing the smears 1 into two groups and dividing the three of the oil absorption member 4a, oil absorption member 4b, and oil absorption member 4c to be used for the two groups as described above, the oil absorption performance (how low the residual amount of the oil 3 is after contact with the oil absorption member 4) may be maintained with a small number of oil absorption members 4 for a larger number of smears 1.

Specifically, the controller 170 counts the number of smears 1 from which the oil 3 is removed by the oil absorption members 4 (oil removal count), and stores the oil removal count in the storage 171 (see FIG. 10) as the removal information 171c. The controller 170 performs control so as to divide the three oil absorption members 4 to be used according to a cumulative oil removal count K from the start of use of the oil absorption members 4. The controller 170 identifies the first to M-th smears 1 in the oil removal count K as the first group, and identifies the (M+1)-th to N-th smears 1 in the oil removal count as the second group. When the oil absorption members 4 are replaced, the controller 170 resets the value of the oil removal count K in the removal information 171c.

According to one or more embodiments, M=300 and N=600. Therefore, in case that the number of smears 1 to be prepared and imaged by the testing system 200 per day is, e.g., 120/day, oil removal may be performed on the smear 1 for 1 week (5 days).

Hence, the controller 170 brings each of the 1st to 300th smears 1 in the first group into contact with the oil absorption member 4a in the primary removal operation and with the oil absorption member 4b in the secondary removal operation. The controller 170 brings each of the 301st to 600th smears 1 in the second group into contact with the oil absorption member 4b in the primary removal operation and with the oil absorption member 4c in the secondary removal operation.

As described above, the primary removal operation removes (absorbs) most of the oil 3 adhering to the smear surface 1a. Thus, the oil absorption member 4b maintains a sufficiently high oil absorption ability even after being used in the secondary removal operation for the smear 1 in the first group. The oil absorption member 4b is therefore capable of sufficiently absorbing the oil 3 even when used in the primary removal operation for the smear 1 in the second group.

Guidance to Replace of Oil Absorption Members

According to one or more embodiments, as described above, an oil removal process may be performed on 600 of the smears 1 by using three oil absorption members 4. Performing the oil removal process on the 600 of the smears 1 is followed by an operation of replacing the oil absorption members 4 by detaching the holding tool 21 from the second holder 20 and attaching another to the second holder 20 as described earlier. The oil absorption members 4 may of course be replaced before the oil removal count reaches 600.

To this end, the controller 170 is configured to perform a process of giving guidance to replace the oil absorption member 4 based on the count value of the oil removal count K. Specifically, the controller 170 is configured to display the guidance screen 210 for prompting to replace the oil absorption member 4 on the display 174 when the count value of the oil removal count stored in the storage 171 reaches a preset guidance threshold value.

The guidance threshold value is, e.g., 600, which is the upper limit value of the oil removal count with three oil absorption members 4. The user may set the guidance threshold value in advance. In this case, the guidance threshold value may be set in the range of 1 or more to less than 600. Multiple guidance threshold values may be set. Specifically, a guidance screen may be displayed at each of a first guidance threshold value (<600) for replacement warning designated by the user and a second guidance threshold value (=600) preset as the upper limit value of the oil removal count. In this case, different guidance screens may be displayed at the guidance threshold values. Therefore, the user may notice that the oil absorption member 4 needs to be replaced with appropriate timing. Giving a warning at the first guidance threshold value is convenient for the user because the user may, for example, check replacement of the oil absorption member 4 in stock before the number of times of removal of the oil 3 reaches the upper limit.

On the guidance screen 210, a message prompting to replace the oil absorption member 4 is displayed in a message region 211. In the message region 211, a value derived by subtracting the count value of the oil removal count from the upper limit value, or 600, is displayed as the remaining number of uses. The guidance screen 210 also includes an oil removal setting button 212, an OK button 213, and a cancel button 214. Pressing the oil removal setting button 212 displays the setting screen 220 to be described later (see FIG. 26). Pressing the OK button 213 causes the controller 170 to execute a process for replacing the oil absorption member 4 and reset the count value of the oil removal count K stored in the storage 171 after the replacement. Pressing the cancel button 214 clears the guidance screen 210.

Switching On and Off of Oil Removal Function

It may be possible that there is no replacement oil absorption member 4 in stock when the count value of the oil removal count K reaches the upper limit value (=600) as described above. Also, some users may wish to manually remove the oil 3 as in the conventional practice, instead of automatically removing the oil.

According to one or more embodiments, the controller 170 is configured to selectively operable in a first mode for executing an oil removal process and in a second mode for not executing an oil removal process. Specifically, the controller 170 displays the setting screen 220 for an oil removal process illustrated in FIG. 26 on the display 174 in response to the user's input operation.

The setting screen 220 includes a selection portion 221a for designating the first mode for executing an oil removal process, a selection portion 221b for designating the second mode for not executing an oil removal process, an OK button 222, and a cancel button 223. The selection portion 221a and the selection portion 221b are radio buttons that may be alternatively pressed. Pressing the OK button 222 causes the controller 170 to record the result of the selection between the selection portion 221a and the selection portion 221b in the storage 171 and reflects the mode setting. Pressing the cancel button 223 causes the controller 170 to close the setting screen 220 without reflecting the result of the selection. The content of the operation mode setting is recorded in the setting information 171b in the storage 171 illustrated in FIG. 10.

In case that the first mode is set, the controller 170 executes an oil removal process with the oil remover 100 on the oil removal-target smear 1 after the smear image is captured. When the second mode is set, the controller 170 controls the oil remover 100 so as not to execute an oil removal process even if an oil removal-target smear 1 is transferred to the first holder 10 from the smear imaging unit 150, and pass the smear 1 to the smear transfer unit 141 with the oil 3 adhering to the smear 1.

Process of Controlling Testing System

A process of controlling the testing system 200 is described. Reference is made to FIG. 4 for the configuration of the testing system 200 and to FIG. 10 for the configuration related to the control of the testing system 200. Steps S1 to S7 in FIG. 27 illustrate a control process executed by the controller 170, and steps S11 to S13 in FIG. 27 illustrate a process executed by the controller 191.

As preparatory work before starting the operation of the testing system 200, the user places a sample rack 8 holding the sample container 7 in the sample transporter 105 of the smear preparing unit 110. The user places a predetermined number of empty containers 5 at the introduction position E3 in the loading path 123*a* of the smear preparing unit 110 and at the setting region D2 in the second transport path 133 of the container transporter 130. In response to receiving an instruction to start preparing preparations from the user, the testing system 200 starts the control process illustrated in FIG. 27.

Figure 27:
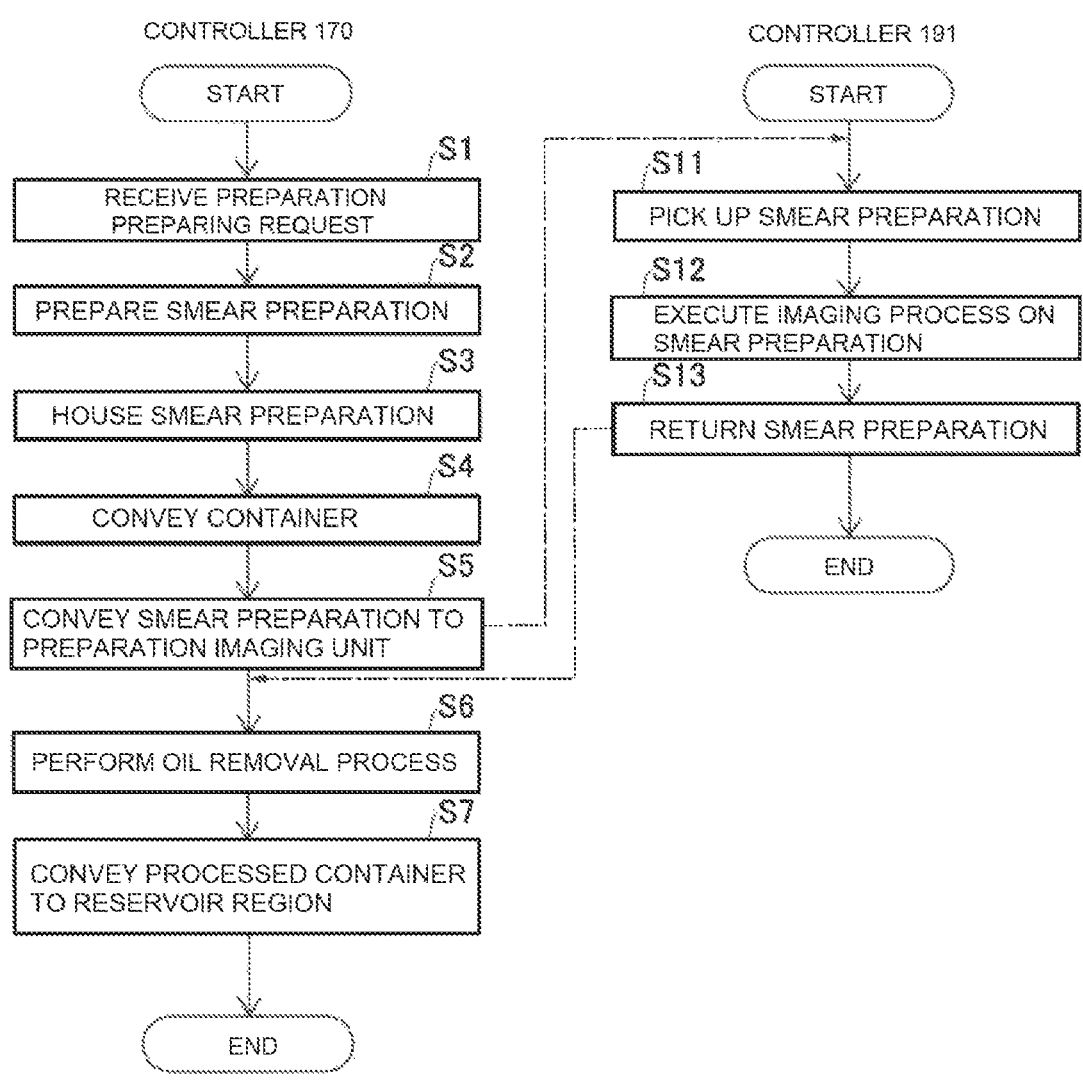
FIG. 27 is a diagram illustrating a flowchart of a process of controlling the testing system.

In step S1 of FIG. 27, the controller 170 receives a preparation preparing request. The controller 170 transports the sample rack 8 with the sample transporter 105 and obtains the ID of each sample transported to the reading position E1 with the ID reader 114*a*. The controller 170 sends the ID of each sample to the host computer 300 via the communication unit 172, and receives a smear preparing request recorded in the host computer 300 in association with the ID from the host computer 300 via the communication unit 172. The smear preparing request contains at least the ID of the sample and a testing item for the sample.

In step S2, the controller 170 performs the following control for executing an operation of preparing the smear 1. Specifically, under control of the controller 170, the slide supply unit 111 supplies an unused glass slide to the printer 112, and the printer 112 prints information corresponding to the smear preparing request on the frosted portion 2*a* of the supplied glass slide and supplies the printed glass slide to the smearing unit 113. The aspirator 114 aspirates the sample in the sample container 7 transported to the aspiration position E2 by the sample transporter 105 and supplies the aspirated sample to the smearing unit 113. The smearing unit 113 smears the sample supplied from the aspirator 114 onto the center portion 1*c* of the printed glass slide 2 supplied from the printer 112. The smear 1 on which the sample is smeared is supplied from the smearing unit 113 to the dryer 115, which performs a drying process on the smeared sample, and the smear 1 after the drying process is then subjected to a staining process. Specifically, the transfer unit 119 introduces the smear 1 into some or all of the staining tanks 116*a* to 116*e* and the cleaning tanks 117*a* and 117*b* in a predetermined order to perform a staining process and a cleaning process on the sample. The transfer unit 119 introduces the smear 1 after the staining process and the cleaning process into the drying tank 118, in which a drying process is performed. A process of preparing a single smear 1 is completed as a result of the above series of processes. The controller 170 performs the processes in step S2 sequentially on the sample containers 7 held on the sample rack 8.

In step S3, the controller 170 performs control so as to store the prepared smear 1 into the container 5. At the start of the preparation preparing operation, the controller 170 causes the transporter 123 to operate so as to position the head container 5 set in the introduction position E3 to the smear storage position E4 in advance. After the smear 1 is prepared in step S2, the controller 170 picks up the smear 1 from the drying tank 118 with the transfer unit 119 and stores the picked up smear 1 into an empty storage 5*a* of the container 5 at the smear storage position E4.

After the sample in every sample container 7 held on the sample rack 8 is aspirated, the processes of steps S1 to S3 are performed for the next sample rack 8. Thus, as long as there are samples to be processed in the sample transporter 105, the processes of steps S1 to S3 are continuously executed with the start points shifted by a predetermined time interval. Thus, in step S2 described above, the smears 1 are sequentially prepared by a unit quantity (one) and, each time a smear 1 is created, the created smear 1 is stored in the container 5 in step S3.

In case that the container 5 at the smear storage position E4 gets filled with the smear 1, the controller 170 transports the container 5 to the container transporter 130 from the smear storage position E4 in step S4. Specifically, the controller 170 transfers the container 5 at the smear storage position E4 from the loading path 123*a* to the unloading path 123*b* with the transverse feed mechanism 123*c*, and transports the transferred container 5 to the transverse feed unit 124 through the unloading path 123*b*. The controller 170 sends the container 5 to the first transport path 132 of the container transporter 130 with the transverse feed unit 124.

In step S5, the controller 170 performs the following control for transporting the smear 1 toward the smear imaging unit 150. Specifically, under control of the controller 170, the first transport path 132 transports the container 5 received in the first transport path 132 to the pickup position C1. After the container 5 is transported to the pickup position C1, the controller 170 images the information printed on the frosted portion 2*a* of each smear 1 with the detector 160, which is a camera, and determines based on the obtained imaging signals whether the smear 1 is an imaging target or not. The preparation type determination is performed on all of the smears 1 stored in the container 5.

Based on the result of the determination, the controller 170 picks up an imaging-target smear 1 from the container 5 at the pickup position C1 with the smear transfer unit 141, and passes the picked up smear 1 to the second storage 12 of the first holder 10 of the oil remover 100 at the second position P2. The controller 170 moves the first holder 10 to the first position P1 from the second position P2 in order to pass the smear 1 to the smear passing unit 151. The controller 170 sequentially transports all imaging-target smears 1 stored in the container 5 to the smear passing unit 151.

In step S11, the controller 191 of the smear imaging unit 150 picks up the smear 1 held in the second storage 12 of the first holder 10 of the oil remover 100 with the smear passing unit 151. The dashed arrows in FIG. 27 indicate the passing of the smear 1 between the first holder 10 and the smear passing unit 151.

In step S12, the controller 191 executes a process of imaging the smear 1. First, the controller 191 transports the imaging-target smear 1 picked up by the smear passing unit 151 to the oil application unit 153 and the imaging unit 154 with the transporter 152. The controller 191 applies the oil 3 onto the smear 1 with the oil application unit 153 and images the smear 1 to which the oil 3 is applied with the imaging unit 154. After the imaging, the controller 191 returns the imaged smear 1 to the smear passing unit 151 with the transporter 152 in order to pass the imaged smear 1 to the oil remover 100. In step S13, the controller 191 returns the imaged smear 1 to the first storage 11 of the first holder 10 of the oil remover 100 with the smear passing unit 151.

In step S6, the controller 170 performs an oil removal process with the oil remover 100. The controller 170 receives the imaged smear 1 (i.e., oil removal-target smear 1) transported from the smear imaging unit 150 into the first storage 11 of the first holder 10 and executes an oil removal operation on the smear 1 on whether the first mode is set. In case that the second mode is set, the controller 170 does not execute an oil removal operation on the smear 1. The controller 170 then moves the first holder 10 to the second position P2. The controller 170 picks up the imaged smear 1 from the oil remover 100 at the second position P2 with the smear transfer unit 141 and stores the imaged smear 1 into an empty storage 5a of the container 5 transported to the imaged smear storage position D1 in advance. Details of the oil removal process in step S6 are described later.

After completing the imaging process for all of the imaging-target smears 1 in the container 5 positioned at the pickup position C1, the controller 170, in step S7, transports the container 5 positioned at the pickup position C1 to the first retention region C3 from the pickup position C1 and transports the next container 5 waiting at the wait position C2 to the pickup position C1 with the first transport path 132. After step S7, the controller 170 terminates the process.

Oil Removal Process

Details of the oil removal process illustrated in step S6 of FIG. 27 are described with reference to FIG. 28. The oil removal process is performed in accordance with control by the controller 170.

In step S21, the controller 170 performs control for receiving the oil removal-target smear 1 into the first holder 10. Specifically, the controller 170 positions the first holder 10 to the first position P1 (see FIG. 15) with the horizontal driving unit 30b. The controller 170 positions the first holder 10 to the first angular position R1 (see FIG. 11) with the pivotal driving unit 30a. In this state, the controller 191 positions the imaged smear 1 in the first storage 11 of the first holder 10 with the smear passing unit 151 in the process of step S13 in FIG. 27. A smear 1 yet to be imaged may be held in the second storage 12 of the first holder 10. In this case, in the process of step S11 in FIG. 27, the controller 191 picks up the to-be-imaged smear 1 from the second storage 12 with the smear passing unit 151 for the next smear imaging.

In step S22, the controller 170 refers to the setting information 171b in the storage 171 and determines whether the mode of the oil remover 100 is set to the first mode. The controller 170 advances the process to step S23 in case that the current mode is set to the first mode for executing oil removal. The controller 170 advances the process to step S29 in case that the current mode is set to the second mode for not executing oil removal.

In step S23, the controller 170 determines whether the current oil removal count K is M (=300) or less. Specifically, the controller 170 determines whether the current oil removal-target smear 1 belongs to the first group (1st to 300th) or to the second group (301st to 600th). In case that the current oil removal count K is 300 or less (the current smear 1 belongs to the first group), the controller 170 executes step S24a and step 25a. In case that the current oil removal count K is more than 300 (the current smear 1 belongs to the second group), the controller 170 executes step S24b and step 25b.

Oil Removal on Smear in First Group

In step S24a, the controller 170 performs control for executing the primary removal operation with the first oil absorption member 4a. First, the controller 170 moves the first holder 10 to the arranged position P3a (see FIG. 15) of the first oil absorption member 4a from the first position P1 with the horizontal driving unit 30b. The controller 170 controls the pivotal driving unit 30a with the driving of the horizontal driving unit 30b stopped to execute the primary removal operation of bringing the smear surface 1a of the smear 1 held in the first storage 11 of the first holder 10 into and out of contact with the first oil absorption member 4a. As described above, in the primary removal operation, the controller 170 brings the smear surface 1a into contact with the first oil absorption member 4a once and maintains the contacting state for 3 seconds. After the primary removal operation, the controller 170 positions the first holder 10 at the third angular position R3 with the pivotal driving unit 30a.

In step S25a, the controller 170 performs control for executing the secondary removal operation with the second oil absorption member 4b. Specifically, the controller 170 moves the first holder 10 to the arranged position P3b (see FIG. 15) of the second oil absorption member 4b with the horizontal driving unit 30b. The controller 170 controls the pivotal driving unit 30a with the driving of the horizontal driving unit 30b stopped to execute the secondary removal operation of bringing the smear surface 1a of the smear 1 held in the first storage 11 of the first holder 10 into and out of contact with the second oil absorption member 4b. As described above, in the secondary removal operation, the controller 170 brings the smear surface 1a into contact with the second oil absorption member 4b three times and maintains the contacting state for 1 second during each of the three contacting actions. After the secondary removal operation, the controller 170 positions the first holder 10 at the third angular position R3 with the pivotal driving unit 30a.

Oil Removal on Smear in Second Group

In step S24b, the controller 170 performs control for executing the primary removal operation with the second oil absorption member 4b. First, the controller 170 moves the first holder 10 to the arranged position P3b (see FIG. 15) of the second oil absorption member 4b from the first position P1 with the horizontal driving unit 30b. The controller 170 controls the pivotal driving unit 30a with the driving of the horizontal driving unit 30b stopped to execute the primary removal operation of bringing the smear surface 1a of the smear 1 held in the first storage 11 of the first holder 10 into and out of contact with the second oil absorption member 4b. As described above, in the primary removal operation, the controller 170 brings the smear surface 1a into contact with the first oil absorption member 4a once and maintains the contacting state for 3 seconds. After the primary removal operation, the controller 170 positions the first holder 10 at the third angular position R3 with the pivotal driving unit 30a.

In step S25b, the controller 170 performs control for executing the secondary removal operation with the third oil absorption member 4c. Specifically, the controller 170 moves the first holder 10 to the arranged position P3c (see FIG. 15) of the third oil absorption member 4c with the horizontal driving unit 30b. The controller 170 controls the pivotal driving unit 30a with the driving of the horizontal driving unit 30b stopped to execute the secondary removal operation of bringing the smear surface 1a of the smear 1 held in the first storage 11 of the first holder 10 into and out of contact with the third oil absorption member 4c. As described above, in the secondary removal operation, the controller 170 brings the smear surface 1a into contact with the second oil absorption member 4b three times and maintains the contacting state for 1 second during each of the three contacting actions. After the secondary removal operation, the controller 170 positions the first holder 10 at the third angular position R3 with the pivotal driving unit 30a.

After the oil removal operations is step S26, in which the controller 170 adds "1" to the current oil removal count K.

In step S27, the controller 170 refers to the guidance threshold value set in the storage 171 and determines whether the current oil removal count K is less than the guidance threshold value. In case that the current oil removal count K is less than the guidance threshold value, the controller 170 advances the process to step S29. In case that the current oil removal count K is the guidance threshold value or more, the controller 170 advances the process to step S28.

In step S28, the controller 170 displays the guidance screen 210 (see FIG. 25) on the display 174. Therefore, the user may notice that the number of uses of the oil absorption members 4 reaches the guidance threshold value. In case that the user replaces the oil absorption members 4 following the displayed guidance screen 210 and presses the OK button 213 in the guidance screen 210, the controller 170 resets the value of the current oil removal count K to zero.

In step S29, the controller 170 performs control for taking the smear 1 out of the first holder 10 with the smear transfer unit 141. Specifically, the controller 170 moves the first holder 10 to the second position P2 (see FIG. 15) with the horizontal driving unit 30b. The controller 170 positions the first holder 10 to the second angular position R2 (see FIG. 13) from the third angular position R3 with the pivotal driving unit 30a. In case that there is a smear 1 to be imaged next in the state, the controller 170 picks up the next imaging-target smear 1 from the container 5 with the smear transfer unit 141 and transfers the smear 1 to the second storage 12 of the first holder 10. The controller 170 picks up the smear 1 held in the first storage 11 of the first holder 10 from the first storage 11 with the smear transfer unit 141.

Thereafter, in step S30, the controller 170 performs control for storing the smear 1 picked up by the smear transfer unit 141 into an empty storage 5a of the container 5 transported to the imaged smear storage position D1 in advance.

As described above, steps S21 to S30 are operations in the process of returning an imaged smear 1 into the container 5, and are performed in parallel with the operation of passing the smear 1 to the smear passing unit 151 from the first holder 10 in step S11 illustrated in FIG. 27. Specifically, an operation of passing an imaging-target smear 1 to the smear passing unit 151 is executed using the second storage 12 of the first holder 10, and an oil removal process of an oil removal-target smear 1 is executed using the first storage 11 of the first holder 10.

In step S6 of FIG. 27, the smears 1 are sequentially subjected to an operation of removing the oil 3 adhering to the smear surface 1a by bringing the smear surface 1a and the contact surface CS into and out of contact with each other, taking the smear 1 out of the first holder 10 with the smear transfer unit 141, and storing the smear 1 picked up from the first holder 10 into the container 5 with the smear transfer unit 141.

In case that step S22 of FIG. 28 determines that the first mode is not set (the second mode is set), the smear 1 stored in the first storage 11 of the first holder 10 in step S21 is picked up with the smear transfer unit 141 in step S29 without oil removal, and stored in the container 5 at the imaged smear storage position D1 in step S30.

The operation of the testing system 200 is controlled in the above-described manner.

EXAMPLES

Example 1 and Example 2 of the oil removal process by the oil remover 100 according to one or more embodiments are described.

Example 1

Figure 29:
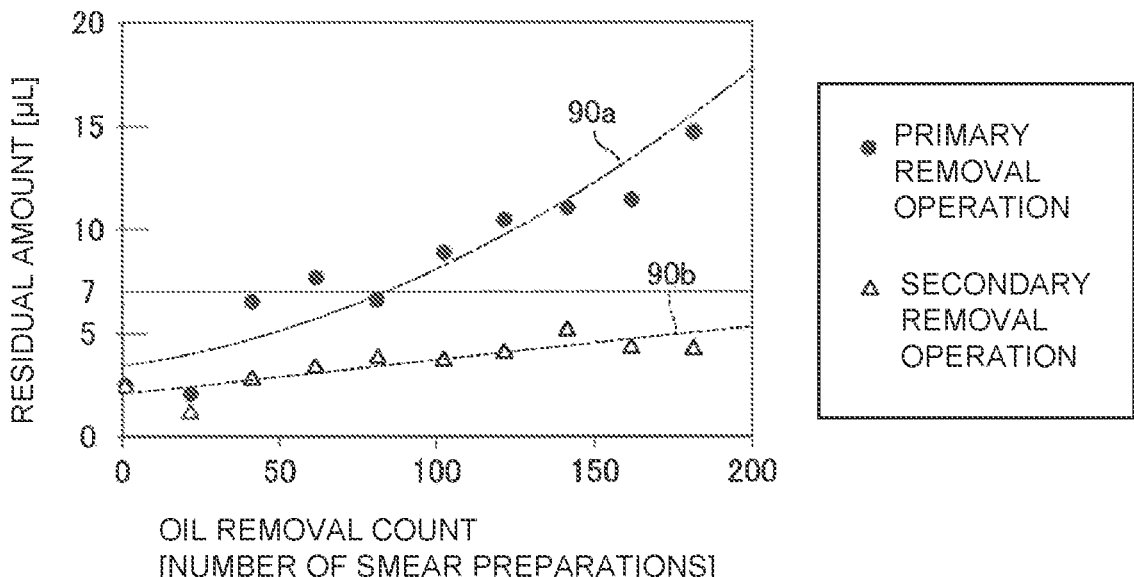
FIG. 29 is a diagram illustrating a graph of relationships between an oil removal count and a residual oil amount in examples.

In Example 1, the change in the residual amount of the oil 3 by the number of smears 1 subjected to an oil removal process (oil removal count) is measured. The oil removal process is performed using the identical oil absorption member 4a and the oil absorption member 4b on 200 of the smears 1 with the initial amount of the oil 3 adhering set to 50 [μL]. The residual amount of the oil 3 on the smear surface 1a of each smear 1 after the oil removal process is measured. FIG. 29 is a diagram illustrating a graph indicating the test results, with the horizontal axis representing the oil removal count [the number of smears] and the vertical axis representing the residual amount of the oil 3 on the smear surface 1a [μL]. In the graph of FIG. 29, the "first removal" plot indicates residual amounts in a case of performing only the primary removal operation with the oil absorption member 4a, and a curve 90a is an approximate curve of the "first removal" plot. The "second removal" plot indicates residual amounts in a case of performing the primary removal operation with the oil absorption member 4a and the secondary removal operation with the oil absorption member 4b, and a curve 90b is an approximate curve of the "second removal" plot.

According to interviews with users who conduct microscopic examination by the inventors of the present application regarding the residual amount of the oil 3, it is found that with a residual amount of about 7 μL the oil 3 on the smear surface 1a does not obstruct observation and oil removal using xylene is not necessary.

From the "first removal" plot and the curve 90a in FIG. 29, it is found that performing only the primary removal operation with a single oil absorption member 4 can reduce the residual amount to below 7 μL during an initial stage where the oil removal count is low, but the residual amount increases beyond 7 μL as the oil removal count increases.

From the "second removal" plot and the curve 90b in FIG. 29, it is found that additionally performing the secondary removal operation with a different oil absorption member 4 may further reduce the residual amount as compared to the curve 90a. Comparing the curves 90a and 90b, in the case of additionally performing the secondary removal operation, the residual amount increases less with the increase in oil removal count, and the removing effect is maintained over a long period of time. The residual amount is also reduced to less than 7 μL at least with all of the 200 of the smears 1 tested in Example 1.

The above-mentioned findings indicate that performing only the primary removal operation and performing both the first and secondary removal operations may both achieve a high oil removal ability that may reduce the residual oil amount to a level suitable for microscopic examination (7 μL). Also, comparing the case of performing only the primary removal operation and the case of additionally performing the secondary removal operation, additionally performing the secondary removal operation may achieve a higher effect of maintaining the oil removal ability and thus effectively reduce the frequency of replacement of the oil absorption members 4.

Example 2

In Example 2, oil removal operations are performed under two conditions differing in the number of times of contact between the smear surface 1a and an oil absorption member 4, and the residual amounts of the oil 3 under the following conditions are measured.

Specifically, an oil removal test is conducted under a condition A and a condition B below.

Condition A: The number of times of contact is one and the contact time is 3 seconds in the primary removal operation.

The number of times of contact is one and the contact time is 3 seconds in the secondary removal operation.

Condition B: The number of times of contact is one and the contact time is 3 seconds in the primary removal operation.

The number of times of contact is three and the contact time is 1 second in the secondary removal operation.

The oil removal test is conducted three times, in each of which the amount of the oil before the removal, the amount of the oil absorbed by the oil absorption members 4, the residual amount of the oil on the smear surface 1*a*, and the difference in residual amount between the condition A and the condition B are derived.

FIG. 36 illustrates the test results.

As illustrated in FIG. 36, in each test result, the residual oil amount under the condition B (test No. 1B, 2B, 3B) is lower than the residual oil amount under the condition A (test No. 1A, 2A, 3A). The total time length of being in the contacting state is the same between the condition A and the condition B. Thus, from the above results, multiple times of contact effectively reduce the residual oil amount.

OTHER VARIATIONS

The embodiment and examples disclosed above shall be considered illustrative and non-limiting in all respects. The scope of the present disclosure is indicated by the claims, not by the description of the above embodiment and examples, and further includes all variations within the meaning and scope equivalents to the claims.

For example, in the above embodiment, an example is presented in which the movement mechanism 30 moves the first holder 10 with respect to the second holder 20 configured not to move, but the present disclosure is not limited to this example. The movement mechanism 30 may move the second holder 20 with respect to the first holder 10 configured not to move. The movement mechanism 30 may move both of the first holder 10 and the second holder 20.

Figure 30:
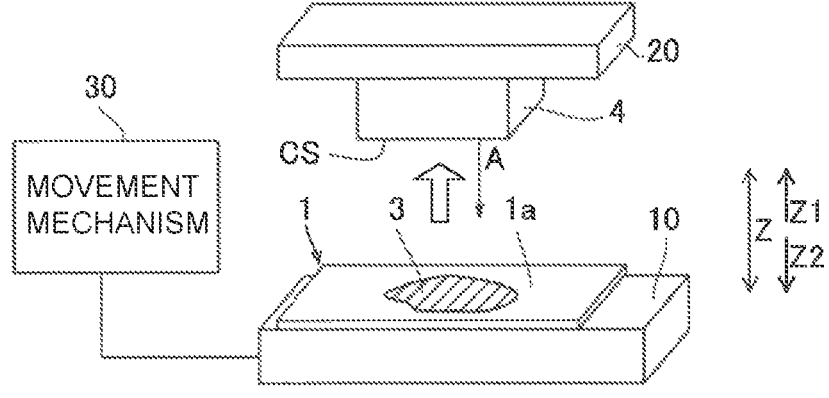
FIG. 30 is an explanatory diagram illustrating a perspective view of a first variation of the oil remover.
Figure 31:
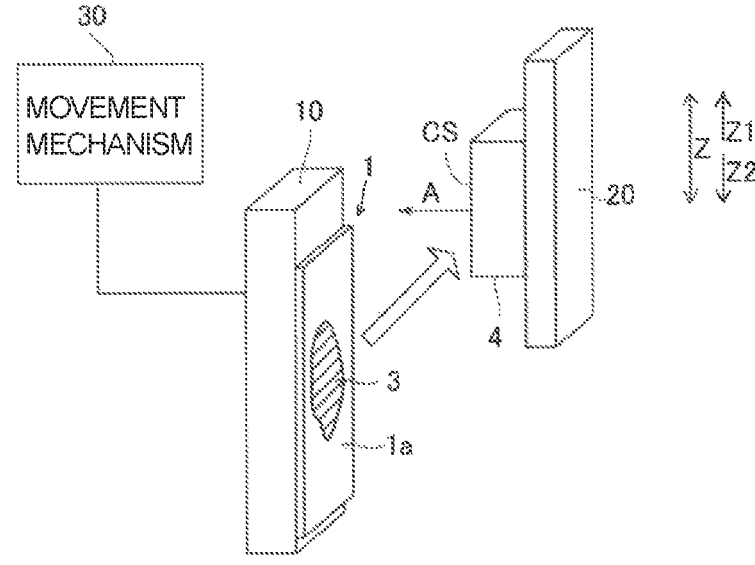
FIG. 31 is an explanatory diagram illustrating a perspective view of a second variation of the oil remover.

In the above embodiment, an example is presented in which the first holder 10 is pivoted about the rotation shaft 32 to move the smear 1 about the rotation shaft 32 into contact with an oil absorption member 4, but the present disclosure is not limited to this example. As illustrated in FIG. 30 and FIG. 31, the smear 1 (first holder 10) may be moved linearly to bring the smear surface 1*a* and the oil absorption member 4 into contact with each other. The direction of the linear movement may be the normal direction to the contact surface CS (A direction) as illustrated in FIG. 30 or a direction tilted with respect to the normal direction to the contact surface CS as illustrated in FIG. 31. In FIG. 30 and FIG. 31, the movement mechanism 30 may move the second holder 20 instead of the first holder 10 or move both of the first holder 10 and the second holder 20.

In the above embodiment, an example is presented in which a smear 1 is positioned along the vertical direction to horizontally face an oil absorption member 4 and the smear surface 1*a* and the contact surface CS are brought into surface contact with each other from this state, but the present disclosure is not limited to this example. As illustrated in FIG. 30, the smear 1 may be positioned along a horizontal direction to make the smear surface 1*a* face the contact surface CS of the oil absorption member 4 in the vertical direction.

In FIG. 30, the movement mechanism 30 is configured to position a smear 1 along the horizontal direction to make the contact surface CS of an oil absorption member 4 and the smear surface 1*a* face each other in the vertical direction, and brings the smear surface 1*a* and the contact surface CS into surface contact with each other from this state. Specifically, the movement mechanism 30 positions the smear 1 with the smear surface 1*a* facing upward (Z1 direction) and causes the oil absorption member 4 positioned at a separated position above the smear 1 and the smear 1 to make a relative movement in the Z direction toward each other to thereby bring the smear surface 1*a* into contact with the contact surface CS. The movement mechanism 30 may move the first holder 10 upward or move the second holder 20 downward. Since microscopic images are usually captured with the smear 1 positioned along the horizontal direction, the above configuration may remove the oil 3 from the smear 1 in the same orientation as the orientation during the imaging. Therefore, the need for a mechanism to change the orientation of the smear 1 is eliminated and the apparatus configuration is simplified. Moreover, not changing the orientation of the smear 1 lowers the possibility of the oil 3 adhering to the smear surface 1*a* moving or falling off the smear 1.

Figure 32:
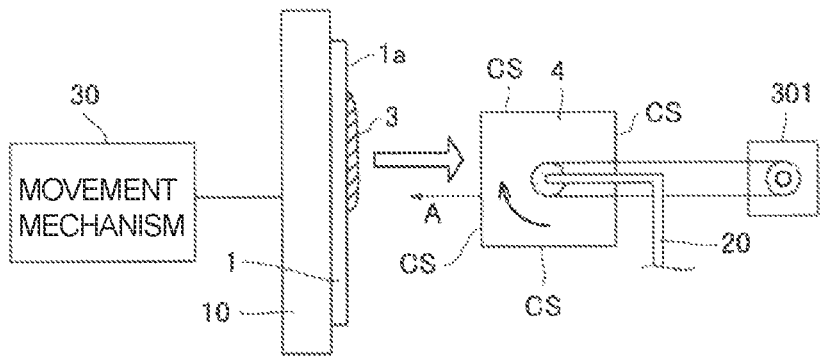
FIG. 32 is an explanatory diagram illustrating a third variation of the oil remover.

In the above embodiment, an example is presented in which the smear surface 1*a* of a single smear 1 is brought into contact with oil absorption members 4, but the present disclosure is not limited to this example. In the present disclosure, the smear surface 1*a* of a single smear 1 may be brought into contact only with a single oil absorption member 4. In doing so, the smear surface 1*a* of the single smear 1 may be brought into contact with different regions on the single oil absorption member 4. For example, as illustrated in FIG. 32, the smear surface 1*a* may be brought into contact with each of contact surfaces CS of an oil absorption member 4 by changing the orientation of the oil absorption member 4 with an orientation change unit 301. An oil absorption member 4 having a contact surface CS with larger dimensions than the smear surface 1*a* may be provided, and the smear surface 1*a* may be brought into contact with multiple spots within the contact surface CS in turn.

In the above embodiment, an example is presented in which the oil 3 adhering to the smear surface 1*a* is absorbed by porous oil absorption members 4, but the present disclosure is not limited to this example. In the present disclosure, for example, an oil absorption member with pores formed therethrough from one end surface to the opposite end surface may be supplied with a negative pressure supplied at the opposite end surface, and the smear surface 1*a* of a smear 1 may be brought into contact with the one end surface to thereby aspirate the oil 3 adhering to the smear surface 1*a* into the pores. In this case, the oil remover 100 may include a syringe pump or an ejector as a negative-pressure supply source.

Figure 33:
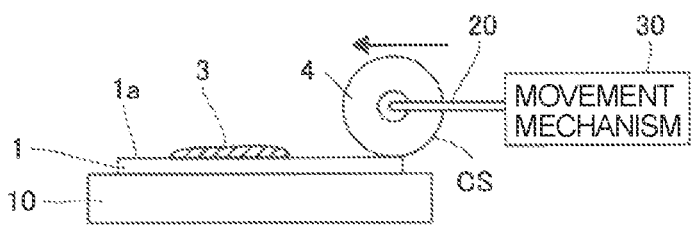
FIG. 33 is an explanatory diagram illustrating a fourth variation of the oil remover.

In the above embodiment, an example is presented in which the smear surface 1*a* and the contact surface CS do not move with respect to each other while the smear surface 1*a* and the contact surface CS are in a contacting state, but the present disclosure is not limited to this example. In the present disclosure, the smear surface 1*a* and the contact surface CS may move with respect to each other while the smear surface 1*a* and the contact surface CS are in a contacting state. For example, as illustrated in FIG. 33, an oil absorption member 4 may be formed in a rotatable roller shape and rolled over the smear surface 1*a*. In FIG. 33, the roller-shaped oil absorption member 4 is held by the second holder 20. The contact surface CS is the cylindrical outer peripheral surface of the oil absorption member 4. The movement mechanism 30 moves the second holder 20 in a direction along the smear surface 1*a* to bring the oil absorption member 4 and the smear surface 1*a* into a contacting state and a separated state. While a single oil absorption member 4 is provided in FIG. 33, oil absorption members 4 may be provided.

Figure 34:
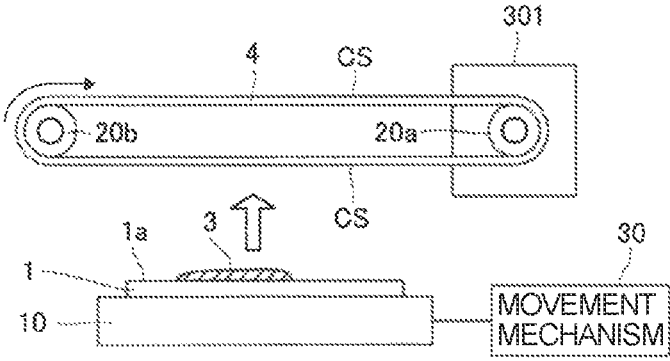
FIG. 34 is an explanatory diagram illustrating a fifth variation of the oil remover.

In FIG. 34, an oil absorption member 4 is formed as a looped belt. The second holder 20*a* and the second holder 20*b* are rotatable pulleys, and the oil absorption member 4 is looped between the second holder 20*a* and the second holder 20*b*. The looped outer peripheral surface of the oil absorption member 4 is the contact surface CS. The second holder 20*a* is rotationally driven by the orientation change unit 301 including a motor. As the second holder 20*a* rotates, the belt-shaped oil absorption member 4 rotates in a circular motion. The movement mechanism 30 moves the first holder 10 so as to bring the smear surface 1*a* of a smear 1 held by the first holder 10 and the contact surface CS of the oil absorption member 4 into a contacting state and a separated state. By rotating the oil absorption member 4 in a circular motion during the separated state, the region of the contact surface CS to be in contact with the smear surface 1*a* may be changed so as to spread the spots that absorb the oil 3.

Figure 35:
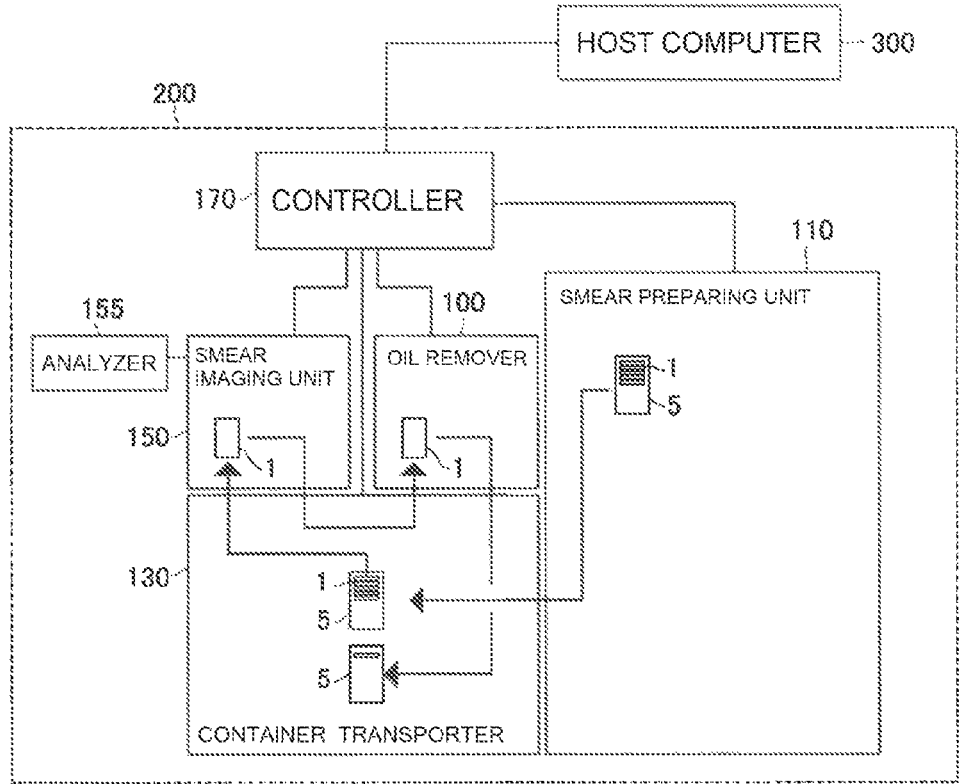
FIG. 35 is an explanatory diagram illustrating a variation of the testing system.

In the above embodiment, an example is presented in which the oil remover 100 is provided to the container transporter 130 of the testing system 200, but the present disclosure is not limited to this example. For example, in the present disclosure, the oil remover 100 may be provided to the smear imaging unit 150 of the testing system 200. Alternatively, as illustrated in FIG. 35, the oil remover 100 may be configured as an independent unit within the testing system 200, and the oil remover 100 and the smear imaging unit 150 may be arranged in parallel with respect to the container transporter 130. In this case, the container transporter 130 receives an imaged smear 1 from the smear imaging unit 150 and then supplies the received smear 1 to the oil remover 100, and the oil remover 100 performs an oil removal process on the smear 1. After the oil removal process, the container transporter 130 receives the oil-removed smear 1 from the oil remover 100 and stores the received smear 1 into a container 5. The oil remover 100 may be configured as a stand-alone apparatus, instead of being incorporated in the testing system 200. In this case, the user may pick up a smear 1 after imaging by a preparation imaging apparatus from the preparation imaging apparatus and manually place the smear 1 into the first holder 10 of the oil remover 100.

In the above embodiment, the controller 170 of the smear preparing unit 110 controls the container transporter 130 including the oil remover 100. Alternatively, the controller 170 may be provided as a separate component from the smear preparing unit 110, as illustrated in FIG. 35. In FIG. 35, the controller 170 is provided as a separate control unit from the smear preparing unit 110, the container transporter 130, and the smear imaging unit 150. In FIG. 35, the controller 170 controls the oil remover 100, the smear preparing unit 110, the container transporter 130, and the smear imaging unit 150. Besides the above, a control unit that controls the oil remover 100 may be provided to the container transporter 130, and a control unit dedicated for the oil remover 100 may be provided to the oil remover 100.

Figure 10:
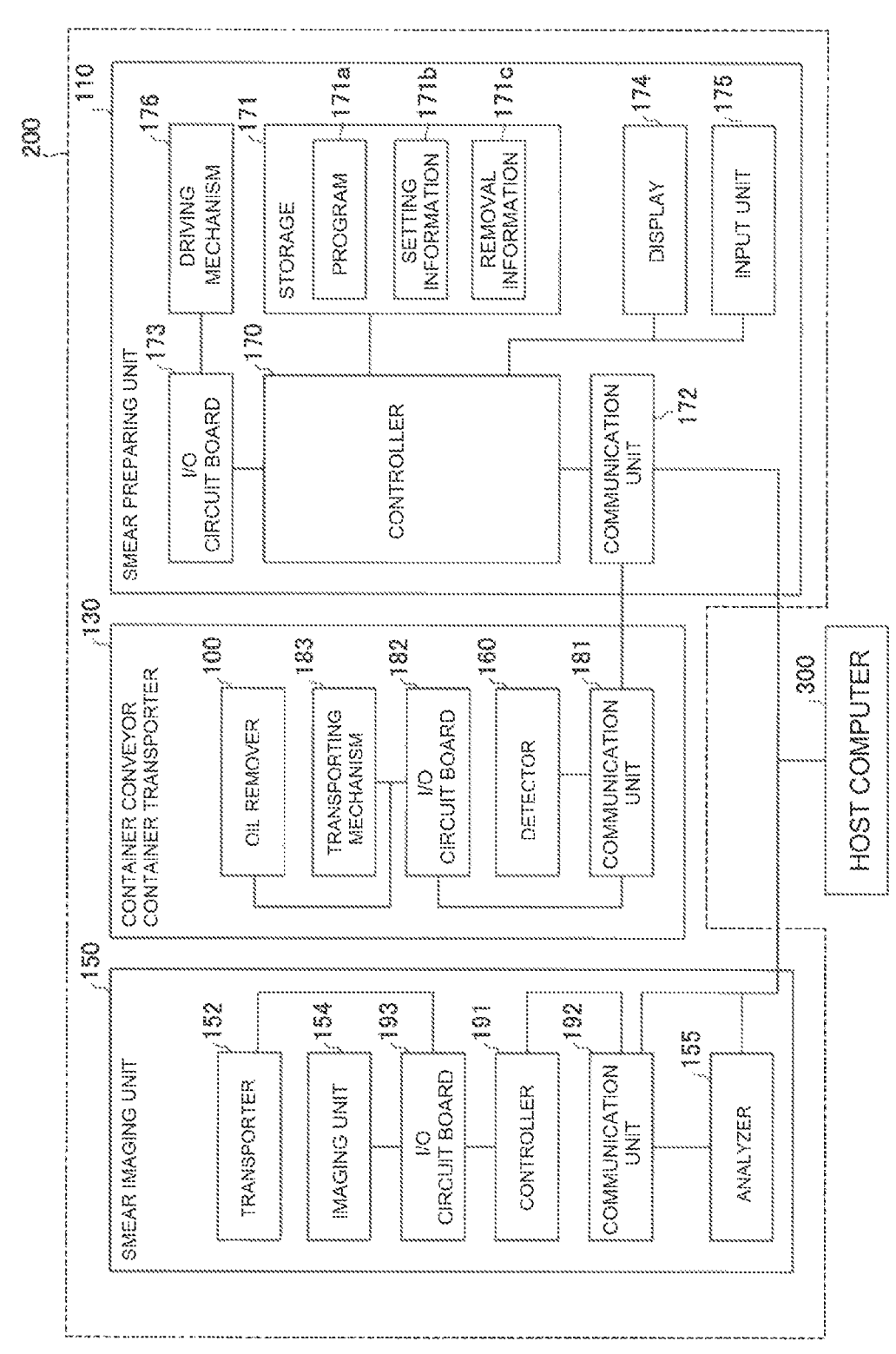
FIG. 10 is a block diagram illustrating a configuration related to a control of the testing system.

Specifically, in FIG. 10, the oil remover 100 may be provided with a control unit to control the oil remover 100. In FIG. 10, the controller 191 of the smear imaging unit 150 may be configured to control the oil remover 100. In the present disclosure, the control unit of the oil remover 100 may be provided to any of the constituent apparatuses of the testing system 200.

As a supplementary note, an oil removal method, an oil remover, and a testing system according to one or more embodiments are summarized.

An oil removal method of removing an oil for an oil immersion object lens adhering to a smear surface of a smear of a sample, comprising:

removing the oil by moving at least one of a first holder holding the smear to be subjected to oil removal or a second holder holding an oil absorption member that absorbs the oil from a separated state where a contact surface of the oil absorption member and the smear surface are positioned away from each other to a contacting state where the smear surface and the contact surface are in contact with each other; and moving at least one of the first holder or the second holder from the contacting state to the separated state after removing the oil.

In the oil removal method, the smear surface and the contact surface are brought into contact with each other from a state where the smear surface and the contact surface face each other in a normal direction to the contact surface.

In the oil removal method, the oil absorption member comprises an elastically deformable porous member, and the oil absorption member is compressed by the smear surface in the contacting state.

In the oil removal method, the smear surface of the smear is brought into contact with the oil absorption member a plurality of times.

In the oil removal method, in case that the smear surface and the oil absorption member are brought into and out of contact with each other, the smear surface of the smear is brought into contact with two or more of oil absorption members.

In the oil removal method, for each of smears in a first group, the smear surface is brought into contact with a first oil absorption member of the oil absorption members and then the smear surface is brought into contact with a second oil absorption member of the oil absorption members, and for each of smears in a second group that is different from the first group, the smear surface is brought into contact with the second oil absorption member of the oil absorption members and then the smear surface is brought into contact with a third oil absorption member of the oil absorption members.

In the oil removal method, the smear surface of the smear is brought into contact with an oil absorption member of the oil absorption members a first number of times and then the smear surface is brought into contact with another oil absorption member of the oil absorption members a second number of times that is greater than the first number of times.

In the oil removal method, relative positions of the first holder and the second holder are maintained to such an extent that the smear surface and the contact surface do not slide with respect to each other in the contacting state.

In the oil removal method, the contact surface of the oil absorption member is formed to be smaller than the smear surface of the smear, and in case that the smear surface and the contact surface are brought into contact with each other, the smear surface and the contact surface are brought into contact with each other such that the contact surface is situated inward of an outer peripheral edge of the smear surface.

In the oil removal method, the oil absorption member comprises a porous member with a continuous pore structure.

The oil removal method further comprises:

for each of smears, taking the smear out of the first holder with a smear transfer unit after removing the oil adhering to the smear surface by bringing the smear surface and the contact surface into and out of contact with each other; and storing the smear picked up from the first holder into a container with the smear transfer unit.

In the oil removal method, a movement from the separated state to the contacting state and a movement from the contacting state to the separated state are performed by moving the first holder with a movement mechanism.

In the oil removal method, a movement from the separated state to the contacting state and a movement from the contacting state to the separated state are performed by moving the second holder with a movement mechanism.

An oil remover that removes an oil for an oil immersion object lens adhering to a smear surface of a smear of a sample comprising:

a first holder that holds the smear to be subjected to oil removal;

a second holder that holds an oil absorption member which absorbs the oil; and a movement mechanism that moves at least one of the first holder or the second holder so as to shift from a separated state where a contact surface of the oil absorption member and the smear surface are positioned away from each other to a contacting state where the smear surface and the contact surface are in contact with each other.

In the oil remover, the movement mechanism brings the smear surface and the contact surface into contact with each other from a state where the smear surface and the contact surface face each other in a normal direction to the smear surface.

In the oil remover, the oil absorption member comprises an elastically deformable porous member, and the movement mechanism compresses the oil absorption member with the smear surface in the contacting state.

The oil remover further comprises a controller that controls the movement mechanism so as to bring the smear surface of the smear into contact with the oil absorption member a plurality of times.

In the oil remover, the second holder holds the oil absorption members, and the controller controls the movement mechanism so as to bring the smear surface of the smear into contact with each of two or more of the oil absorption members.

In the oil remover, the second holder holds a first oil absorption member, a second oil absorption member, and a third oil absorption member, and the controller controls the movement mechanism. For each of smears in a first group, the smear surface contacts the first oil absorption member and then the smear surface contacts the second oil absorption member, and for each of smears in a second group different from the first group, the smear surface contacts the second oil absorption member and then the smear surface contacts the third oil absorption member.

In the oil remover, the controller controls the movement mechanism so as to bring the smear surface of the smear into contact with an oil absorption member of the oil absorption members a first number of times and then bring the smear surface into contact with another one of the oil absorption members a second number of times greater than the first number of times.

The oil remover further comprises a controller that controls the movement mechanism so as to maintain relative positions of the first holder and the second holder to such an extent that the smear surface and the contact surface do not slide with respect to each other in the contacting state.

In the oil remover, the contact surface of the oil absorption member is formed to be smaller than the smear surface of the smear, and the oil remover further comprises a controller that controls the movement mechanism so as to bring the smear surface and the contact surface into contact with each other such that the contact surface is situated inward of an outer peripheral edge of the smear surface.

In the oil remover, the second holder comprises a holder that is detachably provided to the second, and the oil absorption member is adhering to the holder.

In the oil remover, the oil absorption member comprises a porous member with a continuous pore structure.

In the oil remover, the movement mechanism moves the first holder between a first position at which the smear to be subjected to oil removal is held by the first holder and a second position at which the smear after the oil removal is picked up from the first holder, and the second holder holds the oil absorption member at a position between the first position and the second position.

In the oil remover, the movement mechanism comprises:

a pivotal driving unit that brings the smear surface and the contact surface into and out of contact with each other by pivoting the first holder about a rotation shaft lying in a horizontal plane while supporting an end portion of the first holder, and a horizontal driving unit that moves the first holder between the first position and the second position by moving the first holder in a horizontal direction.

A transporting apparatus comprising:

the oil remover described above;

a smear transfer unit that transfers the smear; and a container transport path that transports a container stores the smears, wherein for each of the smears, the smear transfer unit picks up the smear from the first holder after the oil is removed by the oil remover, and store the smear picked up from the first holder into the container.

A testing system comprising:

the oil remover described above;

a smear preparing unit that prepares a smear being a glass slide with a sample smeared thereon, and stores the prepared smear into a container stores the smears;

a container transporter that receives the container from the smear preparing unit and transports the smear stored in the container; and a smear imaging unit that supplies an oil onto a smear surface of the smear transported from the container transporter and images the smear with an oil immersion object lens, wherein the container transporter receives the imaged smear from the smear imaging unit, remove the oil with the oil remover, and then store the smear into the container.

The invention claimed is:

1. A testing system comprising:

a smear preparing device configured to prepare a smear being a glass slide with a sample smeared thereon;

a smear imaging device configured to supply an oil onto the smear prepared by the smear preparing device and image the smear with an oil immersion object lens; and an oil remover configured to remove, after imaging by the smear imaging device, the oil for the oil immersion object lens adhering to the smear prepared by the smear preparing device, wherein the oil remover comprises:

a first holder that holds the smear to be subjected to oil removal;

a second holder that holds one or more oil absorption members which absorbs the oil;

a movement mechanism that is configured to move at least one of the first holder and the second holder so as to shift from a separated state where a contact surface of at least one of the one or more oil absorption members and the smear are positioned away from each other to a contacting state where the smear and the contact surface are in contact with each other; and a controller that is configured to control the movement mechanism, wherein the second holder holds the one or more oil absorption members comprising plural oil absorption members, and the controller is configured to control the movement mechanism to bring the smear into contact with two or more of the plural oil absorption members.

2. The testing system according to claim 1, wherein the movement mechanism is configured to bring the smear and the contact surface into contact with each other from a state where the smear and the contact surface face each other in a normal direction to the smear.

3. The testing system according to claim 1, wherein each of the plural oil absorption members comprises an elastically deformable porous member, and the movement mechanism is configured to move the at least one of the first holder and the second holder to compress at least one of the plural oil absorption members with the smear in the contacting state.

4. The testing system according to claim 1, wherein the second holder holds the plural oil absorption members comprising a first oil absorption member, a second oil absorption member, and a third oil absorption member, and the controller is configured, for each of smears in a first group, to control the movement mechanism to bring the smear into contact with the first oil absorption member and then into contact with the second oil absorption member, and the controller is configured, for each of smears in a second group after the first group, the smear into contact with the second oil absorption member and then into contact with the third oil absorption member.

5. The testing system according to claim 1, wherein the controller controls the movement mechanism so as to bring the smear into contact with an oil absorption member of the plural oil absorption members a first number of times and then bring the smear into contact with another one of the plural oil absorption members a second number of times greater than the first number of times.

6. The testing system according to claim 1, further comprising a controller that is configured to control, when the smear is in contact with the contact surface, the movement mechanism to maintain relative positions of the first holder and the second holder to such an extent that the smear and the contact surface do not slide with respect to each other.

7. The testing system according to claim 1, wherein the contact surface of each of the plural oil absorption members is formed to be smaller than the smear, and the oil remover further comprises a controller that is configured to control the movement mechanism to bring the smear and the contact surface into contact with each other such that the contact surface is fitted inward of an outer peripheral edge of the smear.

8. The testing system according to claim 1, wherein each of the plural oil absorption members comprises a porous member with a continuous pore structure.

9. The testing system according to claim 1, wherein the movement mechanism is configured to move the first holder between a first position at which the smear to be subjected to oil removal is received by the first holder and a second position at which the smear after the oil removal is removed from the first holder, and the second holder holds the plural oil absorption members in an area between the first position and the second position.

10. The testing system according to claim 1, wherein the movement mechanism comprises a pivotal driver that is configured to pivot the first holder between plural angular positions including a first angular position in which the smear faces a vertical direction and a second angular position in which the smear faces a horizontal direction.

11. The testing system according to claim 1, wherein the controller is configured, when it is determined that a count of the oil removal by the plural oil absorption members reaches a predetermined threshold value, to display a guidance screen that prompts to replace the plural oil absorption members.

12. The testing system according to claim 1, wherein the controller is configured to display a setting screen to select one of a first mode for executing an oil removal process and a second mode for not executing the oil removal process, the controller is configured, when it is determined that the first mode is selected, to execute the oil remove process by controlling the movement mechanism, and the control is configured, when it is determined that the second mode is selected, not to execute the oil removal process.

13. The testing system according to claim 1, further comprising:

a container transport path configured to transport a container in which a plurality of smears are storable; and a smear transfer device that is configured to pick up the smear from the first holder after the oil is removed by the oil remover, and store the picked-up smear into the container.

14. The testing system according to claim 1, wherein the controller is configured to display on a display a setting screen to select one of a first mode for executing an oil removal process and a second mode for not executing the oil removal process, the controller is configured, when it is determined that the first mode is selected, to execute the oil remove process by controlling the movement mechanism of the oil remover, and the controller is configured, when it is determined that the second mode is selected, not to execute the oil removal process.

15. A testing system comprising:

a smear preparing device configured to prepare a smear being a glass slide with a sample smeared thereon;

a smear imaging device configured to supply an oil onto the smear prepared by the smear preparing device and image the smear with an oil immersion object lens; and an oil remover configured to remove, after imaging by the smear imaging device, the oil for the oil immersion object lens adhering to the smear prepared by the smear preparing device, wherein the oil remover comprises:

a first holder that holds the smear to be subjected to oil removal;

a second holder that holds one or more oil absorption members which absorbs the oil; and a movement mechanism that is configured to move at least one of the first holder and the second holder so as to shift from a separated state where a contact surface of at least one of the one or more oil absorption members and the smear are positioned away from each other to a contacting state where the smear and the contact surface are in contact with each other, wherein the second holder comprises a holding tool that is detachably attached to the second holder, and the one or more oil absorption members are attached to the holding tool.

16. A testing system comprising:

a smear preparing device configured to prepare a smear being a glass slide with a sample smeared thereon;

a smear imaging device configured to supply an oil onto the smear prepared by the smear preparing device and image the smear with an oil immersion object lens; and an oil remover configured to remove, after imaging by the smear imaging device, the oil for the oil immersion object lens adhering to the smear prepared by the smear preparing device, wherein the oil remover comprises:

a first holder that holds the smear to be subjected to oil removal;

a second holder that holds one or more oil absorption members which absorbs the oil; and a movement mechanism that is configured to move at least one of the first holder and the second holder so as to shift from a separated state where a contact surface of at least one of the one or more oil absorption members and the smear are positioned away from each other to a contacting state where the smear and the contact surface are in contact with each other, wherein the movement mechanism is configured to move the first holder between a first position at which the smear to be subjected to oil removal is received by the first holder and a second position at which the smear after the oil removal is removed from the first holder, and the second holder holds the one or more oil absorption members in an area between the first position and the second position, the movement mechanism comprises:

a pivotal driver configured to bring the smear and the contact surface into and out of contact with each other by pivoting the first holder about a rotation shaft lying in a horizontal plane while supporting an end portion of the first holder, and a horizontal driver configured to move the first holder between the first position and the second position by moving the first holder in a horizontal direction.

\* \* \* \* \*